(12) United States Patent
Schwartz et al.

(10) Patent No.: US 11,285,702 B2
(45) Date of Patent: Mar. 29, 2022

(54) SILOXANE-BASED ADHESIVE LAYERS AS CERAMIC PRECURSORS

(71) Applicant: 3M INNOVATIVE PROPERTIES COMPANY, St. Paul, MN (US)

(72) Inventors: Evan L. Schwartz, Vadnais Heights, MN (US); Audrey A. Sherman, Woodbury, MN (US); Brett J. Sitter, Cottage Grove, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 474 days.

(21) Appl. No.: 16/319,435

(22) PCT Filed: Jul. 18, 2017

(86) PCT No.: PCT/US2017/042558
§ 371 (c)(1),
(2) Date: Jan. 21, 2019

(87) PCT Pub. No.: WO2018/017554
PCT Pub. Date: Jan. 25, 2018

(65) Prior Publication Data
US 2019/0218425 A1    Jul. 18, 2019

Related U.S. Application Data

(60) Provisional application No. 62/365,499, filed on Jul. 22, 2016.

(51) Int. Cl.
| | | |
|---|---|---|
| B32B 17/10 | (2006.01) |
| C09J 183/10 | (2006.01) |
| C03C 17/30 | (2006.01) |
| C09J 7/50 | (2018.01) |
| C09J 7/38 | (2018.01) |
| B32B 7/12 | (2006.01) |
| B32B 9/00 | (2006.01) |
| B32B 37/12 | (2006.01) |
| B32B 37/18 | (2006.01) |
| C09J 5/06 | (2006.01) |
| C09J 11/04 | (2006.01) |
| C09J 11/08 | (2006.01) |
| C08G 77/452 | (2006.01) |
| C08G 77/458 | (2006.01) |
| C08G 77/455 | (2006.01) |

(52) U.S. Cl.
CPC ............ *B32B 17/10* (2013.01); *B32B 7/12* (2013.01); *B32B 9/005* (2013.01); *B32B 37/1207* (2013.01); *B32B 37/182* (2013.01); *C03C 17/30* (2013.01); *C09J 5/06* (2013.01); *C09J 7/38* (2018.01); *C09J 7/50* (2018.01); *C09J 11/04* (2013.01); *C09J 11/08* (2013.01); *C09J 183/10* (2013.01); *B32B 2307/412* (2013.01); *B32B 2309/02* (2013.01); *B32B 2315/02* (2013.01); *B32B 2315/08* (2013.01); *B32B 2383/00* (2013.01); *B32B 2405/00* (2013.01); *C08G 77/452* (2013.01); *C08G 77/455* (2013.01); *C09J 2301/408* (2020.08); *C09J 2483/00* (2013.01)

(58) Field of Classification Search
CPC ........... B32B 17/10; B32B 7/12; B32B 9/005; B32B 37/1207; B32B 37/182; C09J 183/10; C09J 7/50; C09J 7/38; C09J 5/06; C09J 11/04; C09J 11/08; C03C 17/30; C08G 77/452; C08G 77/455
USPC ....................................................... 428/477
See application file for complete search history.

(56) References Cited

U.S. PATENT DOCUMENTS

| | | |
|---|---|---|
| 2,676,182 A | 4/1954 | Daudt |
| 2,736,721 A | 2/1956 | Dexter |
| 3,627,851 A | 12/1971 | Brady |
| 3,772,247 A | 11/1973 | Flannigan |
| 4,255,316 A | 3/1981 | Blizzard |
| 4,269,757 A | 5/1981 | Mine |
| 4,422,891 A | 12/1983 | Gonser |
| 4,882,201 A | 11/1989 | Crivello |
| 4,900,474 A | 2/1990 | Terae |
| 4,935,484 A | 6/1990 | Wolfgruber |
| 5,028,679 A | 7/1991 | Terae |
| 5,082,706 A | 1/1992 | Tangney |
| 5,110,890 A | 5/1992 | Butler |
| 5,118,775 A | 6/1992 | Inomata |
| 5,214,119 A | 5/1993 | Leir |

(Continued)

FOREIGN PATENT DOCUMENTS

| | | |
|---|---|---|
| JP | 236234 | 2/1990 |
| WO | WO 1996-34028 | 10/1996 |

(Continued)

OTHER PUBLICATIONS

Grassie "The Thermal Degradation of Polysiloxanes-I: Polydimethylsiloxane", European Polymer Journal, 1978, vol. 14, No. 11, pp. 875-884. (Year: 1978).*

Grassie et al. "TheThermal Degradation of Polysiloxanes-l: Polydimethylsiloxane", European Polymer Journal, 1978, vol. 14, No. 11, pp. 875-884. (Year: 1978).*

Encyclopedia of Polymer Science and Engineering, 1989, vol. 15, pp. 265-270.

(Continued)

*Primary Examiner* — Michael M. Bernshteyn
(74) *Attorney, Agent, or Firm* — Jeffrey M. Olofson

(57) ABSTRACT

Transfer tapes include a releasing substrate and an adhesive layer adjacent to the surface of the releasing substrate. The adhesive layer includes a at least one siloxane-based copolymer, and at least one siloxane tackifying resin. The adhesive layer is a pressure sensitive adhesive at room temperature and is convertible into a ceramic-like layer by bake-out at a temperature of from 100-500°.

23 Claims, 8 Drawing Sheets

(56) References Cited

U.S. PATENT DOCUMENTS

| | | | |
|---|---|---|---|
| 5,236,997 A | 8/1993 | Fujiki | |
| 5,248,739 A | 9/1993 | Schmidt | |
| 5,302,685 A | 4/1994 | Tsumura | |
| 5,319,040 A | 6/1994 | Wengrovius | |
| 5,453,104 A | 9/1995 | Schwabel | |
| 5,461,134 A | 10/1995 | Leir | |
| 5,512,650 A | 4/1996 | Leir | |
| 5,904,791 A | 5/1999 | Bearinger | |
| 6,369,123 B1 | 4/2002 | Stark | |
| 6,376,590 B2 | 4/2002 | Kolb | |
| 6,461,419 B1 | 10/2002 | Wu | |
| 6,467,897 B1 | 10/2002 | Wu | |
| 6,582,804 B2 | 6/2003 | Wu | |
| 6,719,422 B2 | 4/2004 | Wu | |
| 6,858,253 B2 | 2/2005 | Williams | |
| 7,012,110 B2* | 3/2006 | Sherman | C09J 183/10 524/267 |
| 7,153,924 B2 | 12/2006 | Kuepfer | |
| 7,241,437 B2 | 7/2007 | Davidson | |
| 7,294,298 B2 | 11/2007 | Iijima | |
| 7,371,464 B2* | 5/2008 | Sherman | C09J 183/10 428/447 |
| 7,695,818 B2* | 4/2010 | Sherman | C08G 18/758 428/447 |
| 7,705,101 B2 | 4/2010 | Sherman | |
| 7,947,376 B2 | 5/2011 | Sherman | |
| 8,580,891 B2* | 11/2013 | Liu | C09J 133/08 525/100 |
| 9,228,117 B2* | 1/2016 | Sherman | C09J 7/403 |
| 2003/0175510 A1* | 9/2003 | Sherman | C09J 183/10 428/355 R |
| 2005/0282024 A1* | 12/2005 | Sherman | C09J 183/04 428/447 |
| 2007/0148475 A1* | 6/2007 | Sherman | C08G 69/42 428/447 |
| 2011/0020640 A1* | 1/2011 | Sherman | C09J 7/403 428/343 |
| 2011/0212325 A1 | 9/2011 | Determan | |
| 2012/0095159 A1* | 4/2012 | Liu | C08L 83/00 524/588 |
| 2014/0004331 A1 | 1/2014 | Hida | |
| 2014/0021492 A1 | 1/2014 | Wolk | |
| 2014/0287642 A1 | 9/2014 | Kumar | |

FOREIGN PATENT DOCUMENTS

| | | |
|---|---|---|
| WO | WO 1996-34030 | 10/1996 |
| WO | WO 1996-35458 | 11/1996 |
| WO | WO 1997-40103 | 10/1997 |
| WO | WO 1998-17726 | 4/1998 |
| WO | WO 2000-068336 | 11/2000 |
| WO | WO 2003-052019 | 6/2003 |
| WO | WO 2004-111151 | 12/2004 |
| WO | WO 2006-003853 | 1/2006 |

OTHER PUBLICATIONS

Grassie, "The Thermal Degradation of Polysiloxanes-I: Polydimethylsiloxane", European Polymer Journal, 1978, vol. 14, No. 11, pp. 875-884.

Mistler, Tape Casting: Theory and Practice, 37-45, 2000.

Ro, "High-Modulus Spin-On Organosilicate Glasses for Nanoporous Applications", Advanced Materials, 2007, vol. 19, pp. 705-710.

Shaw, "Negative photoresists for optical lithography", IBM Journal of Research and Development, Jan./Mar. 1997, vol. 41, No. 1-2, pp. 81-94.

Smith, Modern Optical Engineering, 104-105, 1966.

Uran (U), [retrieved from the internet on Mar. 21, 2019], URL <http://www.periodensystem-online.de/index.php?sel=wertdesc &prop=pKb-Werte&show=list&el=92&id=acid>, 1 page.

International Search Report for PCT International Application No. PCT/US2017/042558, dated Oct. 26, 2017, 4 pages.

* cited by examiner

SILOXANE-BASED ADHESIVE LAYERS AS CERAMIC PRECURSORS

FIELD OF THE DISCLOSURE

This disclosure relates to siloxane-based adhesive layers, especially pressure sensitive adhesive layers that can be used as precursors for ceramic-like layers.

BACKGROUND

Adhesives have been used for a variety of marking, holding, protecting, sealing and masking purposes. Adhesive tapes generally comprise a backing, or substrate, and an adhesive. One specific type of tape, called a transfer tape, does not comprise a backing, but rather is a standalone adhesive layer. Among the types of adhesives used in tapes, are pressure sensitive adhesives and heat activated adhesives, with pressure sensitive adhesives being the more common.

Pressure sensitive adhesives are well known to one of ordinary skill in the art to possess certain properties at room temperature including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as pressure sensitive adhesives are polymers designed and formulated to exhibit the requisite viscoelastic properties resulting in a desired balance of tack, peel adhesion, and shear strength. The most commonly used polymers for preparation of pressure sensitive adhesives are natural rubber, synthetic rubbers (e.g., styrene/butadiene copolymers (SBR) and styrene/isoprene/styrene (SIS) block copolymers), various (meth)acrylate (e.g., acrylate and methacrylate) copolymers and silicones. Each of these classes of materials has advantages and disadvantages.

Examples of vitrifiable adhesives include U.S. Pat. No. 4,422,891 (Gonser et al.), which describes adhering together of articles with a polymerizable adhesive comprising a particulate, inorganic filler, and a polymerizable resin comprising at least 0.25% by weight of a polymerizable silane. The adhesive is polymerized and then heated to form a vitrified bond.

U.S. Pat. No. 5,904,791 (Bearinger et al.) describes a method of adhering an electronic component to a substrate with a layer of a preceramic polymer applied between the electronic component and the substrate followed by heating to convert the preceramic polymer into a ceramic.

U.S. Pat. No. 7,294,298 (Iijima) describes a mixture of an acrylate adhesive with a silicone resin, which is used to bond transparent conductive nanoparticle layers to a substrate, followed by calcining.

U.S. Pat. No. 4,269,757 (Mine et al.) describes a composition which is a siloxane copolymer, a siloxane polymer, a ceramic forming filler and a peroxide which upon heating to 500° C. or greater forms a pliable, flexible ceramic material.

U.S. Pat. No. 4,255,316 (Blizzard) describes a ceramifiable silicone adhesive prepared by mixing a ceramifiable filler with certain silicone pressure sensitive adhesives.

US Patent Publication No. 2014/0004331 (Hida et al.) describes a shatterproofing member with a hardenable, pressure-sensitive adhesive that can form a bond between two surfaces at room temperature and also shows adhesive property after being sintered.

US Patent Publication No. 2014/0021492 (Wolk et al.) describes a lamination transfer film and process to impart nanostructure on a receptor surface.

SUMMARY

Disclosed herein are adhesive layers, transfer tapes that include the adhesive layers, multilayer articles that include or are prepared from the transfer tapes, and methods of preparing and using the adhesive layers, transfer tapes, and multilayer articles.

The disclosure includes adhesive layers. The adhesive layer comprises at least one siloxane-based copolymer, and at least one siloxane tackifying resin. The adhesive layer is a pressure sensitive adhesive at room temperature and is convertible into a ceramic-like layer by baking-out at a temperature of from 100-500° C.

In some embodiments, the adhesive layer is a transfer tape and the transfer tape is disposed on a releasing substrate.

Also disclosed are multilayer articles comprising a receptor substrate with a first major surface and a second major surface and a ceramic-like layer in contact with the second major surface of the receptor substrate. The ceramic-like layer comprises a baked-out pressure sensitive adhesive layer, where the pressure sensitive adhesive is baked-out at a temperature of from 100-500° C., the pressure sensitive adhesive layer comprising at least one siloxane-based copolymer, and at least one siloxane tackifying resin. In some embodiments, the multilayer article further comprises a second substrate, where the second substrate is either another receptor substrate or another ceramic-like layer.

Methods of preparing articles are also disclosed. The methods of preparing an article comprise providing a receptor substrate with a first major surface and a second major surface, and providing a transfer tape. The transfer tape comprises a release substrate with a first major surface and a second major surface, and an adhesive layer adjacent to at least a portion of the second major surface of the release substrate, the adhesive layer comprising at least one siloxane-based copolymer, and at least one siloxane tackifying resin, where the adhesive layer is a pressure sensitive adhesive at room temperature and is convertible into a ceramic-like layer by bake-out at a temperature of from 100-500° C. The method further comprises applying the transfer tape to the receptor substrate such that the pressure sensitive adhesive layer is in contact with the second major surface of the receptor substrate, removing the release substrate from the transfer tape in contact with the second major surface of the receptor substrate to form a pressure sensitive adhesive layer laminated to the second major surface of the receptor substrate, and baking-out the pressure sensitive adhesive layer laminated to the second major surface of the receptor substrate at a temperature from 100-500° C., to form a ceramic-like layer on the second major surface of the receptor substrate. The method can further include a backfill layer adjacent to the pressure sensitive adhesive layer are a second substrate adjacent to the pressure sensitive adhesive layer, where the second substrate can another receptor substrate or another adhesive layer.

BRIEF DESCRIPTION OF THE DRAWINGS

The present application may be more completely understood in consideration of the following detailed description of various embodiments of the disclosure in connection with the accompanying drawings.

Figure 1:
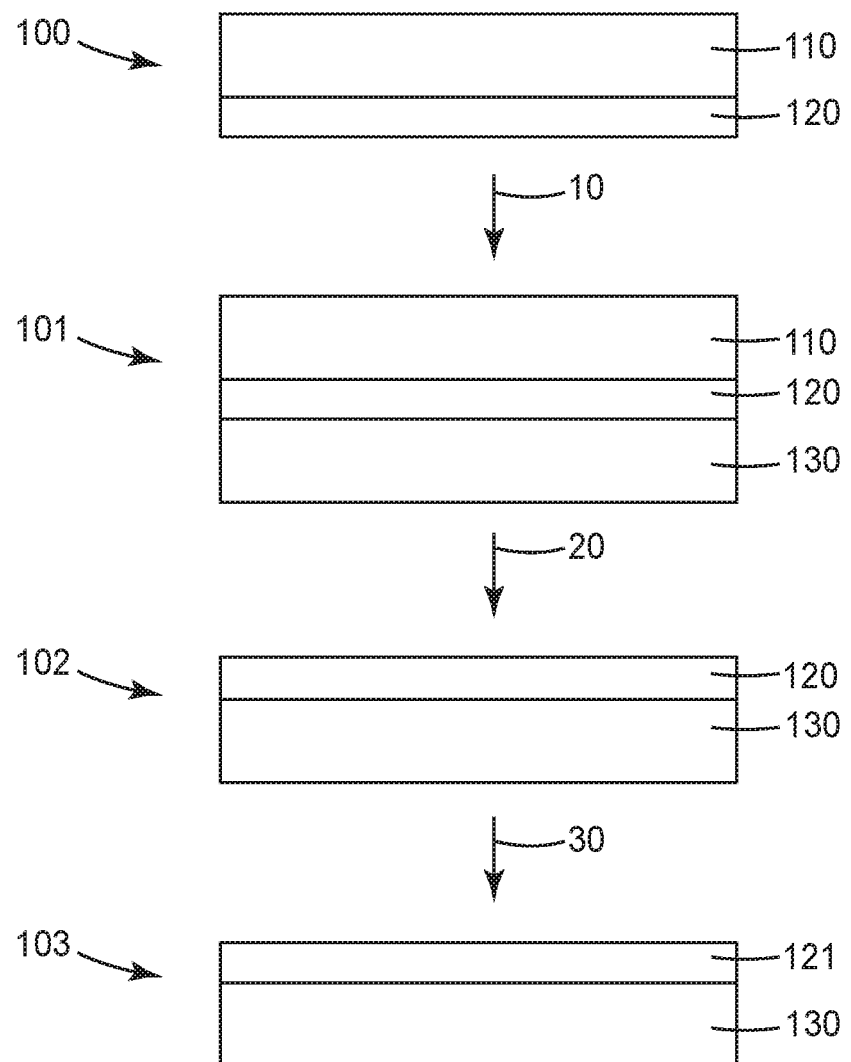
FIG. 1 is a cross sectional view of an embodiment of a process for preparing and using the adhesive layers, transfer tapes, and multilayer articles of the present disclosure.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The use of adhesives, especially pressure sensitive adhesives, in areas such as the medical, electronic, automotive, energy, and optical industries is increasing. The requirements of these industries place additional demands upon the pressure sensitive adhesive beyond the traditional properties of tack, peel adhesion and shear holding power. New classes of materials are desirable to meet the increasingly demanding performance requirements for pressure sensitive adhesives. Among the performance requirements for new classes of pressure sensitive adhesives are optical properties such as being optically transparent or optically clear.

Double-sided adhesives, also called "transfer tapes" or "transfer films" are adhesive layers that have adhesive on both exposed surfaces. In some transfer tapes, the exposed surfaces are simply the two surfaces of a single adhesive layer. Other transfer tapes are multi-layer transfer tapes with at least two adhesive layers that may be the same or different, and in some instances intervening layers that may not be adhesive layers. In this disclosure, transfer tapes are prepared that comprise a single layer of adhesive.

Typically, transfer tapes are used to adhere two different substrates, that is to say they are used to form three layer laminates that contain: a substrate/transfer tape/a different substrate. Laminates of this type are formed using a wide range of substrates, such as, for example, papers, sheets, films, plates, etc. The transfer tapes of the present disclosure, can be used to adhere two different substrates to each other, but also may be adhered to one substrate and have an exposed outer surface that is not adhered to a substrate. In this disclosure, the pressure sensitive adhesive layer is used not only as an adhesive layer but also as a precursor for a thin ceramic-like layer.

There are numerous advantages in using a layer of pressure sensitive adhesive as a precursor to a ceramic-like layer. Because the transfer film is a pressure sensitive adhesive it can be handled as a tape, typically as a layer of pressure sensitive adhesive disposed on a releasing substrate. The advantages of tape handling as opposed to a handling of a liquid medium are many, as the tape is easier to dispense, handle, adhere, and remove and reattach if necessary since the adhesive is in the form of a standalone film. Additionally, since the pressure sensitive adhesive layer is protected by a non-tacky releasing substrate, the adhesive is protected from sticking to itself, becoming contaminated, or adhering to the dispensing apparatus or person handling the adhesive film. Also films can be cut into an unlimited number of sizes and shapes in a predetermined way to match the surface to which it is to be adhered without the worry about the mess and difficulties associated with the precise dispensing of liquids.

There are special advantages to using pressure sensitive transfer tapes as precursors to ceramic-like layers. The adhesive film can be easily handled and precisely sized for the desired application, and because the film is an adhesive it self-adheres to the substrate. In this way the precursor is dispensed more easily and precisely than if a liquid precursor were applied. In applications that utilize high temperature processing steps, such as commonly used in semiconductor and display manufacturing, the adhesive can be converted to a ceramic-like layer capable of retaining covalent bonds to the substrates to which it is adhered. In this way, the adhesive is capable of strong adhesion in both high and low temperature operations.

This disclosure describes adhesive layers that comprise a siloxane-based copolymer and at least one siloxane tackifying resin. The adhesive layer is a pressure sensitive adhesive at room temperature and is convertible into a ceramic-like layer by bake-out at a temperature of from 100-500°. Typically the siloxane-based copolymer copolymer comprises polydiorganosiloxane segments with at least one linking group where the linking group is selected from urea linkages, urethane linkages, amide linkages, oxamide linkages, cured (meth)acrylate linkages, cured vinyl linkages, cured epoxy linkages, or a combination thereof. The adhesive layer can be prepared by contacting a solution of a siloxane-based copolymer and siloxane tackifying resin to a surface and drying, or by contacting to a substrate surface a reactive mixture that upon curing forms a siloxane-based copolymer and a siloxane tackifying resin. Typically, such reactive mixtures include at least one siloxane di(meth)acrylate and an initiator, and may also include other reactive components such as a siloxane (meth)acrylate and/or an ethylenically unsaturated silane. Also disclosed herein are transfer tapes, multilayer articles comprising these adhesive layers, and methods for making and using the adhesive layers to prepare articles.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are pressure sensitive adhesives.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The terms "siloxane-based" as used herein refer to polymers or units of polymers that contain siloxane units. The terms silicone or siloxane are used interchangeably and refer to units with dialkyl or diaryl siloxane (—$SiR_2O$—) repeating units.

The terms "backfill materials" or "backfill layers" as used herein refer to layers of materials that fill in irregular or structured surfaces to produce a new surface that may be used as a base to build additional layered elements and is thermally stable.

The term "bake-out" as used herein, refers to the process of substantially removing sacrificial material present in a layer by pyrolysis or combustion while leaving thermally stable materials substantially intact (backfill, inorganic nanomaterials, receptor substrate).

The term "bake-out temperature" as used herein, refers to the maximum temperature reached during the process of substantially removing sacrificial materials in a layer by pyrolysis or combustion while leaving thermally stable materials substantially intact (backfill, inorganic nanomaterials, receptor substrate).

The terms "combust" or "combustion" as used herein, refer to a process of heating a layer that comprises organic materials in an oxidizing atmosphere so that organic materials undergo a chemical reaction with the oxidant.

The term "ceramic-like" as used herein, refers to a pressure sensitive adhesive layer that has been subjected to a bake-out process to produce a densified layer of nanomaterials. The term "densified layer of nanomaterials" as used herein, refers to a layer with an increased volume fraction of nanomaterials resulting from the pyrolysis or combustion of a layer containing a polymer or other organic constituents and inorganic nanomaterials.

The terms "pyrolyze" or "pyrolysis" as used herein, refer to a process of heating a layer that comprises inorganic nanomaterials in an inert atmosphere so that organic materials in the article decompose by homo- or heterolytic bond cleavage, bond rearrangement, or other processes that serve to fragment organic molecules and create low molecular weight volatile organic products.

The term "structured surface" as used herein, refers to a surface that includes periodic, quasi-periodic or random engineered microstructures, nanostructures, and/or hierarchical structures that can be in a regular pattern or random across the surface. Nanostructures comprise features having at least one dimension (e.g., height, width, or length) less than or equal to 2 micrometers. Microstructures generally comprise features having at least one dimension (e.g., height, width, or length) less than or equal to one millimeter. Hierarchical structures are combinations of nanostructures and microstructures. Typically a "microstructured" surface means that the surface has a configuration of features in which at least 2 dimensions of the features are microscopic. As used herein, the term "microscopic" refers to features of small enough dimension so as to require an optic aid to the naked eye when viewed from a plane of view to determine its shape. One criterion is found in *Modern Optical Engineering* by W. J. Smith, McGraw-Hill, 1966, pages 104-105 whereby visual acuity "is defined and measured in terms of the angular size of the smallest character that can be recognized." Normal visual acuity is considered to be when the smallest recognizable letter subtends an angular height of 5 minutes of arc on the retina. At a typical working distance of 250 mm (10 inches), this yields a lateral dimension of 0.36 mm (0.0145 inch) for this object.

The term "thermally stable" as used herein, refers to materials that remain substantially intact during the removal of sacrificial materials.

The term "sacrificial" as used herein, refers to materials that are the opposite of thermally stable materials, that is to say they are materials that during bake-out are essentially entirely removed.

The terms "setting", "curing", and "reacting" are used interchangeably to describe the reaction or polymerization of reactive groups in a reactive composition to form a polymeric composition that is no longer reactive. The setting, curing, or reacting may or may not involve crosslinking.

The terms "room temperature" and "ambient temperature" are used interchangeably to mean temperatures in the range of 20° C. to 25° C.

The terms "Tg" and "glass transition temperature" are used interchangeably. If measured, Tg values are determined by Differential Scanning calorimetry (DSC) at a scan rate of 10° C./minute, unless otherwise indicated. Typically, Tg values for copolymers are not measured but are calculated using the well-known Fox Equation, using the monomer Tg values provided by the monomer supplier, as is understood by one of skill in the art.

The term "releasing surface" as used herein refers to a surface that provides low adhesive strength to adhesives, especially pressure sensitive adhesives. Examples of releasing surfaces include the surfaces of release liners. The terms "releasing substrate" and "release substrate" are used interchangeably and refer to a substrate with a releasing surface.

The term "release liners" as used herein refers to articles containing at least one release surface. When adhered to an adhesive layer, release liners adhere only lightly and are easily removed. A release liner may be a single layer (with only the base layer) or it may be a multilayer construction (with one or more coatings or additional layers in addition to the base layer). The release liner may also contain a structure or pattern such as a microstructure.

The term "hydrocarbon group" as used herein refers to any monovalent group that contains primarily or exclusively carbon and hydrogen atoms. Alkyl and aryl groups are examples of hydrocarbon groups.

The term "hydrocarbon-based layer" refers to a layer that primarily comprises carbon and hydrogen and may also contain heteroatoms or heteroatom groups such as silicon, oxygen, nitrogen, sulfur, etc atoms, (meth)acrylate groups, silicone groups, and the like.

The term "adjacent" as used herein when referring to two layers means that the two layers are in proximity with one another with no intervening open space between them. They may be in direct contact with one another (e.g. laminated together) or there may be intervening layers.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent or higher valent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "heteroalkylene" refers to a divalent or higher valent group that includes at least two alkylene groups connected by a thio, oxy, or —NR— where R is alkyl. The heteroalkylene can be linear, branched, cyclic, substituted with alkyl groups, or combinations thereof. Some heteroalkylenes are poloxyyalkylenes where the heteroatom is oxygen such as for example,

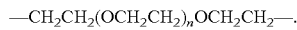

The term "arylene" refers to a divalent or higher valent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "heteroarylene" refers to a divalent or higher valent group that is carbocyclic and aromatic and contains heteroatoms such as sulfur, oxygen, nitrogen or halogens such as fluorine, chlorine, bromine or iodine.

The term "aralkylene" refers to a divalent or higher valent group of formula —$R^a$—$Ar^a$— where $R^a$ is an alkylene and $Ar^a$ is an arylene (i.e., an alkylene is bonded to an arylene).

The term "(meth)acrylate" refers to monomeric acrylic or methacrylic esters of alcohols. Acrylate and methacrylate monomers or oligomers are referred to collectively herein as "(meth)acrylates". Materials referred to as "(meth)acrylate functional" are materials that contain one or more (meth)acrylate groups.

The terms "free radically polymerizable" and "ethylenically unsaturated" are used interchangeably and refer to a reactive group which contains a carbon-carbon double bond which is able to be polymerized via a free radical polymerization mechanism.

Unless otherwise indicated, "optically transparent" refers to an article, film or adhesive that has a high light transmittance over at least a portion of the visible light spectrum (about 400 to about 700 nm). Typically, optically transparent articles have a visible light transmittance of at least 90%. The term "transparent film" refers to a film having a thickness and when the film is disposed on a substrate, an image (disposed on or adjacent to the substrate) is visible through the thickness of the transparent film. In many embodiments, a transparent film allows the image to be seen through the thickness of the film without substantial loss of image clarity. In some embodiments, the transparent film has a matte or glossy finish.

Unless otherwise indicated, "optically clear" refers to an adhesive or article that has a high light transmittance over at least a portion of the visible light spectrum (about 400 to about 700 nm), and that exhibits low haze, typically less than about 5%, or even less than about 2%. In some embodiments, optically clear articles exhibit a haze of less than 1% at a thickness of 50 micrometers or even 0.5% at a thickness of 50 micrometers. Typically, optically clear articles have a visible light transmittance of at least 95%, often higher such as 97%, 98% or even 99% or higher. Optically clear adhesives or articles are generally color neutral on the CIE Lab scale, with the a orb values being less than 0.5.

The term "polymer" as used herein refers to macromolecules containing at least one type of repeating unit. The term polymer encompasses relatively low molecular weight macromolecules which are often referred to as "oligomers" as well as relatively high molecular weight macromolecules. The term polymer encompasses both homopolymers which include only one type of repeating unit and copolymers which include more than one type of repeating unit. As used herein when the term "molecular weight" is used it refers to number average molecular weights unless otherwise indicated. Molecular weights are in units of grams/mole or Daltons.

Disclosed herein are adhesive layers comprising at least one siloxane-based copolymer, and at least one siloxane tackifying resin. The adhesive layer is a pressure sensitive adhesive at room temperature and is convertible into a ceramic-like layer by baking-out at a temperature of from 100-500° C. Thus the adhesive layer is able to be used as a pressure sensitive adhesive at room temperature, in particular to adhere to a substrate surface, or to adhere to two substrate surfaces to form a laminate construction, and can then be baked-out to form a ceramic-like layer. Typically the siloxane-based copolymer comprises polydiorganosiloxane segments with at least one linking group where the linking group is selected from urea linkages, urethane linkages, oxamide linkages, cured (meth)acrylate or vinyl linkages, epoxy linkages, or a combination thereof.

The adhesive layers have a variety of properties beyond the properties inherent in pressure sensitive adhesives, including tack, peel strength, and shear holding power. As described above, these adhesive layers are convertible into a ceramic-like layer by baking-out at a temperature of from 100-500° C. Additionally, in many embodiments, the adhesive layer is optically clear. Also, as will be described below, the adhesive layers can be used as transfer tapes, and thus can be used as a standalone film.

In some embodiments, the adhesive layer is prepared by contacting a solution of a siloxane-based copolymer and siloxane tackifying resin to a surface and drying. In other embodiments, the adhesive layer is prepared by contacting to a substrate surface a reactive mixture that upon curing forms a siloxane-based copolymer and a siloxane tackifying resin. Each of these embodiments will be discussed in detail below.

In some embodiments, the adhesive layer is prepared by contacting a solution of a siloxane-based copolymer and siloxane tackifying resin to a surface and drying. Typically these siloxane-based copolymers comprise siloxane elastomeric polymers with polydiorganosiloxane segments with at least one linking group where the linking group is selected from urea linkages, urethane linkages, oxamide linkages.

A wide variety of diorganosiloxane segments are suitable as will be discussed below. In some embodiments the organo groups comprise a mixture of different groups, such as alkyl groups and aryl groups. In other embodiments, the organo groups are all alkyl groups. Among the most common and readily available polydiorganosiloxane segments are ones in which all of the organo groups are methyl groups. Therefore, in some embodiments, the siloxane elastomeric polymers comprise polydiorganosiloxane segments where at least 50% of the organo groups are methyl groups. In some embodiments, the siloxane elastomeric polymers comprise polydiorganosiloxane segments where all of the organo groups are methyl groups.

One example of a useful class of siloxane elastomeric polymers is urea-based siloxane polymers such as siloxane polyurea block copolymers. Siloxane polyurea block copolymers include the reaction product of a polydiorganosiloxane diamine (also referred to as a silicone diamine), a diisocyanate, and optionally an organic polyamine. Suitable siloxane polyurea block copolymers are represented by the repeating unit of Structure I below:

wherein each R is a moiety that, independently, is an alkyl moiety, having about 1 to 12 carbon atoms, and may be substituted with, for example, trifluoroalkyl or vinyl groups, a vinyl radical or higher alkenyl radical represented by the formula —$R^d$(CH$_2$)$_a$CH=CH$_2$ wherein the $R^d$ group is —(CH$_2$)$_b$— or —(CH$_2$)$_c$CH=CH— and a is 1, 2 or 3; b is 0, 3 or 6; and c is 3, 4 or 5, a cycloalkyl moiety having from about 6 to 12 carbon atoms and may be substituted with alkyl, fluoroalkyl, and vinyl groups, or an aryl moiety having from about 6 to 20 carbon atoms and may be substituted with, for example, alkyl, cycloalkyl, fluoroalkyl and vinyl groups or R is a perfluoroalkyl group as described in U.S. Pat. No. 5,028,679, or a fluorine-containing group, as described in U.S. Pat. No. 5,236,997, or a perfluoroether-containing group, as described in U.S. Pat. Nos. 4,900,474 and 5,118,775; typically, at least 50% of the R moieties are methyl radicals with the balance being monovalent alkyl or substituted alkyl radicals having from 1 to 12 carbon atoms, alkenyl radicals, phenyl radicals, or substituted phenyl radicals;

each Z is a polyvalent radical that is an arylene radical or an aralkylene radical having from about 6 to 20 carbon atoms, an alkylene or cycloalkylene radical having from about 6 to 20 carbon atoms, in some embodiments Z is 2,6-tolylene, 4,4'-methylenediphenylene, 3,3'-dimethoxy-4,4'-biphenylene, tetramethyl-m-xylylene, 4,4'-methylenedicyclohexylene, 3,5,5-trimethyl-3-methylenecyclohexylene, 1,6-hexamethylene, 1,4-cyclohexylene, 2,2,4-trimethylhexylene and mixtures thereof;

each Y is a polyvalent radical that independently is an alkylene radical of 1 to 10 carbon atoms, an aralkylene radical or an arylene radical having 6 to 20 carbon atoms;

each D is selected from the group consisting of hydrogen, an alkyl radical of 1 to 10 carbon atoms, phenyl, and a radical that completes a ring structure including B or Y to form a heterocycle;

where B is a polyvalent radical selected from the group consisting of alkylene, aralkylene, cycloalkylene, phenylene, heteroalkylene, including for example, polyethylene oxide, polypropylene oxide, polytetramethylene oxide, and copolymers and mixtures thereof;

m is a number that is 0 to about 1000;

n is a number that is at least 1; and p is a number that is at least 10, in some embodiments 15 to about 2000, or even 30 to 1500.

Useful siloxane polyurea block copolymers are disclosed in, e.g., U.S. Pat. Nos. 5,512,650, 5,214,119, 5,461,134, and 7,153,924 and PCT Publication Nos. WO 96/35458, WO 98/17726, WO 96/34028, WO 96/34030 and WO 97/40103.

Another useful class of siloxane elastomeric polymers are oxamide-based polymers such as polydiorganosiloxane polyoxamide block copolymers. Examples of polydiorganosiloxane polyoxamide block copolymers are presented, for example, in US Patent Publication No. 2007-0148475. The polydiorganosiloxane polyoxamide block copolymer contains at least two repeat units of Formula II below:

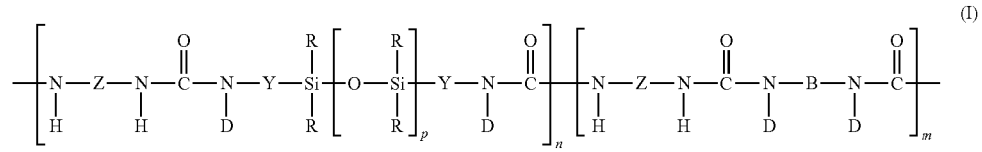

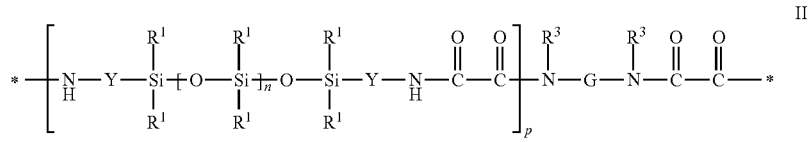

In this formula, each $R^1$ is independently an alkyl, haloalkyl, aralkyl, alkenyl, aryl, or aryl substituted with an alkyl, alkoxy, or halo, wherein at least 50 percent of the $R^1$ groups are methyl. Each Y is independently an alkylene, aralkylene, or a combination thereof. Subscript n is independently an integer of 40 to 1500 and the subscript p is an integer of 1 to 10. Group G is a divalent or higher valent group that is the residue unit that is equal to a diamine of formula $R^3HN$-G-$NHR^3$ minus the two —$NHR^3$ groups or of a higher valent amine as will be described in greater detail below. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN$-G-$NHR^3$ is piperazine or the like). Each asterisk (*) indicates a site of attachment of the repeat unit to another group in the copolymer such as, for example, another repeat unit of Formula II.

Suitable alkyl groups for $R^1$ in Formula II typically have 1 to 10, 1 to 6, or 1 to 4 carbon atoms. Exemplary alkyl groups include, but are not limited to, methyl, ethyl, isopropyl, n-propyl, n-butyl, and iso-butyl. Suitable haloalkyl groups for $R^1$ often have only a portion of the hydrogen atoms of the corresponding alkyl group replaced with a halogen. Exemplary haloalkyl groups include chloroalkyl and fluoroalkyl groups with 1 to 3 halo atoms and 3 to 10 carbon atoms. Suitable alkenyl groups for $R^1$ often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for $R^1$ often have 6 to 12 carbon atoms. Phenyl is an exemplary aryl group. The aryl group can be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable aralkyl groups for $R^1$ usually have an alkylene group having 1 to 10 carbon atoms and an aryl group having 6 to 12 carbon atoms. In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group).

At least 50 percent of the $R^1$ groups are methyl. For example, at least 60 percent, at least 70 percent, at least 80 percent, at least 90 percent, at least 95 percent, at least 98 percent, or at least 99 percent of the $R^1$ groups can be methyl. The remaining $R^1$ groups can be selected from an alkyl having at least two carbon atoms, haloalkyl, aralkyl, alkenyl, aryl, or aryl substituted with an alkyl, alkoxy, or halo.

Each Y in Formula II is independently an alkylene, aralkylene, or a combination thereof. Suitable alkylene groups typically have up to 10 carbon atoms, up to 8 carbon atoms, up to 6 carbon atoms, or up to 4 carbon atoms. Exemplary alkylene groups include methylene, ethylene, propylene, butylene, and the like. Suitable aralkylene groups usually have an arylene group having 6 to 12 carbon atoms bonded to an alkylene group having 1 to 10 carbon atoms. In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein with reference to group Y, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Each subscript n in Formula II is independently an integer of 40 to 1500. For example, subscript n can be an integer up to 1000, up to 500, up to 400, up to 300, up to 200, up to 100, up to 80, or up to 60. The value of n is often at least 40, at least 45, at least 50, or at least 55. For example, subscript n can be in the range of 40 to 1000, 40 to 500, 50 to 500, 50 to 400, 50 to 300, 50 to 200, 50 to 100, 50 to 80, or 50 to 60.

The subscript p is an integer of 1 to 10. For example, the value of p is often an integer up to 9, up to 8, up to 7, up to 6, up to 5, up to 4, up to 3, or up to 2. The value of p can be in the range of 1 to 8, 1 to 6, or 1 to 4.

Typically, the group G in Formula II is a residual unit that is equal to a diamine compound of formula $R^3HN$-G-$NHR^3$ minus the two amino groups (i.e., —$NHR^3$ groups). Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN$-G-$NHR^3$ is piperazine). The diamine can have primary or secondary amino groups. In most embodiments, $R^3$ is hydrogen or an alkyl. In many embodiments, both of the amino groups of the diamine are primary amino groups (i.e., both $R^3$ groups are hydrogen) and the diamine is of formula $H_2N$-G-$NH_2$.

In some embodiments, G is an alkylene, heteroalkylene, polydiorganosiloxane, arylene, aralkylene, or a combination thereof. Suitable alkylenes often have 2 to 10, 2 to 6, or 2 to 4 carbon atoms. Exemplary alkylene groups include ethylene, propylene, butylene, and the like. Suitable heteroalkylenes are often polyoxyalkylenes such as polyoxyethylene having at least 2 ethylene units, polyoxypropylene having at least 2 propylene units, or copolymers thereof. Suitable polydiorganosiloxanes include the polydiorganosiloxane diamines of Formula II, which are described above, minus the two amino groups. Exemplary polydiorganosiloxanes include, but are not limited to, polydimethylsiloxanes with alkylene Y groups. Suitable aralkylene groups usually contain an arylene group having 6 to 12 carbon atoms bonded to an alkylene group having 1 to 10 carbon atoms. Some exemplary aralkylene groups are phenylene-alkylene where the phenylene is bonded to an alkylene having 1 to 10 carbon atoms, 1 to 8 carbon atoms, 1 to 6 carbon atoms, or 1 to 4 carbon atoms. As used herein with reference to group G, "a combination thereof" refers to a combination of two or more groups selected from an alkylene, heteroalkylene, polydiorganosiloxane, arylene, and aralkylene. A combination can be, for example, an aralkylene bonded to an alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

In some embodiments, the G group is greater than divalent. In these embodiments, the precursor amine compound is of the formula $G(NHR^3)_q$, where q is an integer greater than 2. The use of such amine compounds generates branched copolymers as described for example in U.S. Pat. No. 7,705,101. In certain embodiments, the one or more amine compound precursors are a mixture of (i) a diamine compound of formula $R^3HN\text{-}G\text{-}NHR^3$ and (ii) a polyamine compound of formula $G(NHR^3)_q$, where q is an integer greater than 2. In such embodiments, the polyamine compound of formula $G(NHR^3)_q$ can be, but is not limited to, triamine compounds (i.e., q=3), tetraamine compounds (i.e., q=4), and combinations thereof. In such embodiments, the number of equivalents of polyamine (ii) per equivalent of diamine (i) is generally at least 0.001, more typically at least 0.005, or even at least 0.01. In such embodiments, the number of equivalents of polyamine (ii) per equivalent of diamine (i) is generally at most 3, more typically at most 2, or even at most 1.

The polydiorganosiloxane polyoxamide tends to be free of groups having a formula —$R^a$—(CO)—NH— where $R^a$ is an alkylene. All of the carbonylamino groups along the backbone of the copolymeric material are part of an oxalylamino group (i.e., the —(CO)—(CO)—NH— group). That is, any carbonyl group along the backbone of the copolymeric material is bonded to another carbonyl group and is part of an oxalyl group. More specifically, the polydiorganosiloxane polyoxamide has a plurality of aminoxalylamino groups.

The polydiorganosiloxane polyoxamide is a linear, or branched block copolymer and is an elastomeric material. Unlike many of the known polydiorganosiloxane polyamides that are generally formulated as brittle solids or hard plastics, the polydiorganosiloxane polyoxamides can be formulated to include greater than 50 weight percent polydiorganosiloxane segments based on the weight of the copolymer. The weight percent of the diorganosiloxane in the polydiorganosiloxane polyoxamides can be increased by using higher molecular weight polydiorganosiloxanes segments to provide greater than 60 weight percent, greater than 70 weight percent, greater than 80 weight percent, greater than 90 weight percent, greater than 95 weight percent, or greater than 98 weight percent of the polydiorganosiloxane segments in the polydiorganosiloxane polyoxamides. Higher amounts of the polydiorganosiloxane can be used to prepare elastomeric materials with lower modulus while maintaining reasonable strength.

Another useful class of siloxane elastomeric polymers are siloxane-based copolymers with cured (meth)acrylate linkages. Typically these copolymers are prepared from the free radical polymerization of (meth)acrylate-functional siloxanes. These copolymers can be prepared in solution and contacted with a substrate surface similar to the copolymers described above, but more typically a reaction mixture is formed comprising (meth)acrylate-functional siloxanes and this reaction mixture is contacted to a substrate surface and the copolymer is formed by curing the reaction mixture. The reaction mixtures may also include additional reactive components.

A wide range of siloxane (meth)acrylates are suitable. The siloxane (meth)acrylates are multi-functional (meth)acrylates, meaning that the reactive species has more than one (meth)acrylate group. Examples of multi-functional (meth)acrylateate are di(meth)acrylates. The siloxane di(meth)acrylates may be prepared from polydiorganosiloxane diamines by reaction with an isocyanato-functional (meth)acrylate. The general procedure is illustrated in Reaction Scheme I below:

Reaction Scheme I

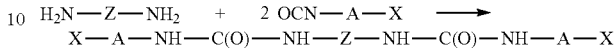

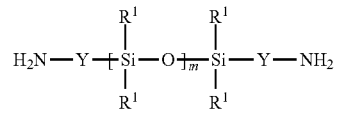

where $H_2N\text{-}Z\text{-}NH_2$ is a polydiorganosiloxane diamine of the formula:

where the groups $R^1$ and Y are the same as described above, and the subscript m is an integer greater than 1; and OCN-A-X is an isocyanato-functional (meth)acrylate, where the group X is the (meth)acrylate group, A is either a single bond or a linking group linking the (meth)acrylate group and the isocyanate group; and C(O) refers to a carbonyl group, namely C=O. An example of a commercially available isocyanato-functional (meth)acrylate is 2-isocyanatoethyl methacrylate.

A variety of siloxane di(meth)acrylates and higher functional siloxane (meth)acrylates are commercially available. Suitable commercially available siloxane (meth)acrylates include the methacryloxypropyl terminated polydimethylsiloxanes DMS-R05, DMS-R11, DMS-R18, DMS-R22, and DMS-R31 available from Gelest (Morrisville, Pa.), CN 9800 from Sartomer (Exton, Pa.), EBECRYL 350 silicone diacrylate and EBECRYL 1360 silicone hexaacrylate from Allnex (Brussels, Belgium), and RC 901, RC 902, and RC 922 available from Evonik Industries (Essen, Germany).

The reaction mixture additionally comprises at least one initiator capable of initiating polymerization and/or crosslinking. The at least one initiator is a free radical initiator. The initiator may be a thermal initiator or a photoinitiator. In many embodiments the initiator is a thermal initiator. Thermal initiators are species which generate free radicals upon heating. Many possible thermal free radical initiators are known in the art of vinyl monomer polymerization and may be used. Typical thermal free radical polymerization initiators which are useful herein are organic peroxides, organic hydroperoxides, and azo-group initiators which produce free radicals. Useful organic peroxides include but are not limited to compounds such as benzoyl peroxide, di-t-amyl peroxide, t-butyl peroxy benzoate, and di-cumyl peroxide. Useful organic hydroperoxides include but are not limited to compounds such as t-amyl hydroperoxide and t-butyl hydroperoxide. Useful azo-group initiators include but are not limited to the VAZO compounds manufactured by DuPont, such as VAZO 52 (2,2'-azobis(2,4-dimethylpentanenitrile)), VAZO 64 (2,2'-azobis(2-methylpropanenitrile)), VAZO 67 (2,2'-azobis(2-methylbutanenitrile)), and VAZO 88 (2,2'-azobis(cyclohexanecarbonitrile)). Additional commercially available thermal initiators include, for example, LUPERSOL 130 (2,5-dimethyl-2,5-Di-(t-butylperoxy) hexyne-3) available from Elf Atochem, Philadelphia, Pa., and LUPEROX 101 (2,5-dimethyl-2,5-di-(tert-butylperoxoxy)hexane) available from Arkema Canada, Inc., Oakville, In some embodiments, the initiator may comprise a photoinitiator, meaning that the initiator is activated by light, typically ultraviolet (UV) light, to generate free radicals. Examples of suitable free radical photoinitiators include DAROCURE 4265, IRGACURE 651, IRGACURE 1173, IRGACURE 819, LUCIRIN TPO, and IRGACURE TPO-L, commercially available from BASF, Charlotte, N.C. Free radicals initiators that are chemically modified to have higher solubility in siloxane resins are commercially available, such as TEGO A18 from Evonik.

A sufficient amount of initiator typically is used to carry the polymerization to the desired temperature and conversion. The total initiator amount used is typically in the range of about 0.0005 weight % to about 10 weight % or in the range of about 1 weight % to about 4 weight % based on the total resin content.

In some embodiments, the adhesive layer may be crosslinked. Such crosslinking can be effected through the use of standard crosslinking agents such as multi-functional ethylenically unsaturated monomers. More typically, if crosslinking is desired the crosslinking can be effected through the use of radiation-activatable crosslinking agents such as the photocrosslinking agents 2,4,6-tri(benzoylphenoxy)-1,3,5-triazines as are described in U.S. Pat. No. 6,369,123 (Stark et al.).

In some embodiments, the reaction mixture comprises additional reactive components to modify the properties, such as by reducing the crosslink density or by improving the adhesion to the receptor surface. The additional reactive components may comprise at least one monofunctional siloxane (meth)acrylate, at least one ethylenically unsaturated silane, or a combination thereof.

A wide range of monofunctional siloxane (meth)acrylates are commercially available such as the monomethacryloxypropyl terminated polydimethylsiloxane commercially available from Gelest, Morrisville, Pa. as "MCR-M07".

The reaction mixture may additionally comprise at least one silane with a polymerizable group. Any suitable silane with a polymerizable group may be used. Such monomers may be described by the general formula IV below:

 X'-L$_1$-SiY$^1$Y$^2$Y$^3$  Formula IV wherein X' comprises a polymerizable group selected from an ethylenically unsaturated group such as a (meth)acrylate group, or non-ethylenically unsaturated groups such as an epoxy group, or a thiol group; L$_1$ is a single covalent bond or a divalent linking group; and each of Y$^1$, Y$^2$, and Y$^3$ is independently a hydrolysable group or an alkyl group.

Examples of ethylenically unsaturated groups include vinyl groups and (meth)acrylate groups. The (meth)acrylate group has the general structure H$_2$C=CHR—C(O)O— where C(O) refers to a carbonyl group, namely C=O and R is H (for acrylate groups) and methyl (for methacrylate groups). (Meth)acrylate silanes are particularly useful, particularly with siloxane (meth)acrylate copolymers.

The linking group L$_1$ includes a divalent or higher valency group selected from an alkylene, arylene, heteroalkylene, or combinations thereof and an optional divalent group selected from carbonyl, ester, amide, sulfonamide, or combinations thereof. L$_1$ can be unsubstituted or substituted with an alkyl, aryl, halo, or combinations thereof. The L$_1$ group typically has no more than 30 carbon atoms. In some compounds, the L$_1$ group has no more than 20 carbon atoms, no more than 10 carbon atoms, no more than 6 carbon atoms, or no more than 4 carbon atoms. For example, L$_1$ can be an alkylene, an alkylene substituted with an aryl group, or an alkylene in combination with an arylene or an alkyl ether or alkyl thioether linking group. Suitable examples of linking group L$_1$ include alkylene groups, especially alkylene groups with 1 to about 20 carbon atoms, arylene groups, aralkylene groups and heteroalkylene groups. Particularly useful examples include the alkylene groups ethylene (—CH$_2$CH$_2$—), propylene (—CH$_2$CH$_2$CH$_2$—), butylene (—CH$_2$CH$_2$CH$_2$CH$_2$—), phenylene (—C$_6$H$_4$—), and the like.

The groups Y$^1$, Y$^2$ and Y$^3$ may be the same or different and may be hydrolysable groups or non-hydrolyzable groups. Typical hydrolysable groups include, for example, acetoxy groups or alkoxy groups. Examples of useful alkoxy groups include, for example, methoxy, ethoxy, propoxy and the like. Typical non-hydrolysable groups which may comprise Y$^1$, Y$^2$ and Y$^3$ include, for example, alkyl, aryl or substituted alkyl groups such as, for example, methyl, ethyl, propyl, phenyl, tolyl, and the like.

Examples of suitable ethylenically unsaturated hydrolysable silane monomers include, for example, vinyl silanes such as vinyltrimethoxysilane, or vinyltriethoxysilane, and (meth)acrylate silanes such as, 3-(acryloyloxy)propyltrimethoxysilane, 3-(methacryloyloxy)propyltrimethoxysilane, 3-(acryloyloxy)propyltriethoxysilane, 3-(methacryloyloxy)propyltriethoxysilane, 3-(acryloyloxy)propyltripropoxysilane, 3-(methacryloyloxy)propyltripropoxysilane, {3-(acryloyloxy)propyl}methyldimethoxysilane, {3-(methacryloyloxy)propyl}methyldimethoxysilane, {3-(acryloyloxy)propyl}methyldiethoxysilane, {3-(methacryloyloxy)propyl}methyldiethoxysilane, {3-(acryloyloxy)propyl}methyldipropoxysilane, {3-(methacryloyloxy)propyl}methyldipropoxysilane, {4-(acryloyloxy)butyl}phenyldimethoxysilane, {4-(methacryloyloxy)butyl}phenyldimethoxysilane, {3-(acryloyloxy)propyl}phenyldiethoxysilane, {3-(methacryloyloxy)propyl}phenyldiethoxysilane, {3-(acryloyloxy)propyl}phenyldipropoxysilane, {3-(methacryloyloxy)propyl}phenyldipropoxysilane, {3-(acryloyloxy)propyl}dimethylmethoxysilane, {3-(methacryloyloxy)propyl}dimethylmethoxysilane, {3-(acryloyloxy)propyl}dimethylethoxysilane, {3-(methacryloyloxy)propyl}dimethylethoxysilane, {3-(acryloyloxy)propyl}phenylmethylmethoxysilane, {3-(methacryloyloxy)propyl}phenylmethylmethoxysilane, {3-(acryloyloxy)propyl}phenylmethylethoxysilane, and {3-(methacryloyloxy)propyl}phenylmethylethoxysilane.

Particularly useful is 3-(methacryloyloxy)propyltrimethoxysilane, commonly known as gamma-methacryloxypropyltrimethoxysilane or 3-(trimethoxysilyl)propylmethacrylate which is commercially available as SILQUEST A-174 from Crompton Corp.

Yet another class of elastomeric siloxane polymers are those prepared by the addition reaction (typically catalyzed by a metal catalyst such a platinum) between a siloxane having at least one vinyl group (—CH=CH$_2$) and a siloxane having at least one silyl hydride (—Si—H) group. In this reaction, the Si—H adds across the double bond to form new C—H and Si—C bonds. This process in described, for example, in PCT Publication No. WO 2000/068336 (Ko et al.), and PCT Publication Nos. WO 2004/111151 and WO 2006/003853 (Nakamura). In this disclosure, such siloxane polymers are referred to as ones containing cured vinyl linkages.

Yet another class of elastomeric siloxane polymers are those prepared by the cationic curing of epoxy-functional siloxanes by ring opening polymerization. The epoxy functional siloxanes may be of the traditional glycidyl ether-type, or epoxycyclohexyl-type. The epoxy groups may exist as a pendant group in the side chain of the polymer, or as a termination at the end of a polymer chain. Various molecular weights of said polymers can be used, in the range from 1000 to 1,000,000 g/mol. Epoxy-functional siloxanes are commercially available from a variety of sources. Momentive Corp (Waterford, N.Y.) sells a range of products in the SILFORCE line of products that are epoxy-functional. These include UV9315, UV9400, UV9430, UV9440E, UV9500. Evonik Corp (Essen, Germany) also sells epoxy-functional siloxanes. These include TEGO RC 1401, and TEGO RC 1412.

The epoxy-functional siloxanes are cationically cured to form siloxane elastomers. Typically the curing is effected through the use of a cationic initiator. Cationic initiators may be a type of onium salt. Suitable photoinitiators are the well-known onium salts. Examples of particularly suitable onium salts include diaryliodonium salts and bis-diaryl iodonium salts. Examples of suitable diaryliodonium salts are disclosed, for example, In U.S. Pat. No. 4,882,201. Commercially available cationic catalysts are available that have higher solubility in silicones. These include products produced by Momentive (UV 9380C and UV 9390C) listed as bis(4-dodecylphenyl)iodonium hexafluoroantimonate) and from the Evonik Corporation (Essen, Germany) (TEGO PHOTOCOMPOUND 1467) which is listed as compound (bis(4-alkylphenyl) iodonium hexafluoroantimonate.

The epoxy-functional siloxanes are cationically cured to form siloxane eleastomeric polymers. In this disclosure, such siloxane polymers are referred to as ones containing cured epoxy linkages.

In yet other embodiments, the elastomeric siloxane polymer is prepared from a linear material described by Formula III below, illustrating a siloxane backbone with aliphatic and/or aromatic substituents:

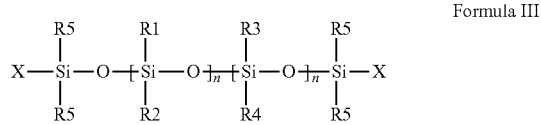

Formula III wherein R1, R2, R3, and R4 are independently selected from the group consisting of an alkyl group, or an aryl group, each R5 is an alkyl group, each X is a non-functional group, and n and m are integers, and at least one of m or n is not zero. By "non-functional" it is meant that the X groups do not engage in a polymerization reaction, and thus are non-functional for forming polymeric compositions. Typically X is an R5 group. In some embodiments, one or more of the alkyl or aryl groups may contain a halogen substituent, e.g., fluorine. For example, in some embodiments, one or more of the alkyl groups may be

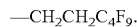

The polysiloxanes of Formula III can be used to prepare a wide range of elastomeric siloxane polymers. Methods from preparing gentle to the skin adhesives from non-functionalized polysiloxane materials have been described in US Patent Publication No. 2011/0212325 (Determan et al.). These materials are ones described by Formula III with X=R5, and ones described by Formula III where X=OH.

The materials where X=OH were considered to be "Non-functionalized materials" because the hydroxyl groups are not used as "functional groups", that is to say that the polymerization reaction does not involve reaction with the hydroxyl groups. These "non-functional materials" have been found to polymerize upon exposure to electron beam or gamma radiation to generate siloxane networks. This polymerization method is very general and has the advantage of not requiring catalysts or initiators.

In some embodiments, each X and R5 comprises a methyl group, i.e., the nonfunctionalized poly diorganosiloxane material is terminated by trimethylsiloxy groups. In other embodiments, each R5 is a methyl and each X is a hydroxyl, such that the nonfunctionalized poly diorganosiloxane material is terminated by dimethylsilanol groups. In some embodiments, R1 and R2 are alkyl groups and n is zero, i.e., the material is a poly(dialkylsiloxane). In some embodiments, the alkyl group is a methyl group, i.e., poly(dimethylsiloxane) ("PDMS"). In some embodiments, R1 is an alkyl group, R2 is an aryl group, and n is zero, i.e., the material is a poly(alkylarylsiloxane). In some embodiments, R1 is methyl group and R2 is a phenyl group, i.e., the material is poly(methylphenylsiloxane). In some embodiments, R1 and R2 are alkyl groups and R3 and R4 are aryl groups, i.e., the material is a poly(dialkyldiarylsiloxane). In some embodiments, R1 and R2 are methyl groups, and R3 and R4 are phenyl groups, i.e., the material is poly(dimethyldiphenylsiloxane).

In some embodiments, the nonfunctionalized poly diorganosiloxane materials may be branched. For example, one or more of the R1, R2, R3, and/or R4 groups may be a linear or branched siloxane with alkyl or aryl (including halogenated alkyl or aryl) substituents and terminal R5 groups.

The nonfunctionalized poly diorganosiloxane materials are cured to elastomeric siloxane networks by exposure to an electron beam (E-beam), gamma radiation, or a combination thereof. In some embodiments, the nonfunctionalized poly diorganosiloxane materials may be cured through exposure to E-beam irradiation. In some embodiments, the nonfunctionalized poly diorganosiloxane materials may be cured through exposure to gamma irradiation. In some embodiments, a combination of electron beam curing and gamma ray curing may be used. For example, in some embodiments, the nonfunctionalized poly diorganosiloxane materials may be partially cured by exposure to electron beam irradiation. Subsequently, the nonfunctionalized poly diorganosiloxane materials may be further cured by gamma irradiation.

A variety of procedures for E-beam and gamma ray curing are well-known. The cure depends on the specific equipment used, and those skilled in the art can define a dose calibration model for the specific equipment, geometry, and line speed, as well as other well understood process parameters.

Commercially available electron beam generating equipment is readily available. For the examples described herein, the radiation processing was performed on a Model CB-300 electron beam generating apparatus (available from Energy Sciences, Inc. (Wilmington, Mass.). Generally, a support film (e.g., polyester terephthalate support film) runs through a chamber. In some embodiments, a sample of uncured material with a liner (e.g., a fluorosilicone release liner) on both sides ("closed face") may be attached to the support film and conveyed at a fixed speed of about 6.1 meters/min (20 feet/min). In some embodiments, a sample of the uncured material may be applied to one liner, with no liner on the opposite surface ("open face"). Generally, the chamber is inerted (e.g., the oxygen-containing room air is replaced with an inert gas, e.g., nitrogen) while the samples are e-beam cured, particularly when open-face curing.

The uncured material may be exposed to E-beam irradiation from one side through a release liner or carrier film. For making a single layer laminating adhesive type tape, a single pass through the electron beam may be sufficient. Thicker samples, may exhibit a cure gradient through the cross section of the adhesive so that it may be desirable to expose the uncured material to electron beam radiation from both sides.

Commercially available gamma irradiation equipment includes equipment often used for gamma irradiation sterilization of products for medical applications. In some embodiments, such equipment may be used to cure, or partially cure the gentle to skin adhesives of the present disclosure.

The adhesive layer also includes at least one siloxane tackifying resin. Suitable siloxane tackifying resins include those resins composed of the following structural units M (i.e., monovalent $R'_3SiO_{1/2}$ units), D (i.e., divalent $R'_2SiO_{2/2}$ units), T (i.e., trivalent $R'SiO_{3/2}$ units), and Q (i.e., quaternary $SiO_{4/2}$ units), and combinations thereof. Typical exemplary siloxane resins include MQ siloxane tackifying resins, MQD siloxane tackifying resins, and MQT siloxane tackifying resins. These siloxane tackifying resins usually have a number average molecular weight in the range of 100 to 50,000 or in the range of 500 to 15,000 and generally have methyl R' groups.

MQ siloxane tackifying resins are copolymeric resins having $R'_3SiO_{1/2}$ units ("M" units) and $SiO_{4/2}$ units ("Q" units), where the M units are bonded to the Q units, each of which is bonded to at least one other Q unit. Some of the $SiO_{4/2}$ units ("Q" units) are bonded to hydroxyl radicals resulting in $HOSiO_{3/2}$ units ("$T^{OH}$" units), thereby accounting for the silicon-bonded hydroxyl content of the siloxane tackifying resin, and some are bonded only to other $SiO_{4/2}$ units.

Such resins are described in, for example, *Encyclopedia of Polymer Science and Engineering*, vol. 15, John Wiley & Sons, New York, (1989), pp. 265-270, and U.S. Pat. No. 2,676,182 (Daudt et al.), U.S. Pat. No. 3,627,851 (Brady), U.S. Pat. No. 3,772,247 (Flannigan), and U.S. Pat. No. 5,248,739 (Schmidt et al.). Other examples are disclosed in U.S. Pat. No. 5,082,706 (Tangney). The above-described resins are generally prepared in solvent. Dried or solventless, M siloxane tackifying resins can be prepared, as described in U.S. Pat. No. 5,319,040 (Wengrovius et al.), U.S. Pat. No. 5,302,685 (Tsumura et al.), and U.S. Pat. No. 4,935,484 (Wolfgruber et al.).

Certain MQ siloxane tackifying resins can be prepared by the silica hydrosol capping process described in U.S. Pat. No. 2,676,182 (Daudt et al.) as modified according to U.S. Pat. No. 3,627,851 (Brady), and U.S. Pat. No. 3,772,247 (Flannigan). These modified processes often include limiting the concentration of the sodium silicate solution, and/or the silicon-to-sodium ratio in the sodium silicate, and/or the time before capping the neutralized sodium silicate solution to generally lower values than those disclosed by Daudt et al. The neutralized silica hydrosol is often stabilized with an alcohol, such as 2-propanol, and capped with $R_3SiO_{1/2}$ siloxane units as soon as possible after being neutralized. The level of silicon bonded hydroxyl groups (i.e., silanol) on the MQ resin may be reduced to no greater than 1.5 weight percent, no greater than 1.2 weight percent, no greater than 1.0 weight percent, or no greater than 0.8 weight percent based on the weight of the siloxane tackifying resin. This may be accomplished, for example, by reacting hexamethyldisilazane with the siloxane tackifying resin. Such a reaction may be catalyzed, for example, with trifluoroacetic acid. Alternatively, trimethylchlorosilane or trimethylsilylacetamide may be reacted with the siloxane tackifying resin, a catalyst not being necessary in this case.

MQD silicone tackifying resins are terpolymers having $R'_3SiO_{1/2}$ units ("M" units), $SiO_{4/2}$ units ("Q" units), and $R'_2SiO_{2/2}$ units ("D" units) such as are taught in U.S. Pat. No. 2,736,721 (Dexter). In MQD silicone tackifying resins, some of the methyl R' groups of the $R'_2SiO_{2/2}$ units ("D" units) can be replaced with vinyl ($CH_2$=CH—) groups ("$D^{Vi}$" units).

MQT siloxane tackifying resins are terpolymers having $R'_3SiO_{1/2}$ units, $SiO_{4/2}$ units and $R'SiO_{3/2}$ units ("T" units) such as are taught in U.S. Pat. No. 5,110,890 (Butler) and Japanese Kokai HE 2-36234.

Suitable siloxane tackifying resins are commercially available from sources such as Dow Corning, Midland, Mich., General Electric Silicones Waterford, N.Y. and Rhodia Silicones, Rock Hill, S.C. Examples of particularly useful MQ siloxane tackifying resins include those available under the trade designations SR-545 and SR-1000, both of which are commercially available from GE Silicones, Waterford, N.Y. Such resins are generally supplied in organic solvent and may be employed as received. Blends of two or more siloxane resins can be included in the reactive mixtures of this disclosure.

Typically, if used, the siloxane tackifying resin is present in the adhesive layer in an amount of at least 20% by weight based upon the total weight of solids. In some embodiments, the amount of siloxane tackifying resin is present in amounts up to 50% by weight. In some embodiments the siloxane tackifying resin is present in even higher amounts up to 55% by weight or even up to 60% by weight.

The adhesive layer may also comprise a reactive filler. Reactive fillers are ones that react with one or more components in the adhesive layer. Particularly suitable reactive fillers are decomposition accelerators, which are described in detail below. The decomposition accelerators are alkaline compounds. Among the suitable alkaline compounds are metal hydroxides and metal amides. One particularly suitable reactive filler is cesium hydroxide.

In addition to the above components, the adhesive layer may additionally comprise one or more non-reactive additives. Any suitable additive can be used as long as it does interfere with the curing of the reactive components or adversely affect the properties of the cured pressure sensitive adhesive film or the ceramic-like layer formed by bake-out of the pressure sensitive adhesive film layer, such as the optical properties. Examples of suitable non-reactive additives include plasticizers, microparticle fillers, nanoparticle fillers, metal oxide fillers, bead fillers, glass bubbles, chopped fibers, antioxidants, viscosity control additives, refractive index modifying agents, or mixtures or combinations thereof.

The adhesive layer, while it may comprise a variety of different components as described above, typically contains the siloxane-based copolymer as a major component. In some embodiments, the siloxane-based copolymer comprises at least 50% by weight of the adhesive layer.

The adhesive layer may have a wide range of thicknesses depending upon a number of different factors, such as the desired thickness of the ceramic-like layer formed from the adhesive layer by calcination. Typically the adhesive layer has a thickness of from 10 micrometers to 100 micrometers.

In some embodiments, the adhesive layer has desirable optical properties. In some embodiments the adhesive layer, while a pressure sensitive adhesive layer, is optically transparent, or even optically clear. Optically transparent articles have a visible light transmittance of at least 90%, while optically clear articles have a visible light transmittance of at least 95% and a haze of less than 5%. Additionally, in some embodiments, the adhesive layer is optically transparent or even optically clear after bake-out to transform the adhesive layer to a ceramic-like layer.

In some embodiments, the adhesive layer has a structured surface. Typically the structured surface in the adhesive layer is formed by contacting a structured template layer to the adhesive surface. In many embodiments, the structured template layer is a structured release liner, that is to say a releasing substrate that contains a structured surface. A wide variety of patterns and shapes can be present in the surface of the structured surface of the release liner. The structures may have a wide variety of shapes and sizes. In general the structures are microstructures, meaning that they are microstructural features with at least 2 dimensions of the structures of microscopic size. The microstructural features may assume a variety of shapes. Representative examples include hemispheres, prisms (such as square prisms, rectangular prisms, cylindrical prisms and other similar polygonal features), pyramids, ellipses, grooves (e.g., V-grooves), channels, and the like. In general, it is desirable to include topographical features that promote air egress at the bonding interface when the adhesive layer is laminated to an adherend. In this regard, V-grooves and channels that extend to the edge of the article are particularly useful. The particular dimensions and patterns characterizing the microstructural features are selected based upon the specific application for which the article is intended.

Also disclosed herein are transfer tapes. The advantages of transfer tapes were discussed above. The transfer tapes of this disclosure are standalone double sided pressure sensitive adhesive films of the adhesive layers described above, and include a carrier layer (release substrate) and may comprise additional layers.

The transfer tapes comprise a release substrate with a first major surface and a second major surface, and an adhesive layer adjacent to at least a portion of the second major surface of the release substrate, the adhesive layer comprising at least one siloxane-based copolymer, and at least one siloxane tackifying resin, and where the adhesive layer is a pressure sensitive adhesive at room temperature and is convertible into a ceramic-like layer by bake-out at a temperature of from 100-500° C. The adhesive layer has been described in detail above.

Typically the transfer tape comprises at least one siloxane-based copolymer comprising polydiorganosiloxane segments with at least one linking group, where the linking group is selected from urea linkages, urethane linkages, oxamide linkages, cured (meth)acrylate linkages, or a combination thereof.

In some embodiments, the adhesive layer is in contact with the second major surface of the release substrate. In these embodiments, the transfer tape articles are simple articles including only the adhesive layer and the release substrate, and when the exposed adhesive surface of the transfer tape is adhered to a substrate and the release substrate is removed, the resulting laminate has only the adhesive layer adhered to the substrate surface.

Besides the adhesive layer, the transfer tape may also comprise additional layers. In some embodiments, the transfer tape further comprises a backfill layer such that the backfill layer is intermediate between the adhesive layer and the second major surface of the release substrate. Backfill layers are described in greater detail below. In these embodiments, the transfer tape articles are more complex articles, and when the exposed adhesive surface of the transfer tape is adhered to a substrate and the release substrate is removed, the resulting laminate comprises: backfill layer/adhesive layer/substrate. The backfill layer is a curable layer that is cured during the bake-out. As used herein, the term backfill can refer to the backfill layer either in its cured or its curable state. When the backfill layer is associated with the adhesive layer it is in the curable state, when the backfill layer is associated with the ceramic-like layer it is in the cured state.

A wide variety of releasing substrates are suitable. Typically the releasing substrate is a release liner or other film from which the adhesive layer can be readily removed. Exemplary release liners include those prepared from paper (e.g., Kraft paper) or polymeric material (e.g., polyolefins such as polyethylene or polypropylene, ethylene vinyl acetate, polyurethanes, polyesters such as polyethylene terephthalate, and the like, and combinations thereof). At least some release liners are coated with a layer of a release agent such as a silicone-containing material or a fluorocarbon-containing material. Exemplary release liners include, but are not limited to, liners commercially available from CP Film (Martinsville, Va.) under the trade designation "T-30" and "T-10" that have a silicone release coating on polyethylene terephthalate film. The pressure sensitive adhesive layer, once cured, is a free-standing film not requiring a releasing substrate, but it is often convenient to handle the film on a releasing substrate.

As mentioned above, the releasing substrate may comprise a structured surface, such that when the structured surface is in contact with the adhesive layer or the backfill layer covering the adhesive layer, it can impart a structured surface to the adhesive layer or the backfill layer.

A wide range of release liners with a structured pattern present on its surface (frequently called microstructured release liners) are suitable. Typically the microstructured release liners are prepared by embossing. This means that the release liner has an embossable surface which is contacted to a structured tool with the application of pressure and/or heat to form an embossed surface. This embossed surface is a structured surface. The structure on the embossed surface is the inverse of the structure on the tool surface, that is to say a protrusion on the tool surface will form a depression on the embossed surface, and a depression on the tool surface will form a protrusion on the embossed surface.

Backfill layers, and optional sacrificial layers which are described in more detail below, are used in a variety of optical articles and are described in, for example, US Patent Publication No. 2014/0021492 (Wolk et al.). The backfill layer is a curable, thermally stable layer, such that the bake-out process cures the backfill layer. Materials that may be used for the thermally stable backfill include polysiloxane resins, polysilazanes, polyimides, silsesquioxanes of bridge or ladder-type, silicones, and silicone hybrid materials and many others. These molecules typically have an inorganic core which leads to high thermal stability, mechanical strength, and chemical resistance, and an organic shell that helps with solubility and reactivity. There are many commercial sources of these materials, which are summarized in Table A below.

Different varieties of the above materials can be synthesized with higher refractive index by incorporating nanoparticles or metal oxide precursors in with the polymer resin. Silecs SC850 material is a modified silsesquioxane (n≈1.85).

Other materials include a copolymer of methyltrimethoxysilane (MTMS) and bistriethoxysilylethane (BTSE) (Ro et. al, Adv. Mater. 2007, 19, 705-710). This synthesis forms readily soluble polymers with very small, bridged cyclic cages of silsesquioxane. This more flexible structure leads to increased packing density and mechanical strength of the coating. The ratio of these copolymers can be tuned for very low coefficient of thermal expansion, low porosity and high modulus.

TABLE A

Thermally stable mold materials of both low and high refractive index

| Material Name or Trade Designation | Type | Available from |
|---|---|---|
| TecheGlas GRx resins | T-resin (methyl silsesquioxane) | TechneGlas (Perrysburg, Ohio) |
| HSG-510 | T-resin (methyl silsesquioxane) | Hitachi Chemical (Tokyo, Japan) |
| ACCUGLASS 211 | T-Q resin (methyl silsesquioxane) | Honeywell (Tempe, AZ) |
| Hardsil AM | silica nanocomposite | Gelest Inc (Morrisville, PA) |
| MTMS-BTSE Copolymer (Ro et. al, Adv. Mater. 2007, 19, 705-710) | bridged silsesquioxane | National Institute of Standards and Technology (Gaithersburg, MD) |
| PermaNew6000 | silica-filled methyl-polysiloxane polymer containing a latent heat-cure catalyst system | California Hardcoat (Chula Vista, CA) |
| FOX Flowable OXide | Hydrogen Silsesquioxane | Dow Corning (Midland, MI) |
| Ormocer, Ormoclad, Ormocore | silicone hybrid | Micro Resist GmBH (Berlin, Germany) |
| Silecs SCx resins | silicone hybrid (n = 1.85) | Silecs Oy (Espoo, Finland) |
| Ceraset resins | polysilazanes | KiON Specialty Polymers (Charlotte, NC) |
| Bolton metals | low melting metal | Bolton Metal Products (Bellafonte, PA) |

In many embodiments the backfill layer consists of highly branched organosilicon oligomers and polymers of a general formula:

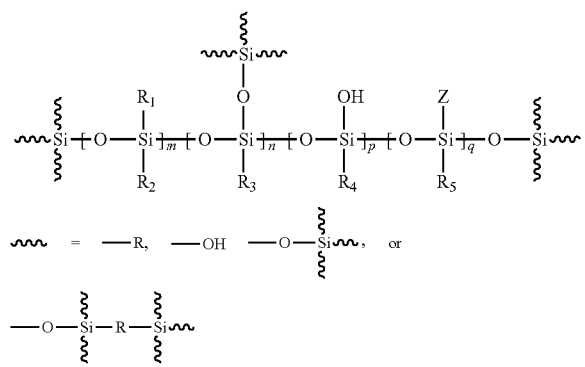

$R_1$ is selected from hydrogen, substituted or unsubstituted $C_1$-$C_{20}$ alkyl, substituted or unsubstituted $C_2$-$C_{10}$ alkylene, substituted or unsubstituted $C_2$-$C_{20}$ alkenylene, $C_2$-$C_{20}$ alkynylene, substituted or unsubstituted $C_3$-$C_{20}$ cycloalkyl, substituted or unsubstituted $C_6$-$C_{20}$ aryl, substituted or unsubstituted $C_6$-$C_{20}$ arylene, a substituted or unsubstituted $C_7$ to $C_{20}$ arylalkyl group, a substituted or unsubstituted $C_1$ to $C_{20}$ heteroalkyl group, a substituted or unsubstituted $C_2$ to $C_{20}$ heterocycloalkyl group, and/or combinations of these;

$R_2$ is selected from hydrogen, substituted or unsubstituted $C_1$-$C_{20}$ alkyl, substituted or unsubstituted $C_2$-$C_{10}$ alkylene, substituted or unsubstituted $C_2$-$C_{20}$ alkenylene, $C_2$-$C_{20}$ alkynylene, substituted or unsubstituted $C_3$-$C_{20}$ cycloalkyl, substituted or unsubstituted $C_6$-$C_{20}$ aryl, substituted or unsubstituted $C_6$-$C_{20}$ arylene, a substituted or unsubstituted $C_7$ to $C_{20}$ arylalkyl group, a substituted or unsubstituted $C_1$ to $C_{20}$ heteroalkyl group, a substituted or unsubstituted $C_2$ to $C_{20}$ heterocycloalkyl group, and/or combinations of these;

$R_3$ is selected from hydrogen, substituted or unsubstituted $C_1$-$C_{20}$ alkyl, substituted or unsubstituted $C_2$-$C_{10}$ alkylene, substituted or unsubstituted $C_2$-$C_{20}$ alkenylene, $C_2$-$C_{20}$ alkynylene, substituted or unsubstituted $C_3$-$C_{20}$ cycloalkyl, substituted or unsubstituted $C_6$-$C_{20}$ aryl, substituted or unsubstituted $C_6$-$C_{20}$ arylene, a substituted or unsubstituted $C_7$ to $C_{20}$ arylalkyl group, a substituted or unsubstituted $C_1$ to $C_{20}$ heteroalkyl group, a substituted or unsubstituted $C_2$ to $C_{20}$ heterocycloalkyl group, and/or combinations of these;

$R_4$ is selected from hydrogen, substituted or unsubstituted $C_1$-$C_{20}$ alkyl, substituted or unsubstituted $C_2$-$C_{10}$ alkylene, substituted or unsubstituted $C_2$-$C_{20}$ alkenylene, $C_2$-$C_{20}$ alkynylene, substituted or unsubstituted $C_3$-$C_{20}$ cycloalkyl, substituted or unsubstituted $C_6$-$C_{20}$ aryl, substituted or unsubstituted $C_6$-$C_{20}$ arylene, a substituted or unsubstituted $C_7$ to $C_{20}$ arylalkyl group, a substituted or unsubstituted $C_1$ to $C_{20}$ heteroalkyl group, a substituted or unsubstituted $C_2$ to $C_{20}$ heterocycloalkyl group, and/or combinations of these;

$R_5$ is selected from hydrogen, substituted or unsubstituted $C_1$-$C_{20}$ alkyl, substituted or unsubstituted $C_2$-$C_{10}$ alkylene, substituted or unsubstituted $C_2$-$C_{20}$ alkenylene, $C_2$-$C_{20}$ alkynylene, substituted or unsubstituted $C_3$-$C_{20}$ cycloalkyl, substituted or unsubstituted $C_6$-$C_{20}$ aryl, substituted or unsubstituted $C_6$-$C_{20}$ arylene, a substituted or unsubstituted $C_7$ to $C_{20}$ arylalkyl group, a substituted or unsubstituted $C_1$ to $C_{20}$ heteroalkyl group, a substituted or unsubstituted $C_2$ to $C_{20}$ heterocycloalkyl group, and/or combinations of these;

Z is a hydrolyzable group, such as halogen (containing the elements F, Br, Cl, or I), $C_1$-$C_{20}$ alkoxy, $C_1$-$C_{20}$ aryloxy, and/or combinations of these.

m is an integer from 0 to 500;
n is an integer from 1 to 500;
p is an integer from 0 to 500;
q is an integer from 0 to 100.

As used herein, the term "substituted" refers to one substituted with at least a substituent selected from the group consisting of a halogen (containing the elements F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, alkyl group, a $C_2$ to $C_{20}$ alkenyl group, a $C_2$ to $C_{20}$ alkynyl group, $C_6$ to $C_{30}$ aryl group, a $C_7$ to $C_{13}$ arylalkyl group, a $C_1$ to $C_4$ oxyalkyl group, a $C_1$ to $C_{20}$ heteroalkyl group, a $C_3$ to $C_{20}$ heteroarylalkyl group, a $C_3$ to $C_{30}$ cycloalkyl group, a $C_3$ to $C_{15}$ cycloalkenyl group, a $C_6$ to $C_{15}$ cycloalkynyl group, a heterocycloalkyl group, and a combination thereof, instead of hydrogen of a compound.

The resulting highly branched organosilicon polymer has a molecular weight in a range from 150 to 300,000 Da or preferably in a range from 150 to 30,000 Da.

Generally, the thermally stable backfill contains the reaction product of the hydrolysis and condensation of a methyltriethoxysilane precursor in a polar solvent. After synthesis, the resulting polymer preferably has a molecular weight of nominally less than 30,000 Da. The thermally stable backfill solution also preferably includes less than fifty percent by weight silica nanoparticles nominally of a size between 10-50 nanometers.

The thermally stable compositions described herein preferably comprise inorganic nanoparticles. These nanoparticles can be of various sizes and shapes. The nanoparticles can have an average particle diameter less than about 1000 nm, less than about 100 nm, less than about 50 nm, or from about 3 nm to about 50 nm. The nanoparticles can have an average particle diameter from about 3 nm to about 50 nm, or from about 3 nm to about 35 nm, or from about 5 nm to about 25 nm. If the nanoparticles are aggregated, the maximum cross sectional dimension of the aggregated particle can be within any of these ranges, and can also be greater than about 100 nm. "Fumed" nanoparticles, such as silica and alumina, with primary size less than about 50 nm, may also be used, such as CAB-OSPERSE PG 002 fumed silica, CAB-O-SPERSE 2017A fumed silica, and CAB-OSPERSE PG 003 fumed alumina, available from Cabot Co. Boston, Mass. Their measurements can be based on transmission electron microscopy (TEM). Nanoparticles can be substantially fully condensed. Fully condensed nanoparticles, such as the colloidal silicas, typically have substantially no hydroxyls in their interiors. Non-silica containing fully condensed nanoparticles typically have a degree of crystallinity (measured as isolated particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index. Various shapes of the inorganic or organic nanoparticles may be used, such as sphere, rod, sheet, tube, wire, cube, cone, tetrahedron, and the like.

The size of the particles is generally chosen to avoid significant visible light scattering in the final article. The nanomaterial selected can impart various optical properties (i.e refractive index, birefringence), electrical properties (e.g conductivity), mechanical properties (e.g toughness, pencil hardness, scratch resistance) or a combination of these properties. It may be desirable to use a mix of organic and inorganic oxide particle types to optimize an optical or material property and to lower total composition cost.

Examples of suitable inorganic nanoparticles include metal nanoparticles or their respective oxides, including the elements zirconium (Zr), titanium (Ti), hafnium (Hf), aluminum (Al), iron (Fe), vanadium (V), antimony (Sb), tin (Sn), gold (Au), copper (Cu), gallium (Ga), indium (In), chromium (Cr), manganese (Mn), cobalt (Co), nickel (Ni), zinc (Zn), yttrium (Y), niobium (Nb), molybdenum (Mo), technetium (Te), ruthenium (Ru), rhodium (Rh), palladium (Pd), silver (Ag), cadmium (Cd), lanthanum (La), tantalum (Ta), tungsten (W), rhenium (Rh), osmium (Os), iridium (Ir), platinum (Pt), and any combinations thereof.

In a preferred embodiment, nanoparticles of zirconium oxide (zirconia) are used. Zirconia nanoparticles can have a particle size from approximately 5 nm to 50 nm, or 5 nm to 15 nm, or 10 nm. Zirconia nanoparticles can be present in the durable article or optical element in an amount from 10 to 70 wt %, or 30 to 50 wt %. Zirconias for use in materials of the invention are commercially available from Nalco Chemical Co. (Naperville, Ill.) under the product designation NALCO OOSSOO8 and from Buhler AG Uzwil, 20 Switzerland under the trade designation "Buhler zirconia Z—WO sol". Zirconia nanoparticle can also be prepared such as described in U.S. Pat. No. 7,241,437 (Davidson et al.) and U.S. Pat. No. 6,376,590 (Kolb et al.). Titania, antimony oxides, alumina, tin oxides, and/or mixed metal oxide nanoparticles can be present in the durable article or optical element in an amount from 10 to 70 wt %, or 30 to 50 wt %. Densified ceramic oxide layers may be formed via a "sol-gel" process, in which ceramic oxide particles are incorporated into a gelled dispersion with a precursor of at least one modifying component followed by dehydration and firing, as described in U.S. Pat. No. 5,453,104 (Schwabel). Mixed metal oxide for use in materials of the invention are commercially available from Catalysts & Chemical Industries Corp., (Kawasaki, Japan) under the product designation OPTOLAKE.

Other examples of suitable inorganic nanoparticles include elements and alloys known as semiconductors and their respective oxides such as silicon (Si), germanium (Ge), silicon carbide (SiC), silicon germanide (SiGe), aluminium nitride (AlN), aluminium phosphide (AlP), boron nitride (BN), boron carbide ($B_4C$), gallium antimonide (GaSb), indium phosphide (InP), gallium arsenide nitride (GaAsN), gallium arsenide phosphide (GaAsP), indium aluminum arsenide nitride (InAlAsN), zinc oxide (ZnO), zinc selenide (ZnSe), zinc sulfide (ZnS), zinc telluride (ZnTe), mercury zinc selenide (HgZnSe), lead sulfide (PbS), lead telluride (PbTe), tin sulfide (SnS), lead tin telluride (PbSnTe), thallium tin telluride ($Tl_2SnTe_5$), zinc phosphide ($Zn_3P_2$), zinc arsenide ($Zn_3As_2$), zinc antimonide ($Zn_3Sb_2$), lead(II) iodide ($PbI_2$), copper(I) oxide ($Cu_2O$).

Silicon dioxide (silica) nanoparticles can have a particle size from 5 nm to 75 nm or 10 nm to 30 nm or 20 nm. Silica nanoparticles are typically in an amount from 10 to 60 wt.-%. Typically the amount of silica is less than 40 wt %. Suitable silicas are commercially available from Nalco Chemical Co. (Naperville, Ill.) under the trade designation NALCO COLLOIDAL SILICAS. For example, silicas 10 include NALCO trade designations 1040, 1042, 1050, 1060, 2327 and 2329. the organosilica under the product name IPA-ST-MS, IPA-ST-L, IPA-ST, IPA-ST-UP, MA-ST-M, and MAST sols from Nissan Chemical America Co. Houston, Tex. and the SNOWTEX ST-40, ST-50, ST-20L, ST-C, ST-N, ST-O, ST-OL, ST-ZL, ST-UP, and ST-OUP, also from Nissan Chemical America Co. Houston, Tex. Suitable fumed silicas include for example, products sold under the tradename, AEROSIL series OX-50, -130, -150, and -200 available from DeGussa AG, (Hanau, Germany), and CAB-O-SPERSE 2095, CAB-O-SPERSE A105, CAB-O-SIL M5 available from Cabot Corp. (Tuscola, The weight ratio of polymerizable material to nanoparticles can range from about 30:70, 40:60, 50:50, 55:45, 60:40, 70:30, 80:20 or 90:10 or more. The preferred ranges of weight percent of nanoparticles range from about 10 wt % to about 60% by weight, and can depend on the density and size of the nanoparticle used.

Within the class of semiconductors include nanoparticles known as "quantum dots," which have interesting electronic and optical properties that can be used in a range of applications. Quantum dots can be produced from binary alloys such as cadmium selenide, cadmium sulfide, indium arsenide, and indium phosphide, or from ternary alloys such as cadmium selenide sulfide, and the like. Companies that sell quantum dots include Nanoco Technologies (Manchester, UK) and Nanosys (Palo Alto, Calif.).

Examples of suitable inorganic nanoparticles include elements known as rare earth elements and their oxides, such as lanthanum (La), cerium ($CeO_2$), praseodymium ($Pr_6O_{11}$), neodymium ($Nd_2O_3$), samarium ($Sm_2O_3$), europium ($Eu_2O_3$), gadolinium ($Gd_2O_3$), terbium ($Tb_4O_7$), dysprosium ($Dy_2O_3$), holmium ($Ho_2O_3$), erbium ($Er_2O_3$), thulium ($Tm_2O_3$), ytterbium ($Yb_2O_3$) and lutetium ($Lu_2O_3$). Additionally, phosphorecent materials known as "phosphors" may be included in the thermally stable backfill material. These may include calcium sulfide with strontium sulfide with bismuth as an activator ($Ca_xSr$)S:Bi, Zinc sulfide with copper "GS phosphor", mixtures of zinc sulfide and cadmium sulfide, strontium aluminate activated by Europium ($SrAl_2O_4$:Eu(II):Dy(III)), $BaMgAl_{10}O_{17}$:$Eu^{2+}$ (BAM), $Y_2O_3$:Eu, doped ortho-silicates, Yttrium aluminium garnet (YAG) and Lutetium aluminium garnet (LuAG) containing materials, any combinations thereof, and the like. A commercial example a phosphor may include one of the ISIPHO inorganic phosphors (available from Merck KGaA, Darmstadt, Germany).

The nanoparticles are typically treated with a surface treatment agent. Surface-treating the nano-sized particles can provide a stable dispersion in the polymeric resin. Preferably, the surface-treatment stabilizes the nanoparticles so that the particles will be well dispersed in a substantially homogeneous composition. Furthermore, the nanoparticles can be modified over at least a portion of its surface with a surface treatment agent so that the stabilized particle can copolymerize or react with the parts of the composition during curing. In general, a surface treatment agent has a first end that will attach to the particle surface (covalently, ionically or through strong physisorption) and a second end that imparts compatibility of the particle with the composition and/or reacts with resin during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other for siliceous fillers. Silanes and carboxylic acids are preferred for metal oxides such as zirconia. The surface modification can be done either subsequent to mixing with the monomers or after mixing. It is preferred in the case of silanes to react the silanes with the particle or nanoparticle surface before incorporation into the composition. The required amount of surface modifier is dependent upon several factors such particle size, particle type, modifier molecular weight, and modifier type. In general it is preferred that approximately a monolayer of modifier is attached to the surface of the particle. The attachment procedure or reaction conditions required also depend on the surface modifier used. For silanes, it is preferred to surface treat at elevated temperatures under acidic or basic conditions for from 1-24 hr approximately. Surface treatment agents such as carboxylic acids may not require elevated temperatures or extended time.

Representative embodiments of surface treatment agents suitable for the compositions include compounds such as, for example, isooctyl trimethoxy-silane, N-(3-triethoxysilylpropyl) methoxyethoxyethoxyethyl carbamate ($PEG_3TES$), N-(3-triethoxysilylpropyl) methoxyethoxyethoxyethyl carbamate ($PEG_2TES$), 3-(methacryloyloxy)propyltrimethoxysilane, 3-acryloxypropyltrimethoxysilane, 3-(methacryloyloxy)propyltriethoxysilane, 3-(methacryloyloxy) propylmethyldimethoxysilane, 3-(acryloyloxypropyl)methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy) silane, styrylethyltrimethoxysilane, mercaptopropyltrimethoxysilane, 3-5 glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate, 2-(2-methoxyethoxy)acetic acid, methoxyphenyl acetic acid, and mixtures thereof. Further, a proprietary silane surface modifier, commercially available from OSI Specialties, Crompton South Charleston, W. Va. under the trade designation "Silquest A1230", has been found particularly suitable.

In some embodiments, the thermally stable molecular species includes a metal, metal oxide or metal oxide precursor. Metal oxide precursors may be used in order to act as an amorphous "binder" for inorganic nanoparticles, or they may be used alone. Sol-gel techniques may be used to react these precursors in order to cure the material into a solid mass and are known to those skilled in the art. Suitable metal oxide precursors include alkyl titanates such as titanium (IV) butoxide, n-propyl titanate, titanium triethanolamine, titanium phosphate glycol, 2-ethylhexyl titanate, titanium (IV) ethoxide, titanium (IV) isopropoxide, and the like. These are commercially available under the "TYZOR" trade name owned by Dorf-Ketal Inc. (Houston, Tex.). Also suitable metal oxide precursors include zirconium chloride or zirconium(IV) alkoxides such as zirconium (IV) acrylate, zirconium(IV) tetraisopropoxide, zirconium(IV) tetraethoxide, zirconium(IV) tetrabutoxide, and the like, all available from Aldrich (St. Louis, Mo.). Also suitable metal oxide precursors include hafnium(IV) chloride or hafnium alkoxides such as hafnium(IV) carboxyethyl acrylate, hafnium (IV) tetraisopropoxide, hafnium(IV) tert-butoxide, hafnium (IV) n-butoxide, also available from Aldrich (St. Louis, Mo.).

In some embodiments, the backfill layer comprises a curable silsesquioxane transfer film. The backfill layer may be a structured or an unstructured layer depending upon the nature of the article that one wishes to prepare. The backfill layer, as described above, cures when the adhesive layer is baked-out.

Besides the adhesive layer and the optional thermally stable backfill layer, the articles may also comprise a sacrificial layer. The sacrificial layer is a material layer that is removed during bake-out, in contrast with the backfill layer, which is thermally stable and thus is not removed during the bake-out. Examples of sacrificial layers are releasing substrates or layers on releasing substrates that remain affixed to the adhesive layer but upon bake-out are removed. Such material layers can provide a template layer for structured adhesive surfaces such that the structured surfaces remain protected and supported going into the bake-out process. One can view the sacrificial layers as removable scaffolding which support the structured surface until the bake-out step and in the bake-out step are removed.

The sacrificial layer if used, can comprise any material as long as the desired properties are obtained. Generally, the sacrificial layer is made from a polymerizable composition comprising polymers having number average molecular weights of about 1,000 Da or less (e.g., monomers and oligomers). Particularly suitable monomers or oligomers have molecular weights of about 500 Da or less, and even more particularly suitable polymerizable molecules have molecular weights of about 200 Da or less. The polymerizable compositions are typically cured using actinic radiation, e.g., visible light, ultraviolet radiation, electron beam radiation, heat and combinations thereof, or any of a variety of conventional anionic, cationic, free radical or other polymerization techniques, which can be photochemically or thermally initiated.

Useful polymerizable compositions for forming sacrificial layers comprise curable functional groups known in the art, such as epoxide groups, allyloxy groups, (meth)acrylate groups, epoxide, vinyl, hydroxyl, acetoxy, carboxylic acid, amino, phenolic, aldehyde, cinnamate, alkene, alkyne, ethylenically unsaturated groups, vinyl ether groups, and any derivatives and any chemically compatible combinations thereof.

The polymerizable composition used to prepare the sacrificial template layer may be monofunctional or multifunctional (e.g, di-, tri-, and tetra-) in terms of radiation curable moieties. Examples of suitable monofunctional polymerizable precursors include styrene, alpha-methyl styrene, substituted styrene, vinyl esters, vinyl ethers, octyl (meth) acrylate, nonylphenol ethoxylate (meth)acrylate, isobornyl (meth)acrylate, isononyl (meth)acrylate, 2-(2-ethoxyethoxy) ethyl (meth)acrylate, 2-ethylhexyl (meth)acrylate, lauryl (meth)acrylate, beta-carboxyethyl (meth)acrylate, isobutyl (meth)acrylate, cycloaliphatic epoxide, alpha-epoxide, 2-hydroxyethyl (meth)acrylate, isodecyl (meth)acrylate, dodecyl (meth)acrylate, n-butyl (meth)acrylate, methyl (meth)acrylate, hexyl (meth)acrylate, (meth)acrylic acid, N-vinylcaprolactam, stearyl (meth)acrylate, hydroxyl functional caprolactone ester (meth)acrylate, isooctyl (meth)acrylate, hydroxyethyl (meth)acrylate, hydroxypropyl (meth)acrylate, hydroxyisopropyl (meth)acrylate, hydroxybutyl (meth) acrylate, hydroxyisobutyl (meth)acrylate, tetrahydrofuryl (meth)acrylate, and any combinations thereof.

Examples of suitable multifunctional polymerizable precursors include ethyl glycol di(meth)acrylate, hexanediol di(meth)acrylate, triethylene glycol di(meth)acrylate, tetraethylene glycol di(meth)acrylate, trimethylolpropane tri (meth)acrylate, trimethylolpropanepropane tri(meth)acrylate, glycerol tri(meth)acrylate, pentaerythritol tri(meth) acrylate, pentaerythritol tetra(meth)acrylate, neopentyl glycol di(meth)acrylate, bisphenol A di(meth)acrylate, poly (1,4-butanediol) di(meth)acrylate, any substituted, ethoxylated or propoxylated versions of the materials listed above, or any combinations thereof.

The polymerization reactions generally lead to the formation of a three-dimensional "crosslinked" macromolecular network and are also known in the art as negative-tone photoresists, as reviewed by Shaw et al., "Negative photoresists for optical lithography," IBM Journal of Research and Development (1997) 41, 81-94. The formation of the network may occur through either covalent, ionic, or hydrogen bonding, or through physical crosslinking mechanisms such as chain entanglement. The reactions can also be initiated through one or more intermediate species, such as free-radical generating photoinitiators, photosensitizers, photoacid generators, photobase generators, or thermal acid generators. The type of curing agent used depends on the polymerizable precursor used and on the wavelength of the radiation used to cure the polymerizable precursor. Examples of suitable commercially available free-radical generating photoinitiators include benzophenone, benzoin ether, and acylphosphine photoinitiators, such as those sold under the trade designations "IRGACURE" and "DAROCUR" from Ciba Specialty Chemicals, Tarrytown, N.Y. Other exemplary photoinitiators include 2,2-dimethoxy-2-phenylacetophenone (DMPAP), 2,2-dimethoxyacetophenone (DMAP), xanthone, and thioxanthone.

Co-initiators and amine synergists may also be included to improve curing rates. Suitable concentrations of the curing agent in the crosslinking matrix range from about 1 wt. % to about 10 wt. %, with particularly suitable concentrations ranging from about 1 wt. % to about 5 wt. %, based on the entire weight of the polymerizable precursor. The polymerizable precursor may also include optional additives, such as heat stabilizers, ultraviolet light stabilizers, free-radical scavengers, and combinations thereof. Examples of suitable commercially available ultraviolet light stabilizers include benzophenone-type ultraviolet absorbers, which are available under the trade designation "UVINOL 400" from BASF Corp., Parsippany, N.J.; under the trade designation "CYASORB UV-1164" from Cytec Industries, West Patterson, N.J.; and under the trade designations "TINUVIN 900," "TINUVIN 123" and "TINUVIN 1130" from Ciba Specialty chemicals, Tarrytown, N.Y. Examples of suitable concentrations of ultraviolet light stabilizers in the polymerizable precursor range from about 0.1 wt. % to about 10 wt. %, with particularly suitable total concentrations ranging from about 1 wt. % to about 5 wt. %, relative to the entire weight of the polymerizable precursor.

Examples of suitable free-radical scavengers include hindered amine light stabilizer (HALS) compounds, hydroxylamines, sterically hindered phenols, and combinations thereof. Examples of suitable commercially available HALS compounds include the trade designated "TINUVIN 292" from Ciba Specialty Chemicals, Tarrytown, N.Y., and the trade designated "CYASORB UV-24" from Cytec Industries, West Patterson, N.J. Examples of suitable concentrations of free radical scavengers in the polymerizable precursor range from about 0.05 wt. % to about 0.25 wt. %.

Patterned structured template layers can be formed by depositing a layer of a radiation curable composition onto one surface of a radiation transmissive carrier to provide a layer having an exposed surface, contacting a master with a preformed surface bearing a pattern capable of imparting a three-dimensional structure of precisely shaped and located interactive functional discontinuities including distal surface portions and adjacent depressed surface portions into the exposed surface of the layer of radiation curable composition on said carrier under sufficient contact pressure to impart said pattern into said layer, exposing said curable composition to a sufficient level of radiation through the carrier to cure said composition while the layer of radiation curable composition is in contact with the patterned surface of the master. This cast and cure process can be done in a continuous manner using a roll of carrier, depositing a layer of curable material onto the carrier, laminating the curable material against a master and curing the curable material using actinic radiation. The resulting roll of carrier with a patterned, structured template disposed thereon can then be rolled up. This method is disclosed, for example, in U.S. Pat. No. 6,858,253 (Williams et al.).

Other materials that may be used for the sacrificial layer include, polyvinyl alcohol (PVA), ethylcellulose, methylcellulose, polynorbornenes, poly(methylmethacrylate (PMMA), poly(vinylbutyral), poly(cyclohexene carbonate), poly(cyclohexene propylene) carbonate, poly(ethylene carbonate), poly(propylene carbonate) and other aliphatic polycarbonates, and any copolymer or blends thereof, and other materials described in chapter 2, section 2.4 "Binders" of R. E. Mistler, E. R. Twiname, Tape Casting: Theory and Practice, American Ceramic Society, 2000. There are many commercial sources for these materials. These materials are typically easy to remove via dissolution or thermal decomposition via pyrolysis or combustion. Thermal heating is typically part of many manufacturing processes and thus removal of the sacrificial material may be accomplished during an existing heating step. For this reason, thermal decomposition via pyrolysis or combustion is a more preferred method of removal.

There are several properties that are desirable in the sacrificial materials. The material should be capable of being coated onto a substrate via extrusion, knife coating, solvent coating, cast and cure, or other typical coating methods. It is desirable that the material be a solid at room temperature. For thermoplastic sacrificial materials, it is desirable that the glass transition temperature (Tg) is low enough to allow it to be embossed by a heated tool. Thus, it generally the sacrificial material have a Tg above 25° C., more typically above 40° C. or even above 90° C.

Another material property that is desired for the sacrificial material is that its decomposition temperature be above the curing temperature of the backfill material(s). Once the backfill material is cured, the structured layer is permanently formed and the sacrificial template layer can be removed via any one of the methods listed above. Materials that thermally decompose with low ash or low total residue are preferred over those that have higher residuals. Residue left behind on a substrate may adversely impact electrical and/or optical properties such as the conductivity, transparency or color of the final product. Since it is desirable to minimize any changes to these properties in the final product, residual levels of less than 1000 ppm are desired. Residuals levels of less than 500 ppm are more desirable and residual level below 50 ppm are most desired.

The term "cleanly baked-out" means that the sacrificial layer can be removed by pyrolysis or combustion without leaving a substantial amount of residual material such as ash. Examples of preferred residual levels are provided above, although different residual levels can be used depending upon a particular application.

The sacrificial layer is an optional layer and can be added if desired but typically with the compositions of this disclosure, the sacrificial layer is not necessary.

Also disclosed herein are multilayer articles that can be prepared from the transfer tapes described above. The multilayer articles comprise a receptor substrate comprising a first major surface and a second major surface, and a ceramic-like layer in contact with the second major surface of the receptor substrate. The ceramic-like layer comprises baked-out pressure sensitive adhesive layer that has been baked-out at a temperature of from 100-500° C. The pressure sensitive adhesive layer comprises at least one siloxane-based copolymer, and at least one siloxane tackifying resin. Suitable pressure sensitive adhesive layers are described in detail above. The pressure sensitive adhesive layer may also include additional optional additives, as are described above.

Typically the adhesive layer comprises at least one siloxane-based copolymer comprising polydiorganosiloxane segments with at least one linking group, where the linking group is selected from urea linkages, urethane linkages, oxamide linkages, cured (meth)acrylate linkages, or a combination thereof. Suitable adhesive layers are described in detail above.

In some embodiments the multilayer article also includes a backfill layer. This article has the configuration: backfill layer/ceramic-like layer/receptor substrate. Thus the backfill layer is located on the ceramic-like layer and is a cured layer that cures during the bake-out process. The exposed surface of the backfill layer may be a structured surface. Suitable backfill layers are described in detail above.

A wide array of receptor substrates are suitable for the multilayer articles of this disclosure. Examples of receptor substrates include glass such as display mother glass, lighting mother glass, architectural glass, roll glass, and flexible glass. An example of flexible roll glass is the WILLOW glass product from Corning Incorporated. Other examples of receptor substrates includes metals such as metal sheets and foils. Yet other examples of receptor substrates include sapphire, silicon, silica, silicon carbide, silicon nitride, and semiconductor materials on a support wafer. The receptor substrate may be coated with a primer layer to modify the surface energy of the substrate to allow for better wetting of the adhesive. Examples of primer layers may include ethylenically unsaturated silanes such as 3-(meth)acryloxypropyltrimethoxysilane, and the like.

In some embodiments, particularly those in which a decomposition accelerator is added to the adhesive layer such that decreased temperature and/or time can be used for bake-out, or in instances where flash bake-out processes are used, the receptor substrate may include ones that are less thermally robust than those listed above. Examples of such receptor substrates include optical films such as those prepared from polyesters and polyimides.

In some embodiments, the multilayer article comprises a first receptor substrate, pressure sensitive adhesive layer, and release substrate. Such articles can be prepared by laminating a transfer tape as described above to the first receptor substrate. Other embodiments of the multilayer article comprise a first receptor substrate, pressure sensitive adhesive layer, and backfill layer. In these embodiments, the backfill layer can be a component of the transfer tape (i.e. the backfill layer is in contact with the pressure sensitive adhesive layer prior to contact with the first receptor substrate). In other embodiments, the backfill layer can be contacted to the pressure sensitive adhesive layer after the release substrate is removed and prior to the bake-out.

Yet other embodiments of the multilayer article comprise a first receptor substrate, pressure sensitive adhesive layer, and a second receptor substrate. The second receptor substrate is contacted to the pressure sensitive adhesive prior to bake-out, and one of the advantages of the pre-ceramic-like layer having pressure sensitive adhesive properties is that the lamination thus formed holds together both prior to and after bake-out. The second receptor substrate may be any of the receptor substrates described above. The first and second receptor substrates may be the same or they may be different.

In yet another embodiment of the multilayer article is one which comprises a first receptor substrate, pressure sensitive adhesive layer, and a second adhesive layer. The second adhesive layer may be the same composition as the pressure sensitive adhesive layer, or the second adhesive layer may have a different composition than the pressure sensitive adhesive layer. The second adhesive layer, like the pressure sensitive adhesive layer, bakes-out to form a ceramic-like layer. In some embodiments, the pressure sensitive adhesive layer has a structured surface and the second adhesive layer also has a structured surface. Typically the patterned array present on the structured surface of the pressure sensitive adhesive layer is the same or similar to the patterned array present on the structured surface of the second adhesive layer. When this is the case, the second adhesive layer is contacted to the structured pattern on the surface of the pressure sensitive adhesive layer in such a way that the structured patterns are not aligned but rather are orthogonal or are substantially non-parallel to each other. In this way, the structured patterns are retained after bake-out, and while not wishing to be bound by theory, it is believed that the presence of the air gaps formed by the presence of the structured surfaces can facilitate the loss of organic components from the adhesive layers during bake-out.

Also disclosed are methods for preparing articles that include the adhesive layers of this disclosure. The method comprises providing a receptor substrate with a first major surface and a second major surface, providing a transfer tape comprising a releasing substrate and a pressure sensitive adhesive layer adjacent to the releasing substrate, applying the transfer tape to the receptor substrate such that the pressure sensitive adhesive layer is in contact with the second major surface of the receptor substrate, removing the releasing substrate from the transfer tape to form a pressure sensitive adhesive layer laminated to the second major surface of the receptor substrate, and baking-out the pressure sensitive adhesive layer at a temperature from 100-500° C., to form a ceramic-like layer on the second major surface of the receptor substrate. The pressure sensitive adhesive layer has been described in detail above.

Typically the pressure sensitive adhesive layer comprises at least one siloxane-based copolymer comprising polydiorganosiloxane segments with at least one linking group, where the linking group is selected from urea linkages, urethane linkages, oxamide linkages, cured (meth)acrylate or vinyl linkages, epoxy linkages, or a combination thereof.

Bake-out is a process by which the pressure sensitive adhesive layer is converted to a ceramic-like layer through the application of heat. Typically the heat is supplied by an oven or similar heat source. As with any thermal process, additional factors also affect the bake-out process, such as the rate of heating, the total time of heating, and the like. Also, other external factors influence the bake-out process such as the thermal stability of the receptor substrate, the presence or absence of a backfill layer as will be described below, as well as convenience and cost factors. The temperature and time of the bake-out is selected such to effect the conversion of the pressure sensitive adhesive layer to a ceramic-like layer. The upper limit for the bake-out temperature is determined by the thermal stability of the substrate or substrates to which the pressure sensitive adhesive layer is adhered, in other words the temperature for bake-out is kept below the temperature at which the substrate is adversely affected, usually around 600° C. Generally, the adhesive layer is heated to a temperature below 500° C., often a temperature of from between 100-500° C., for a time sufficient to remove the organic components of the adhesive layer. In some embodiments, the adhesive layer is heated to a temperature of from between 100-400° C., or from between 100-300° C., or even from 100-250° C. Typically the adhesive layer is heated to a temperature of from between 300-500° C. Generally, the adhesive layer is heated for a time of at least 10 minutes. In some embodiments it may be desirable to bake-out for a longer time at a lower temperature, such as, for example, 400° C. for a time of one hour.

In some embodiments, it may be desirable to "flash heat" the pressure sensitive adhesive layer to achieve bake-out. By "flash heat" it is meant that the pressure sensitive adhesive layer is subjected to high heat at a very rapid rate and for a very short period of time. Flash heating can be effected, for example, through the use of a laser to expose the pressure sensitive adhesive layer to intense, high heat for a very short period of time. With such techniques, because the heating times are so short, more thermally sensitive substrates can be used without being adversely affected.

The time and temperature necessary for bake-out is dependent upon a number of factors in addition to the heating source as was discussed above. One factor is whether a decomposition catalyst is present. The presence of a decomposition catalyst can drastically reduce the temperature required for bake-out, the time required for bake-out, or both.

A wide range of decomposition catalysts are suitable to accelerate the decomposition of the siloxane-based pressure sensitive adhesive layer during the bake-out process, as shown in Grassie et al., "The Thermal Degradation of Polysiloxanes 1: Polydimethylsiloxane," *European Polymer Journal*, Vol. 14. pp. 875 to 88. Particularly suitable are alkaline compounds. It has been shown that using basic additives can lower the threshold degradation temperature of polysiloxane compounds by as much as 250° C. Without being bound by theory, it is thought that the compounds catalyze the cleavage of the Si—C bond, leading to intramolecular cyclization of the polymer and the formation of volatile species. Examples of suitable alkaline compounds include ammonium hydroxide, barium hydroxide, rubidium hydroxide, calcium hydroxide, lithium hydroxide, magnesium hydroxide, potassium hydroxide, sodium amide, calcium oxide ("quicklime"), sodium hydroxide, strontium hydroxide or blends thereof. The carbonate, or monohydrate forms of the salts may also be used. These compounds may be added to the formulation in the form of a solid, or pre-dissolved into solution.

In some embodiments, the method also includes applying a curable backfill layer to the surface of the pressure sensitive adhesive layer laminated to the second major surface of the receptor substrate prior to baking-out the pressure sensitive adhesive layer laminated to the second major surface of the receptor substrate.

In other embodiments, the transfer tape comprises a releasing substrate, a curable backfill layer in contact with the releasing substrate, and a pressure sensitive adhesive layer in contact with the backfill layer. This type of transfer tape can be prepared in a variety of ways. In some embodiments, an adhesive layer can be formed on a releasing surface. This forming of the adhesive layer on the releasing surface can include the steps of coating, drying, and curing as was described above. The curable backfill layer can be applied on the exposed surface of the cured adhesive layer. A releasing substrate can be placed on the exposed surface of the curable backfill layer to form a construction: releasing substrate/curable backfill layer/adhesive layer/releasing surface. The transfer tape article (releasing substrate/curable backfill layer/adhesive layer) can then be removed from the releasing surface and be applied to a receptor substrate to form a laminate article: releasing substrate/curable backfill layer/adhesive layer/receptor substrate. The releasing substrate can then be removed and the resulting laminate can be baked-out at a temperature of from 100-500° C., to form a laminate construction: backfill layer/ceramic-like layer/receptor substrate. In some embodiments, the releasing substrate is a structured release liner (typically a microstructured release liner) such that the structured surface of the structured release liner contacts the curable backfill layer. Upon removal of the structured release liner, the surface of the curable backfill layer is a structured surface and typically retains this structure upon curing during the bake-out.

In some embodiments, after the releasing substrate is removed from the receptor substrate/adhesive layer/releasing substrate constructions to form a receptor substrate/adhesive layer construction, a second substrate can be contacted to the exposed adhesive layer to form a receptor substrate/adhesive layer/second substrate construction. In many embodiments, the second substrate is another receptor substrate, and the second receptor substrate may be either the same as or different from the first receptor substrate. As mentioned above, one of the advantages of using an adhesive layer as the pre-ceramic-like layer is that the adhesive layer can function as an adhesive layer and in this instance adhere together two substrates.

In some embodiments involving a second substrate, the second substrate may be a second adhesive layer. This second adhesive layer can be the same as or different from the first adhesive layer, as long as the adhesive layer bakes-out at the temperature used for the first adhesive layer. In some embodiments the releasing substrate is a microstructured release liner, and therefore upon removal the first adhesive layer has a microstructured surface. If the second adhesive layer also has a microstructured surface, and if the microstructure features are the same or similar, the adhesive layers are contacted in such a way that the microstructures on the two surfaces are orthogonal or substantially non-parallel to each other.

In some embodiments involving a second substrate, the second substrate may be a second transfer tape article. This second transfer tape article can include a second adhesive layer and a second receptor substrate. The second adhesive layer can be the same as or different from the first adhesive layer, as long as the adhesive layer bakes-out at the temperature used for the first adhesive layer. The second receptor substrate can be the same or different from the first receptor substrate. As mentioned above, the first adhesive layer may have a microstructured surface. If the second adhesive layer also has a microstructured surface, and if the microstructure features are the same or similar, the adhesive layers are contacted in such a way that the microstructures on the two surfaces are orthogonal or substantially non-parallel to each other. Upon bake-out, both adhesive layers form ceramic-like layers, and the formed article comprises a first receptor substrate/first ceramic-like layer/second ceramic-like layer/second receptor substrate. In these embodiments, the presence of microstructures in the adhesive layers can aid in the loss of sacrificial materials from the adhesive layers and the generation of the ceramic-like layers by permitting the egress of volatiles from the adhesive bond line between the two adhesive layers.

The adhesive layers, transfer tapes, multilayer articles, and methods of this disclosure are further illustrated in the Figures.

In FIG. 1, article 100, which is a transfer tape, comprises adhesive layer 120 and release substrate 110. In step 10, transfer tape 100 is contacted to receptor substrate 130 to form multilayer article 101. In step 20, release substrate 110 is removed to generate article 102 which comprises receptor substrate 130 in contact with adhesive layer 120. In step 30, article 102 is baked-out as described above to generate article 103 which comprises receptor substrate 130 and ceramic-like layer 121 generated from adhesive layer 120.

Figure 2:
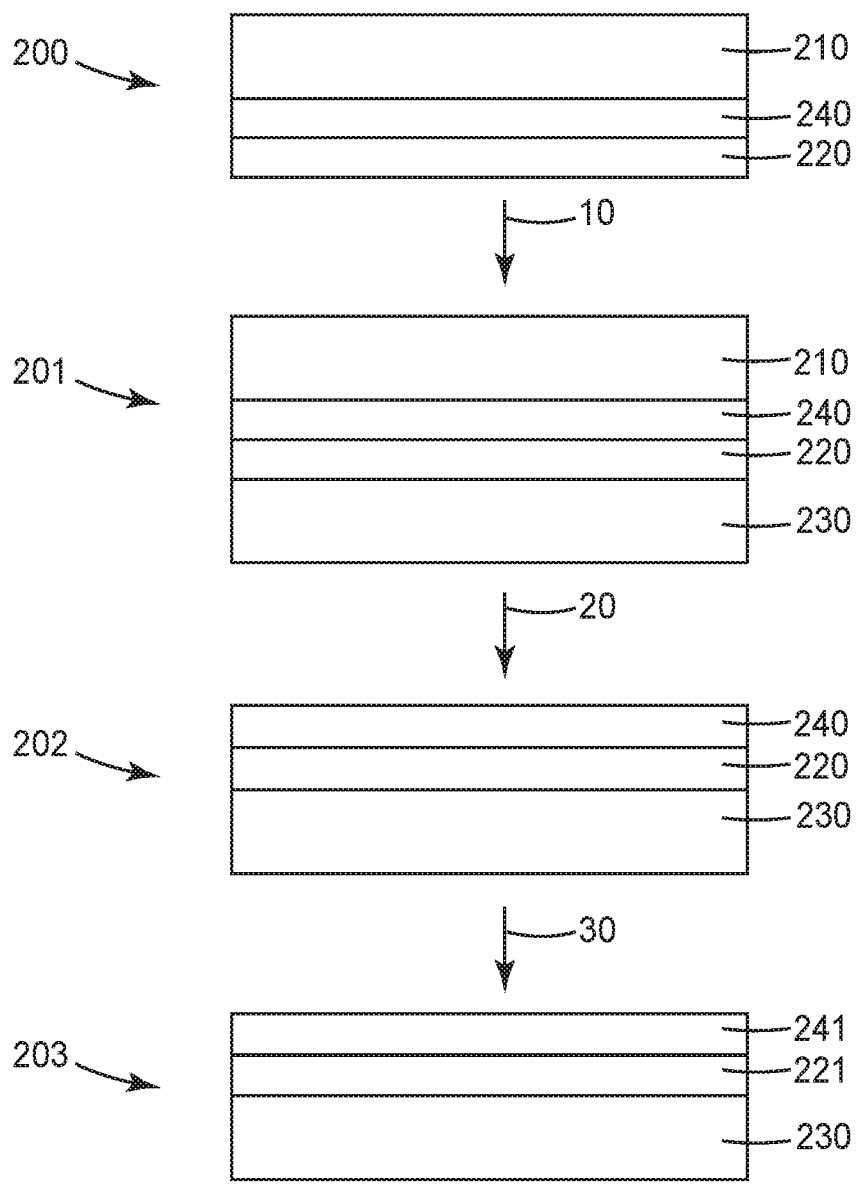
FIG. 2 is a cross sectional view of another embodiment of a process for preparing and using the adhesive layers, transfer tapes, and multilayer articles of the present disclosure.

FIG. 2 describes a similar process as FIG. 1. In FIG. 2, article 200, which is a transfer tape, comprises adhesive layer 220, release substrate 210, and backfill layer 240 between adhesive layer 220 and release substrate 210. In step 10, transfer tape 200 is contacted to receptor substrate 230 to form multilayer article 201. In step 20, release substrate 210 is removed to generate article 202 which comprises receptor substrate 230 in contact with adhesive layer 220, which is contact with backfill layer 240. In step 30, article 202 is baked-out as described above to generate article 203 which comprises receptor substrate 230 and ceramic-like layer 221 generated from adhesive layer 220, and cured backfill layer 241 generated from backfill layer 240.

Figure 3:
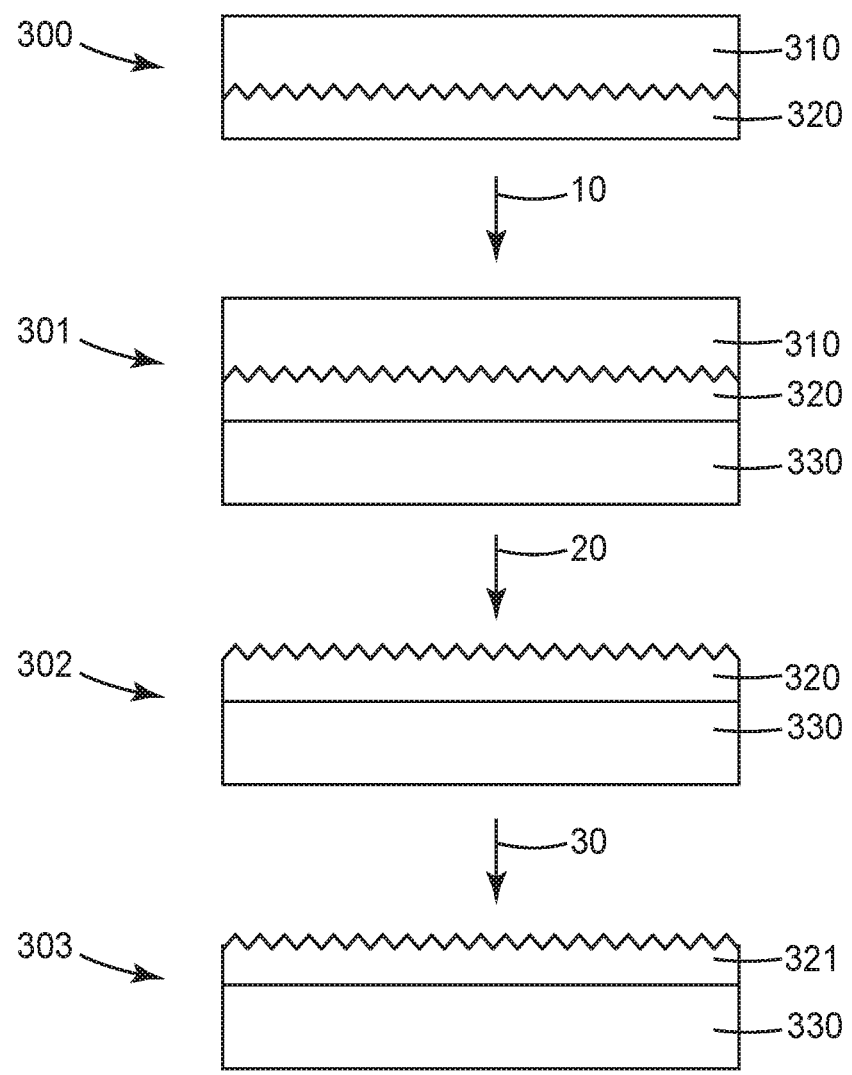
FIG. 3 is a cross sectional view of another embodiment of a process for preparing and using the adhesive layers, transfer tapes, and multilayer articles of the present disclosure.

FIG. 3 describes a similar process as FIG. 1. In FIG. 3, article 300, which is a transfer tape, comprises adhesive layer 320 and release substrate 310. In this embodiment, the surface of adhesive layer 320 that is in contact with the release substrate 310 comprises a microstructured surface. In step 10, transfer tape 300 is contacted to receptor substrate 330 to form multilayer article 301. In step 20, release substrate 310 is removed to generate article 302 which comprises receptor substrate 330 in contact with adhesive layer 320, which has an exposed microstructured surface. In step 30, article 302 is baked-out as described above to generate article 303 which comprises receptor substrate 330 and ceramic-like layer 321 generated from adhesive layer 320, wherein ceramic-like layer 321 has an exposed microstructured surface.

Figure 4:
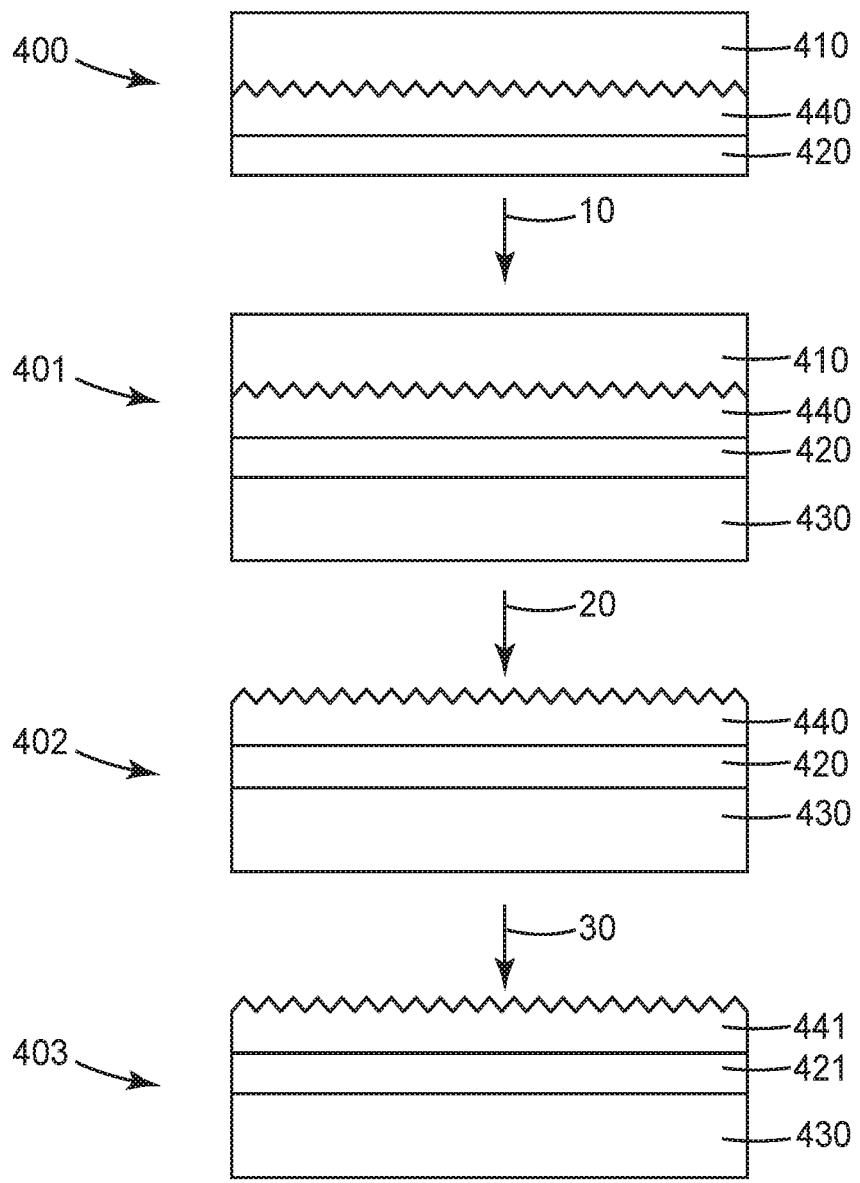
FIG. 4 is a cross sectional view of another embodiment of a process for preparing and using the adhesive layers, transfer tapes, and multilayer articles of the present disclosure.

FIG. 4 describes a similar process as FIG. 2. In FIG. 4, article 400, which is a transfer tape, comprises adhesive layer 420, release substrate 410, and backfill layer 440 between adhesive layer 420 and release substrate 410. In this embodiment, the surface of backfill layer 440 that is in contact with the adhesive layer 420 comprises a microstructured surface. In step 10, transfer tape 400 is contacted to receptor substrate 430 to form multilayer article 401. In step 20, release substrate 410 is removed to generate article 402 which comprises receptor substrate 430 in contact with adhesive layer 420, which is contact with backfill layer 440, which has an exposed microstructured surface. In step 30, article 402 is baked-out as described above to generate article 403 which comprises receptor substrate 430 and ceramic-like layer 421 generated from adhesive layer 420, and cured backfill layer 441 generated from backfill layer 440, wherein cured backfill layer 441 has an exposed microstructured surface.

Figure 5:
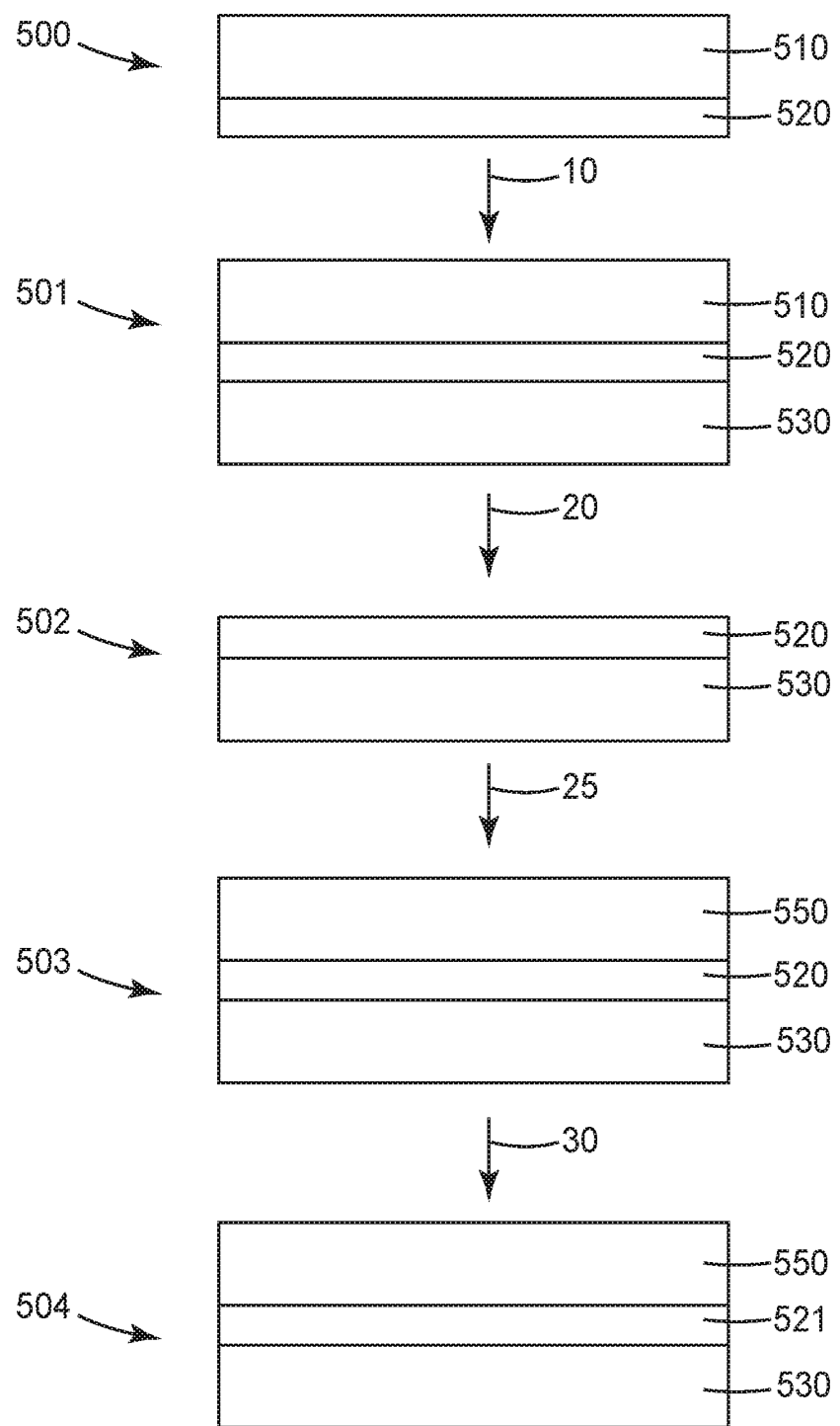
FIG. 5 is a cross sectional view of another embodiment of a process for preparing and using the adhesive layers, transfer tapes, and multilayer articles of the present disclosure.

In FIG. 5, article 500, which is a transfer tape, comprises adhesive layer 520 and release substrate 510. In step 10, transfer tape 500 is contacted to receptor substrate 530 to form multilayer article 501. In step 20, release substrate 510 is removed to generate article 502 which comprises receptor substrate 530 in contact with adhesive layer 520. In step 25, second receptor substrate 550 is contacted to adhesive layer 520 to generate article 503. In step 30, article 503 is baked-out as described above to generate article 504 which comprises receptor substrate 530, ceramic-like layer 521 generated from adhesive layer 520, and second receptor substrate 550.

Figure 6:
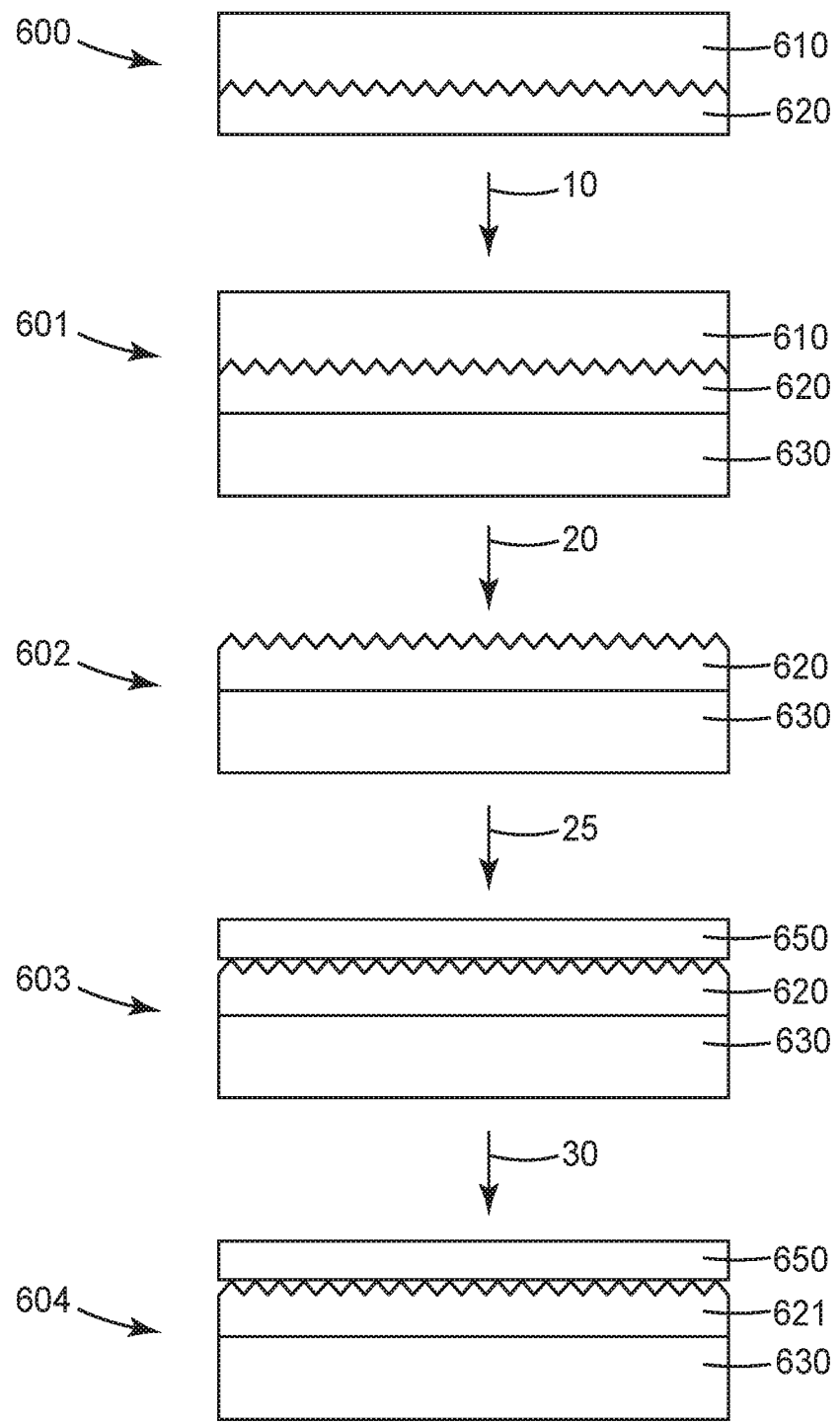
FIG. 6 is a cross sectional view of another embodiment of a process for preparing and using the adhesive layers, transfer tapes, and multilayer articles of the present disclosure.

In FIG. 6, article 600, which is a transfer tape, comprises adhesive layer 620 and release substrate 610. In this embodiment, the surface of adhesive layer 620 that is in contact with the release substrate 610 comprises a microstructured surface. In step 10, transfer tape 600 is contacted to receptor substrate 630 to form multilayer article 601. In step 20, release substrate 610 is removed to generate article 602 which comprises receptor substrate 630 in contact with adhesive layer 620, which has an exposed microstructured surface. In step 25, second receptor substrate 650 is contacted to adhesive layer 620 to generate article 603. In step 30, article 603 is baked-out as described above to generate article 604 which comprises receptor substrate 630, ceramic-like layer 621 generated from adhesive layer 620, and second receptor substrate 650, and wherein ceramic-like layer 621 has at least partially retained a microstructured surface.

Figure 7:
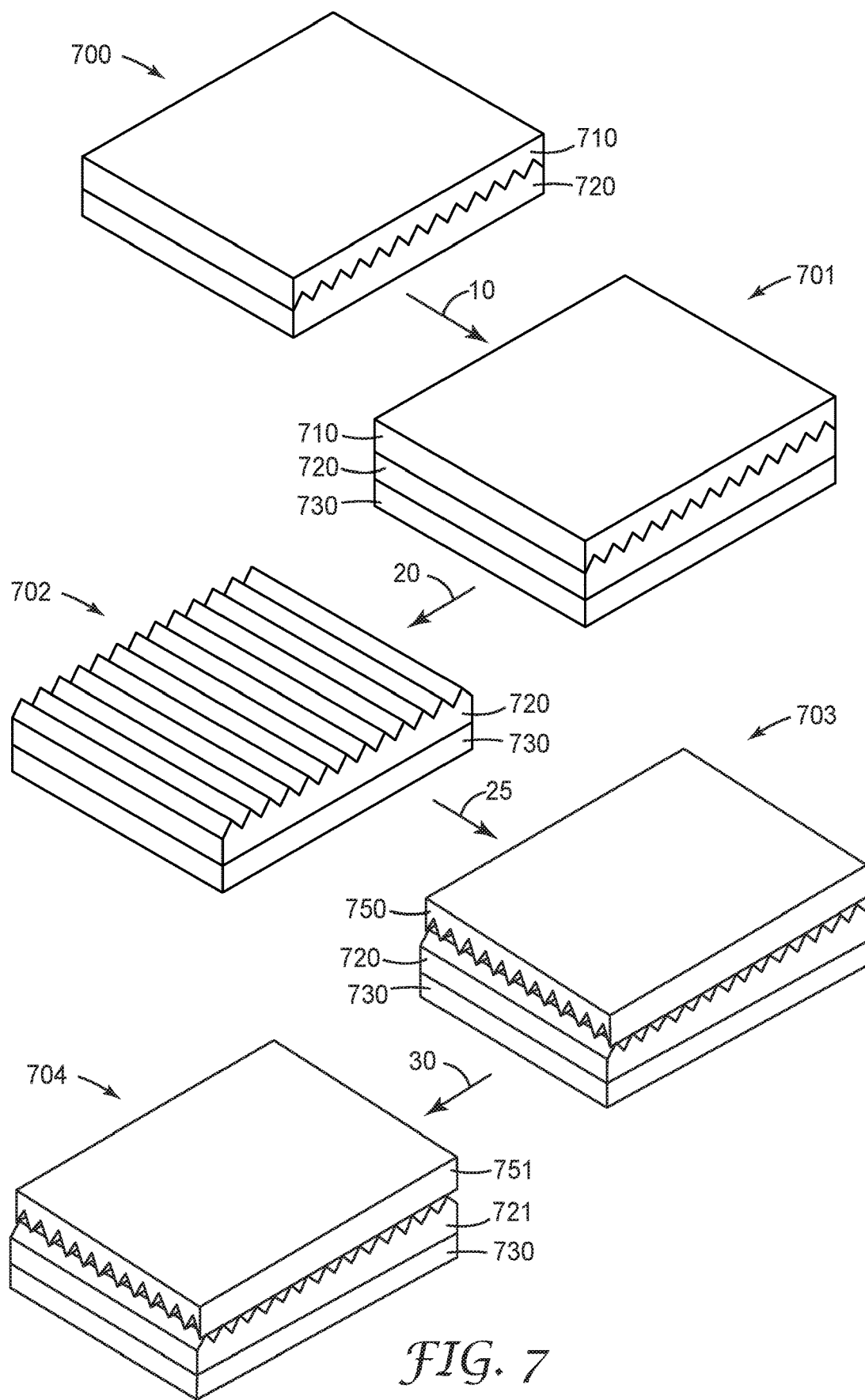
FIG. 7 is a cross sectional view of another embodiment of a process for preparing and using the adhesive layers, transfer tapes, and multilayer articles of the present disclosure.

In FIG. 7, article 700, which is a transfer tape, comprises adhesive layer 720 and release substrate 710. In this embodiment, the surface of adhesive layer 720 that is in contact with the release substrate 710 comprises a microstructured surface. In step 10, transfer tape 700 is contacted to receptor substrate 730 to form multilayer article 701. In step 20, release substrate 710 is removed to generate article 702 which comprises receptor substrate 730 in contact with adhesive layer 720, which has an exposed microstructured surface. In step 25, second adhesive layer 750 is contacted to adhesive layer 720 to generate article 703. Second adhesive layer 750 may be the same composition as adhesive layer 720, or it may be different. Second adhesive layer 750 may also be a pressure sensitive adhesive layer, or not, as long as second adhesive layer 750 bakes-out under the same conditions as adhesive layer 720. In this embodiment, the surface of second adhesive layer 750 comprises a microstructured surface. The microstructured surfaces of adhesive layer 720 and second adhesive layer 750 comprise the same patterned array of structural elements. Second adhesive layer 750 is contacted to the microstructured surface of adhesive layer 720 in such a way that the pattered arrays of structural elements are substantially non-parallel (in this figure orthogonal) to each other. In step 30, article 703 is baked-out as described above to generate article 704 which comprises receptor substrate 730, ceramic-like layer 721 generated from adhesive layer 720, and second ceramic-like layer 751 generated from second adhesive layer 750. Ceramic-like layers 721 and 751 have at least partially retained a microstructured surface.

Figure 8:
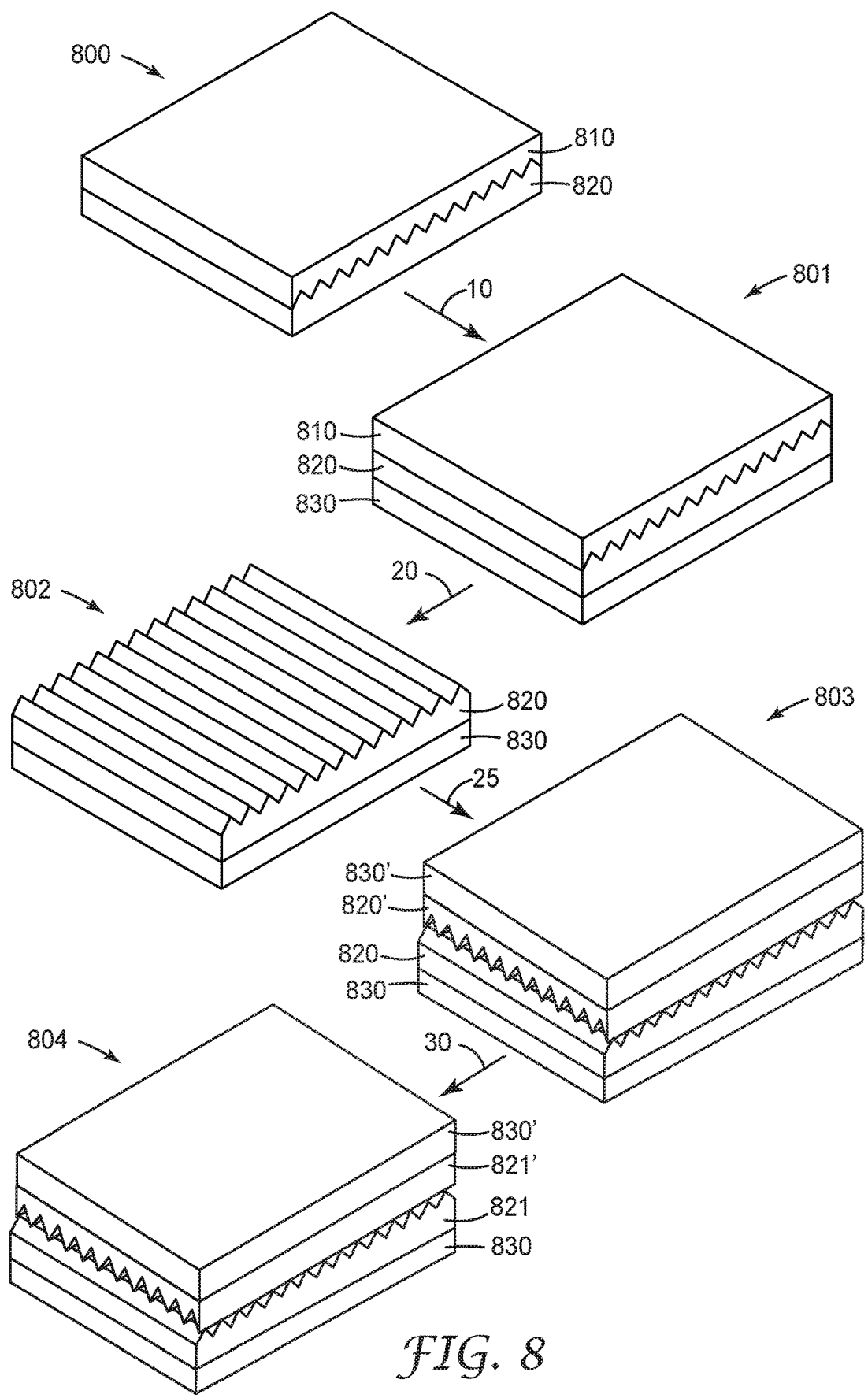
FIG. 8 is a cross sectional view of another embodiment of a process for preparing and using the adhesive layers, transfer tapes, and multilayer articles of the present disclosure.

In FIG. 8, article 800, which is a transfer tape, comprises adhesive layer 820 and release substrate 810. In this embodiment, the surface of adhesive layer 820 that is in contact with the release substrate 810 comprises a microstructured surface. In step 10, transfer tape 800 is contacted to receptor substrate 830 to form multilayer article 801. In step 20, release substrate 810 is removed to generate article 802 which comprises receptor substrate 830 in contact with adhesive layer 820, which has an exposed microstructured surface. In step 25, a second adhesive article is contacted to adhesive layer 820 to generate article 803. The second adhesive article is similar or the same as article 802 with receptor substrate 830' and adhesive layer 820'. Adhesive layer 820' may be the same composition as adhesive layer 820, or it may be different, as long as second adhesive layer 820' bakes-out under the same conditions as adhesive layer 820. In this embodiment, the surface of second adhesive layer 820' comprises a microstructured surface. The microstructured surfaces of adhesive layer 820 and second adhesive layer 820' comprise the same patterned array of structural elements. Second adhesive layer 820' is contacted to the microstructured surface of adhesive layer 820 in such a way that the pattered arrays of structural elements are substantially non-parallel (in this figure orthogonal) to each other, or at least the microstructures are not aligned. In step 30, article 803 is baked-out as described above to generate article 804 which comprises receptor substrate 830, ceramic-like layer 821 generated from adhesive layer 820, and second ceramic-like layer 821' generated from second adhesive layer 820', and receptor substrate 830'. Ceramic-like layers 821 and 821' have at least partially retained a microstructured surface.

The disclosure includes the following embodiments:

Among the embodiments are adhesive layers. Embodiment 1 includes an adhesive layer comprising: at least one siloxane-based copolymer; and at least one siloxane tackifying resin, wherein the adhesive layer is a pressure sensitive adhesive at room temperature and is convertible into a ceramic-like layer by bake-out at a temperature of less than 600° C.

Embodiment 2 is the adhesive layer of embodiment 1, wherein the bake-out temperature is from 100-500° C.

Embodiment 3 is the adhesive layer of embodiment 1 or 2, wherein the bake-out temperature is from 100-500° C.

Embodiment 4 is the adhesive layer of any of embodiments 1-3, wherein the bake-out temperature is from 100-400° C.

Embodiment 5 is the adhesive layer of any of embodiments 1-4, wherein the bake-out temperature is from 100-300° C.

Embodiment 6 is the adhesive layer of any of embodiments 1-5, wherein the bake-out temperature is from 100-250° C.

Embodiment 7 is the adhesive layer of any of embodiments 1-6, wherein the adhesive layer is baked-out for a time of at least 10 minutes.

Embodiment 8 is the adhesive layer of any of embodiments 1-7, wherein the at least one siloxane-based copolymer comprises polydiorganosiloxane segments with at least one linking group where the linking group is selected from urea linkages, urethane linkages, oxamide linkages, cured (meth)acrylate linkages, cured vinyl linkages, cured epoxy linkages, or a combination thereof.

Embodiment 9 is the adhesive layer of any of embodiments 1-7, wherein the at least one siloxane-based copolymer is prepared from non-functional polydiorganosiloxanes cured by exposure to e-beam radiation, gamma radiation, or a combination thereof.

Embodiment 10 is the adhesive layer of any of embodiments 1-8, wherein the at least one siloxane-based copolymer comprises a siloxane polyurea-based segmented copolymer comprising at least one repeat unit of the general structure I:

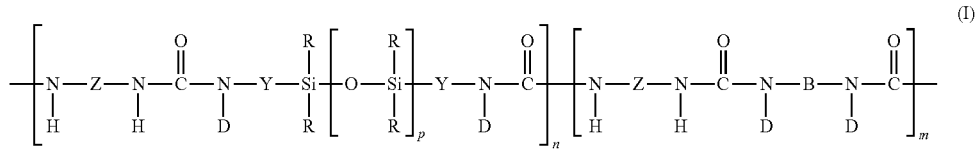

wherein each R independently is an alkyl, substituted alkyl, cycloalkyl, aryl, or substituted aryl; each Z is a polyvalent radical of an arylene, an aralkylene, an alkylene, or a cycloalkylene; each Y is a polyvalent radical that independently is an alkylene, an aralkylene, or an arylene radical; each D is selected from the group consisting of hydrogen, an alkyl radical, phenyl, and a radical that completes a ring structure including B or Y to form a heterocycle; B is a polyvalent radical selected from the group consisting of alkylene, aralkylene, cycloalkylene, phenylene, and heteroalkylene; m is a number that is 0 to about 1000; n is a number that is at least 1; and p is a number that is at least 10.

Embodiment 11 is the adhesive layer of any of embodiments 1-8, wherein the at least one siloxane-based copolymer comprises a siloxane polyoxamide-based segmented copolymer comprising at least two repeat units of Formula II:

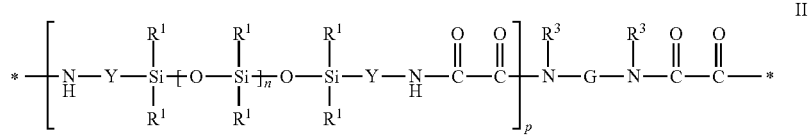

wherein each $R^1$ is independently an alkyl, haloalkyl, aralkyl, alkenyl, aryl, or aryl substituted with an alkyl, alkoxy, or halo; each Y is independently an alkylene, aralkylene, or a combination thereof; n is independently an integer of 40 to 1500; and p is an integer of 1 to 10; G is a divalent group that is the residue unit that is equal to a diamine of formula $R^3HN$-G-$NHR^3$ minus the two —$NHR^3$ groups, where $R^3$ is hydrogen or alkyl, or $R^3$ taken together with G and with the nitrogen to which they are both attached forms a heterocyclic group; and each asterisk (*) indicates a site of attachment of the repeat unit to another group in the copolymer.

Embodiment 12 is the adhesive layer of any of embodiments 1-8, wherein the at least one siloxane-based copolymer comprises the reaction product of a reactive mixture comprising: at least one siloxane di(meth)acrylate; and an initiator.

Embodiment 13, is the adhesive layer of embodiment 12, wherein the reactive mixture further comprises at least one siloxane (meth)acrylate.

Embodiment 14 is the adhesive layer of embodiment 12 or 13, wherein the reactive mixture further comprises at least one ethylenically unsaturated silane of by the general formula:

$X'$-$L_1$-$SiY^1Y^2Y^3$ wherein $X'$ comprises a (meth)acrylate group, an epoxy group, or a thiol group; $L_1$ is a single covalent bond or a divalent linking group; and each of $Y^1$, $Y^2$, and $Y^3$ is independently a hydrolysable group or an alkyl group.

Embodiment 15 is the adhesive layer of any of embodiments 12-14, wherein the initiator comprises a photoinitiator.

Embodiment 16 is the adhesive layer of any of embodiments 1-8, wherein the at least one siloxane-based copolymer comprises the reaction product of a reactive mixture comprising at least one vinyl-functional siloxane and at least one hydride-functional siloxane.

Embodiment 17 is the adhesive layer of any of embodiments 1-8, wherein the at least one siloxane-based copolymer comprises the reaction product of a reactive mixture comprising at least one epoxy-functional siloxane and at least one cationic initiator.

Embodiment 18 is the adhesive layer of embodiment 17, wherein the cationic initiator comprises a cationic photoinitiator.

Embodiment 19 is the adhesive layer of any of embodiments 1-18, wherein the adhesive layer is optically clear.

Embodiment 20 is the adhesive layer of any of embodiments 1-19, further comprising an additive selected from plasticizers, microparticle fillers, nanoparticle fillers, metal oxide fillers, metal hydroxide fillers, bead fillers, glass bubbles, chopped fibers, antioxidants, viscosity control additives, refractive index modifying agents, or mixtures or combinations thereof.

Embodiment 21 is the adhesive layer of any of embodiments 1-20, wherein the adhesive layer comprises at least 50% by weight of the siloxane-based copolymer.

Embodiment 22 is the adhesive layer of any of embodiments 1-21, wherein the at least one siloxane-based copolymer comprises polydiorganosiloxane segments, wherein at least 50% of the alkyl groups in the polydiorganosiloxane segments comprise methyl groups.

Embodiment 23 is the adhesive layer of any of embodiments 1-22, wherein the adhesive layer comprises a structured surface.

Embodiment 24 is the adhesive layer of embodiment 23, wherein the structured surface comprises a microstructured surface.

Embodiment 25 is the adhesive layer of any of embodiments 1-24, wherein the adhesive layer further comprises an alkaline decomposition catalyst.

Embodiment 26 is the adhesive layer of embodiment 25, wherein the alkaline decomposition catalyst comprises a metal oxide or metal hydroxide.

Embodiment 27 is the adhesive layer of any of embodiments 1-26, wherein the adhesive layer is a transfer tape, and further comprising a release substrate with a first major surface and a second major surface wherein the release substrate is adjacent to the adhesive layer.

Embodiment 28 is the adhesive layer of embodiment 27, wherein the transfer tape further comprises a backfill layer wherein the backfill layer is intermediate between the adhesive layer and the second major surface of the release substrate.

Embodiment 29 is the adhesive layer of embodiment 28, wherein the backfill layer comprises a curable silsesquioxane transfer film.

Among the embodiments are transfer tapes. Embodiment 30 is a transfer tape comprising: a release substrate with a first major surface and a second major surface; and an adhesive layer adjacent to at least a portion of the second major surface of the release substrate, the adhesive layer comprising: at least one siloxane-based copolymer; and at least one siloxane tackifying resin; wherein the adhesive layer is a pressure sensitive adhesive at room temperature and is convertible into a ceramic-like layer by bake-out at a temperature of less than 500° C.

Embodiment 31 is the transfer tape of embodiment 30, wherein the bake-out temperature is from 100-500° C.

Embodiment 32 is the transfer tape of embodiment 30 or 31, wherein the bake-out temperature is from 100-500° C.

Embodiment 33 is the transfer tape of any of embodiments 30-32, wherein the bake-out temperature is from 100-400° C.

Embodiment 34 is the transfer tape of any of embodiments 30-33, wherein the bake-out temperature is from 100-300° C.

Embodiment 35 is the transfer tape of any of embodiments 30-34, wherein the bake-out temperature is from 100-250° C.

Embodiment 36 is the transfer tape of any of embodiments 30-35, wherein the adhesive layer is baked-out for a time of at least 10 minutes.

Embodiment 37 is the transfer tape of any of embodiments 30-36, wherein the at least one siloxane-based copolymer comprises polydiorganosiloxane segments with at least one linking group where the linking group is selected from urea linkages, urethane linkages, oxamide linkages, cured (meth)acrylate linkages, cured vinyl linkages, cured epoxy linkages, or a combination thereof.

Embodiment 38 is the transfer tape of any of embodiments 30-36, wherein the at least one siloxane-based copolymer is prepared from non-functional polydiorganosiloxanes cured by exposure to e-beam radiation, gamma radiation, or a combination thereof.

Embodiment 39 is the transfer tape of any of embodiments 30-37, wherein the at least one siloxane-based copolymer comprises a siloxane polyurea-based segmented copolymer comprising at least one repeat unit of the general structure I:

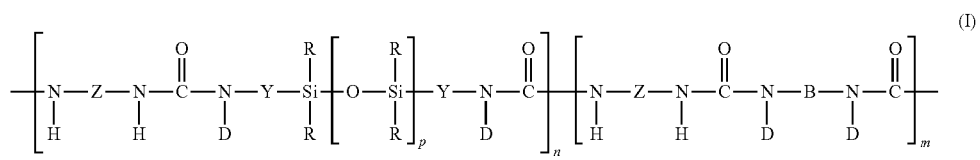

wherein each R independently is an alkyl, substituted alkyl, cycloalkyl, aryl, or substituted aryl; each Z is a polyvalent radical of an arylene, an aralkylene, an alkylene, or a cycloalkylene; each Y is a polyvalent radical that independently is an alkylene, an aralkylene, or an arylene radical; each D is selected from the group consisting of hydrogen, an alkyl radical, phenyl, and a radical that completes a ring structure including B or Y to form a heterocycle; B is a polyvalent radical selected from the group consisting of alkylene, aralkylene, cycloalkylene, phenylene, and heteroalkylene; m is a number that is 0 to about 1000; n is a number that is at least 1; and p is a number that is at least 10.

Embodiment 40 is the transfer tape of any of embodiments 30-37, wherein the at least one siloxane-based copolymer comprises a siloxane polyoxamide-based segmented copolymer comprising at least two repeat units of Formula II:

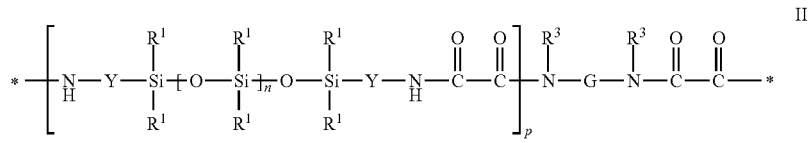

wherein each $R^1$ is independently an alkyl, haloalkyl, aralkyl, alkenyl, aryl, or aryl substituted with an alkyl, alkoxy, or halo; each Y is independently an alkylene, aralkylene, or a combination thereof; n is independently an integer of 40 to 1500; and p is an integer of 1 to 10; G is a divalent group that is the residue unit that is equal to a diamine of formula $R^3$HN-G-NHR$^3$ minus the two —NHR$^3$ groups, where $R^3$ is hydrogen or alkyl, or $R^3$ taken together with G and with the nitrogen to which they are both attached forms a heterocyclic group; and each asterisk (*) indicates a site of attachment of the repeat unit to another group in the copolymer.

Embodiment 41 is the transfer tape of any of embodiments 30-37, wherein the at least one siloxane-based copolymer comprises the reaction product of a reactive mixture comprising: at least one siloxane di(meth)acrylate; and an initiator.

Embodiment 42, is the transfer tape of embodiment 41, wherein the reactive mixture further comprises at least one siloxane (meth)acrylate.

Embodiment 43 is the transfer tape of embodiment 41 or 42, wherein the reactive mixture further comprises at least one ethylenically unsaturated silane of by the general formula:

X'-L$_1$-SiY$^1$Y$^2$Y$^3$ wherein X' comprises a (meth)acrylate group, an epoxy group, or a thiol group; L$_1$ is a single covalent bond or a divalent linking group; and each of Y$^1$, Y$^2$, and Y$^3$ is independently a hydrolysable group or an alkyl group.

Embodiment 44 is the transfer tape of any of embodiments 41-43, wherein the initiator comprises a photoinitiator.

Embodiment 45 is the transfer tape of any of embodiments 30-37, wherein the at least one siloxane-based copolymer comprises the reaction product of a reactive mixture comprising at least one vinyl-functional siloxane and at least one hydride-functional siloxane.

Embodiment 46 is the transfer tape of any of embodiments 30-37, wherein the at least one siloxane-based copolymer comprises the reaction product of a reactive mixture comprising at least one epoxy-functional siloxane and at least one cationic initiator.

Embodiment 47 is the transfer tape of embodiment 46, wherein the cationic initiator comprises a cationic photoinitiator.

Embodiment 48 is the transfer tape of any of embodiments 30-47, wherein the adhesive layer is optically clear.

Embodiment 49 is the transfer tape of any of embodiments 30-48, further comprising an additive selected from plasticizers, microparticle fillers, nanoparticle fillers, metal oxide fillers, metal hydroxide fillers, bead fillers, glass bubbles, chopped fibers, antioxidants, viscosity control additives, refractive index modifying agents, or mixtures or combinations thereof.

Embodiment 50 is the transfer tape of any of embodiments 30-49, wherein the adhesive layer comprises at least 50% by weight of the siloxane-based copolymer.

Embodiment 51 is the transfer tape of any of embodiments 30-50, wherein the at least one siloxane-based copolymer comprises polydiorganosiloxane segments, wherein at least 50% of the alkyl groups in the polydiorganosiloxane segments comprise methyl groups.

Embodiment 52 is the transfer tape of any of embodiments 30-51, wherein the adhesive layer comprises a structured surface.

Embodiment 53 is the transfer tape of embodiment 52, wherein the structured surface comprises a microstructured surface.

Embodiment 54 is the transfer tape of any of embodiments 30-53, wherein the adhesive layer further comprises an alkaline decomposition catalyst.

Embodiment 55 is the transfer tape of embodiment 54, wherein the alkaline decomposition catalyst comprises a metal oxide or metal hydroxide.

Embodiment 56 is the transfer tape of any of embodiments 30-55, wherein the transfer tape further comprises a backfill layer wherein the backfill layer is intermediate between the adhesive layer and the second major surface of the release substrate.

Embodiment 57 is the transfer tape of embodiment 56, wherein the backfill layer comprises a curable silsesquioxane transfer film.

Among the embodiments are multilayer articles. Embodiment 58 includes a multilayer article comprising: a receptor substrate with a first major surface and a second major surface; and pressure sensitive adhesive layer, wherein the pressure sensitive adhesive is baked-out at a temperature of less than 600° C. to form a ceramic-like layer, the pressure sensitive adhesive layer comprising: at least one siloxane-based copolymer; and at least one siloxane tackifying resin.

Embodiment 59 is the multilayer article of embodiment 58, wherein the bake-out temperature is from 100-500° C.

Embodiment 60 is the multilayer article of embodiment 58 or 59, wherein the bake-out temperature is from 100-500° C.

Embodiment 61 is the multilayer article of any of embodiments 58-60, wherein the bake-out temperature is from 100-400° C.

Embodiment 62 is the multilayer article of any of embodiments 58-61, wherein the bake-out temperature is from 100-300° C.

Embodiment 63 is the multilayer article of any of embodiments 58-62, wherein the bake-out temperature is from 100-250° C.

Embodiment 64 is the multilayer article of any of embodiments 58-63, wherein the adhesive layer is baked-out for a time of at least 10 minutes.

Embodiment 65 is the multilayer article of any of embodiments 58-64, wherein the at least one siloxane-based copolymer comprises polydiorganosiloxane segments with at least one linking group where the linking group is selected from urea linkages, urethane linkages, oxamide linkages, cured (meth)acrylate linkages, cured vinyl linkages, cured epoxy linkages, or a combination thereof.

Embodiment 66 is the multilayer article of any of embodiments 58-64, wherein the at least one siloxane-based copolymer is prepared from non-functional polydiorganosiloxanes cured by exposure to e-beam radiation, gamma radiation, or a combination thereof.

Embodiment 67 is the multilayer article of any of embodiments 58-65, wherein the at least one siloxane-based copolymer comprises a siloxane polyurea-based segmented copolymer comprising at least one repeat unit of the general structure I:

clic group; and each asterisk (*) indicates a site of attachment of the repeat unit to another group in the copolymer.

Embodiment 69 is the multilayer article of any of embodiments 58-65, wherein the at least one siloxane-based copolymer comprises the reaction product of a reactive mixture comprising: at least one siloxane di(meth)acrylate; and an initiator.

Embodiment 70, is the multilayer article of embodiment 69, wherein the reactive mixture further comprises at least one siloxane (meth)acrylate.

Embodiment 71 is the multilayer article of embodiment 69 or 70, wherein the reactive mixture further comprises at least one ethylenically unsaturated silane of by the general formula:

X'-L$_1$-SiY$^1$Y$^2$Y$^3$ wherein X' comprises a (meth)acrylate group, an epoxy group, or a thio group; L$_1$ is a single covalent bond or a divalent linking group; and each of Y$^1$, Y$^2$, and Y$^3$ is independently a hydrolysable group or an alkyl group.

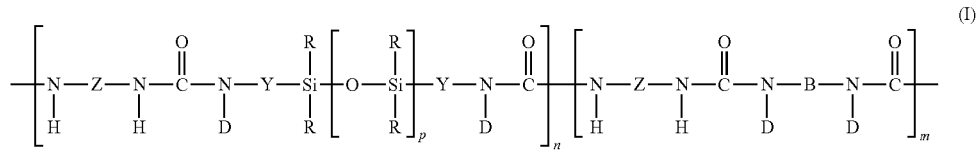

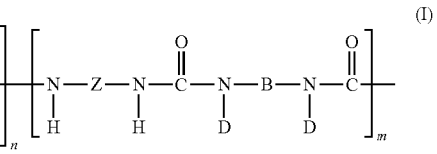

wherein each R independently is an alkyl, substituted alkyl, cycloalkyl, aryl, or substituted aryl; each Z is a polyvalent radical of an arylene, an aralkylene, an alkylene, or a cycloalkylene; each Y is a polyvalent radical that independently is an alkylene, an aralkylene, or an arylene radical; each D is selected from the group consisting of hydrogen, an alkyl radical, phenyl, and a radical that completes a ring structure including B or Y to form a heterocycle; B is a polyvalent radical selected from the group consisting of alkylene, aralkylene, cycloalkylene, phenylene, and heteroalkylene; m is a number that is 0 to about 1000; n is a number that is at least 1; and p is a number that is at least 10.

Embodiment 68 is the multilayer article of any of embodiments 58-65, wherein the at least one siloxane-based copolymer comprises a siloxane polyoxamide-based segmented copolymer comprising at least two repeat units of Formula II:

Embodiment 72 is the multilayer article of any of embodiments 69-71, wherein the initiator comprises a photoinitiator.

Embodiment 73 is the multilayer article of any of embodiments 58-65, wherein the at least one siloxane-based copolymer comprises the reaction product of a reactive mixture comprising at least one vinyl-functional siloxane and at least one hydride-functional siloxane.

Embodiment 74 is the multilayer article of any of embodiments 58-65, wherein the at least one siloxane-based copolymer comprises the reaction product of a reactive mixture comprising at least one epoxy-functional siloxane and at least one cationic initiator.

Embodiment 75 is the multilayer article of embodiment 74, wherein the cationic initiator comprises a cationic photoinitiator.

Embodiment 76 is the multilayer article of any of embodiments 58-75, wherein the adhesive layer is optically clear.

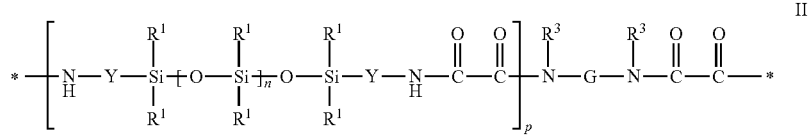

wherein each R$^1$ is independently an alkyl, haloalkyl, aralkyl, alkenyl, aryl, or aryl substituted with an alkyl, alkoxy, or halo; each Y is independently an alkylene, aralkylene, or a combination thereof; n is independently an integer of 40 to 1500; and p is an integer of 1 to 10; G is a divalent group that is the residue unit that is equal to a diamine of formula R$^3$HN-G-NHR$^3$ minus the two —NHR$^3$ groups, where R$^3$ is hydrogen or alkyl, or R$^3$ taken together with G and with the nitrogen to which they are both attached forms a heterocy- Embodiment 77 is the multilayer article of any of embodiments 58-76, wherein the adhesive layer further comprises an additive selected from plasticizers, microparticle fillers, nanoparticle fillers, metal oxide fillers, metal hydroxide fillers, bead fillers, glass bubbles, chopped fibers, antioxidants, viscosity control additives, refractive index modifying agents, or mixtures or combinations thereof.

Embodiment 78 is the multilayer article of any of embodiments 58-77, wherein the adhesive layer comprises at least 50% by weight of the siloxane-based copolymer.

Embodiment 79 is the multilayer article of any of embodiments 58-78, wherein the at least one siloxane-based copolymer comprises polydiorganosiloxane segments, wherein at least 50% of the alkyl groups in the polydiorganosiloxane segments comprise methyl groups.

Embodiment 80 is the multilayer article of any of embodiments 58-79, wherein the adhesive layer comprises a structured surface.

Embodiment 81 is the multilayer article of embodiment 80, wherein the structured surface comprises a microstructured surface.

Embodiment 82 is the multilayer article of any of embodiments 58-81, wherein the adhesive layer further comprises an alkaline decomposition catalyst.

Embodiment 83 is the multilayer article of embodiment 82, wherein the alkaline decomposition catalyst comprises a metal oxide or metal hydroxide.

Embodiment 84 is the multilayer article of any of embodiments 58-83, wherein the adhesive layer is a transfer tape, and further comprising a release substrate with a first major surface and a second major surface wherein the release substrate is adjacent to the adhesive layer.

Embodiment 85 is the multilayer article of embodiment 84, wherein the transfer tape further comprises a backfill layer wherein the backfill layer is intermediate between the adhesive layer and the second major surface of the release substrate.

Embodiment 86 is the multilayer article of embodiment 85, wherein the backfill layer comprises a curable silsesquioxane transfer film.

Embodiment 87 is the multilayer article of any of embodiments 58-83, wherein the adhesive layer has been baked-out to form a ceramic-like layer.

Embodiment 88 is the multilayer article of any of embodiments 84-86, wherein the release substrate has been removed and the adhesive layer and backfill layer have been baked-out to form a ceramic-like layer.

Embodiment 89 is the multilayer article of any of embodiments 58-88, wherein the receptor substrate comprises glass, metal, sapphire, silicon, silica, silicon carbide, silicon nitride, or semiconductor materials on a support wafer.

Embodiment 90 is the multilayer article of any of embodiments 58-83, further comprising a second receptor substrate with a first major surface and a second major surface, wherein the adhesive layer is in contact with the first major surface of the second receptor substrate.

Embodiment 91 is the multilayer article of embodiment 90, wherein the second receptor substrate comprises glass, metal, sapphire, silicon, silica, silicon carbide, silicon nitride, or semiconductor materials on a support wafer.

Embodiment 92 is the multilayer article of any of embodiments 58-83, further comprising a second adhesive layer in contact with the adhesive layer, wherein the second adhesive layer comprises a pressure sensitive adhesive layer comprising: at least one siloxane-based copolymer; and at least one siloxane tackifying resin.

Embodiment 93 is the multilayer article of embodiment 92, wherein the adhesive layer is a structured adhesive layer comprising an array of patterns and the second adhesive layer is a structured adhesive layer comprising an array of patterns such that the array of patterns of the adhesive layer are orthogonal or substantially non-parallel to the array of patterns of the second adhesive layer.

Embodiment 94 is the multilayer article of embodiment 92 or 93, wherein the adhesive layer and the second adhesive layer comprise the same siloxane-based copolymer.

Embodiment 95 is the multilayer article of embodiment 92 or 93, wherein the adhesive layer and the second adhesive layer comprise different siloxane-based copolymers.

Among the embodiments are multilayer articles. Embodiment 96 includes a multilayer article comprising: a receptor substrate with a first major surface and a second major surface; and a ceramic-like layer in contact with the second major surface of the receptor substrate, the ceramic-like layer comprising a baked-out pressure sensitive adhesive layer, wherein the pressure sensitive adhesive is baked-out at a temperature of less than 600° C., the pressure sensitive adhesive layer comprising: at least one siloxane-based copolymer; and at least one siloxane tackifying resin.

Embodiment 97 is the multilayer article of embodiment 96, further comprising a cured backfill layer in contact with the ceramic-like layer, the cured layer comprising a curable backfill layer cured during bake-out.

Embodiment 98 is the multilayer article of embodiment 96 or 97, wherein the receptor substrate comprises glass, metal, sapphire, silicon, silica, silicon carbide, silicon nitride, or semiconductor materials on a support wafer.

Embodiment 99 is the multilayer article of any of embodiments 96-98, further comprising a second receptor substrate with a first major surface and a second major surface, wherein the ceramic-like layer is in contact with the first major surface of the second receptor substrate.

Embodiment 100 is the multilayer article of embodiment 99, wherein the second receptor substrate comprises glass, metal, sapphire, silicon, silica, silicon carbide, silicon nitride, or semiconductor materials on a support wafer.

Embodiment 101 is the multilayer article of any of embodiments 96-98, further comprising a second ceramic-like layer with a first major surface and a second major surface, wherein the ceramic-like layer is in contact with the first major surface of the second ceramic-like layer.

Among the embodiments are methods of preparing articles. Embodiment 102 includes a method of preparing an article comprising: providing a receptor substrate with a first major surface and a second major surface; providing a transfer tape, the transfer tape comprising: a release substrate with a first major surface and a second major surface; and an adhesive layer adjacent to at least a portion of the second major surface of the release substrate, the adhesive layer comprising: at least one siloxane-based copolymer; and at least one siloxane tackifying resin; wherein the adhesive layer is a pressure sensitive adhesive at room temperature and is convertible into a ceramic-like layer by bake-out at a temperature of less than 600° C.; applying the transfer tape to the receptor substrate such that the pressure sensitive adhesive layer is in contact with the second major surface of the receptor substrate; removing the releasing substrate from the transfer tape in contact with the second major surface of the receptor substrate to form a pressure sensitive adhesive layer laminated to the second major surface of the receptor substrate; and baking-out the pressure sensitive adhesive layer laminated to the second major surface of the receptor substrate at a temperature of less than 600° C., to form a ceramic-like layer on the second major surface of the receptor substrate.

Embodiment 103 is the method of embodiment 102, wherein the bake-out temperature is from 100-500° C.

Embodiment 104 is the method of embodiment 102 or 103, wherein the bake-out temperature is from 100-500° C.

Embodiment 105 is the method of any of embodiments 102-104, wherein the bake-out temperature is from 100-400° C.

Embodiment 106 is the method of any of embodiments 102-105, wherein the bake-out temperature is from 100-300° C.

Embodiment 107 is the method of any of embodiments 102-106, wherein the bake-out temperature is from 100-250° C.

Embodiment 108 is the method of any of embodiments 102-107, wherein the adhesive layer is baked-out for a time of at least 10 minutes.

Embodiment 109 is the method of any of embodiments 102-108, wherein the at least one siloxane-based copolymer comprises polydiorganosiloxane segments with at least one linking group where the linking group is selected from urea linkages, urethane linkages, oxamide linkages, cured (meth)acrylate linkages, cured vinyl linkages, cured epoxy linkages, or a combination thereof.

Embodiment 110 is the method of any of embodiments 102-108, wherein the at least one siloxane-based copolymer is prepared from non-functional polydiorganosiloxanes cured by exposure to e-beam radiation, gamma radiation, or a combination thereof.

Embodiment 111 is the method of any of embodiments 102-109, wherein the at least one siloxane-based copolymer comprises a siloxane polyurea-based segmented copolymer comprising at least one repeat unit of the general structure I:

that is the residue unit that is equal to a diamine of formula $R^3HN$-G-$NHR^3$ minus the two —$NHR^3$ groups, where $R^3$ is hydrogen or alkyl, or $R^3$ taken together with G and with the nitrogen to which they are both attached forms a heterocyclic group; and each asterisk (*) indicates a site of attachment of the repeat unit to another group in the copolymer.

Embodiment 113 is the method of any of embodiments 102-109, wherein the at least one siloxane-based copolymer comprises the reaction product of a reactive mixture comprising: at least one siloxane di(meth)acrylate; and an initiator.

Embodiment 114, is the method of embodiment 113, wherein the reactive mixture further comprises at least one siloxane (meth)acrylate.

Embodiment 115 is the method of embodiment 113 or 114, wherein the reactive mixture further comprises at least one ethylenically unsaturated silane of by the general formula:

X'-$L_1$-Si$Y^1Y^2Y^3$ wherein X' comprises a (meth)acrylate group, an epoxy group, or a thiol group; $L_1$ is a single covalent bond or a divalent linking group; and each of $Y^1$, $Y^2$, and $Y^3$ is independently a hydrolysable group or an alkyl group.

Embodiment 116 is the method of any of embodiments 113-115, wherein the initiator comprises a photoinitiator.

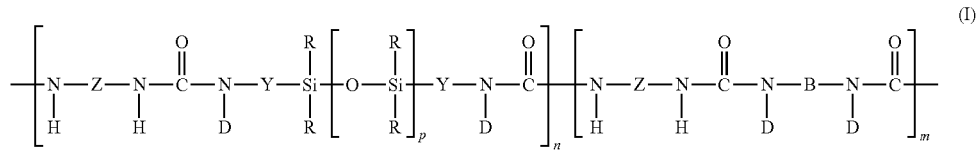

wherein each R independently is an alkyl, substituted alkyl, cycloalkyl, aryl, or substituted aryl; each Z is a polyvalent radical of an arylene, an aralkylene, an alkylene, or a cycloalkylene; each Y is a polyvalent radical that independently is an alkylene, an aralkylene, or an arylene radical; each D is selected from the group consisting of hydrogen, an alkyl radical, phenyl, and a radical that completes a ring structure including B or Y to form a heterocycle; B is a polyvalent radical selected from the group consisting of alkylene, aralkylene, cycloalkylene, phenylene, and heteroalkylene; m is a number that is 0 to about 1000; n is a number that is at least 1; and p is a number that is at least 10.

Embodiment 112 is the method of any of embodiments 102-109, wherein the at least one siloxane-based copolymer comprises a siloxane polyoxamide-based segmented copolymer comprising at least two repeat units of Formula II:

Embodiment 117 is the method of any of embodiments 102-109, wherein the at least one siloxane-based copolymer comprises the reaction product of a reactive mixture comprising at least one vinyl-functional siloxane and at least one hydride-functional siloxane.

Embodiment 118 is the method of any of embodiments 102-109, wherein the at least one siloxane-based copolymer comprises the reaction product of a reactive mixture comprising at least one epoxy-functional siloxane and at least one cationic initiator.

Embodiment 119 is the method of embodiment 118, wherein the cationic initiator comprises a cationic photoinitiator.

Embodiment 120 is the method of any of embodiments 102-119, wherein the adhesive layer is optically clear.

Embodiment 121 is the method of any of embodiments 102-120, wherein the adhesive layer further comprises an

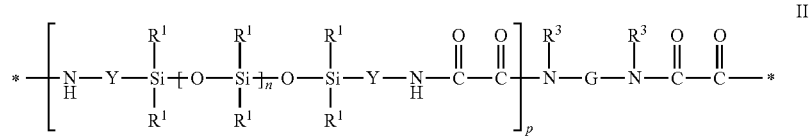

wherein each $R^1$ is independently an alkyl, haloalkyl, aralkyl, alkenyl, aryl, or aryl substituted with an alkyl, alkoxy, or halo; each Y is independently an alkylene, aralkylene, or a combination thereof; n is independently an integer of 40 to 1500; and p is an integer of 1 to 10; G is a divalent group additive selected from plasticizers, microparticle fillers, nanoparticle fillers, metal oxide fillers, metal hydroxide fillers, bead fillers, glass bubbles, chopped fibers, antioxidants, viscosity control additives, refractive index modifying agents, or mixtures or combinations thereof.

Embodiment 122 is the method of any of embodiments 102-121, wherein the adhesive layer comprises at least 50% by weight of the siloxane-based copolymer.

Embodiment 123 is the method of any of embodiments 102-122, wherein the at least one siloxane-based copolymer comprises polydiorganosiloxane segments, wherein at least 50% of the alkyl groups in the polydiorganosiloxane segments comprise methyl groups.

Embodiment 124 is the method of any of embodiments 1102-123, wherein the adhesive layer comprises a structured surface.

Embodiment 125 is the method of embodiment 124, wherein the structured surface comprises a microstructured surface.

Embodiment 126 is the method of any of embodiments 102-125, wherein the adhesive layer further comprises an alkaline decomposition catalyst.

Embodiment 127 is the method of embodiment 126, wherein the alkaline decomposition catalyst comprises a metal oxide or metal hydroxide.

Embodiment 128 is the method of any of embodiments 102-127, wherein the transfer tape further comprises a backfill layer wherein the backfill layer is intermediate between the adhesive layer and the second major surface of the release substrate.

Embodiment 129 is the method of embodiment 128, wherein the backfill layer comprises a curable silsesquioxane transfer film.

Embodiment 130 is the method of any of embodiments 102-127, further comprising applying a backfill layer to the surface of the pressure sensitive adhesive layer laminated to the second major surface of the receptor substrate prior to baking-out the pressure sensitive adhesive layer laminated to the second major surface of the receptor substrate, such that the backfill layer cures during the bake-out.

Embodiment 131 is the method of any of embodiments 102-127, wherein providing a transfer tape comprises providing a transfer tape comprising: a releasing substrate; a backfill layer in contact with the releasing substrate; and a pressure sensitive adhesive layer in contact with the backfill layer.

Embodiment 132 is the method of any of embodiments 102-131, further comprising: providing a second receptor substrate with a first major surface and a second major surface; and contacting the first major surface of the second receptor substrate to the pressure sensitive adhesive layer.

Embodiment 133 is the method of any of embodiments 102-131, further comprising: providing a second adhesive layer with a first major surface and a second major surface; and contacting the first major surface of the second adhesive layer to the pressure sensitive adhesive layer.

Embodiment 134 is the method of embodiment 133, wherein the pressure sensitive adhesive layer is a structured adhesive layer comprising an array of patterns and the second adhesive layer is a structured adhesive layer comprising an array of patterns such that the array of patterns of the adhesive layer are orthogonal or substantially non-parallel to the array of patterns of the second adhesive layer.

Embodiment 135 is the method of embodiment 133 or 134, wherein the pressure sensitive adhesive layer and the second adhesive layer comprise the same siloxane-based copolymer.

Embodiment 136 is the method of embodiment 133 or 134, wherein the pressure sensitive adhesive layer and the second adhesive layer comprise different siloxane-based copolymers.

EXAMPLES

Silicone adhesive polymers as ceramic-like precursors were prepared. The materials were applied to substrates and the optical, adhesive and decomposition properties were evaluated as shown in the following examples. These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company, St. Louis, Mo. unless otherwise noted.

TABLE 1

Materials List

| Material Abbreviation/ Trade Name | Material Description | Source |
|---|---|---|
| SA-1 | Silicone acrylate-1, a difunctional silicone acrylate commercially available as RC 902 | Evonik Industries AG (Essen, Germany) |
| SM-1 | Silicone methacrylate-1, a monomethacryloxypropyl terminated polydimethylsiloxane commercially available as MCR-M07 | Gelest (Morrisville, PA) |
| PI-1 | Modified version of 2-Hydroxy-2-methyl-phenyl-1-propanone photoinitiator for silicones commercially available as TEGO A18 | Evonik (Hopewell, VA) |
| Resin-1 | MQ Resin (co-hydrolysis product of tetraalkoxy silane (Q unit) and trimethyl-ethoxy silane (M unit) commercially available as MQ 803TF | Wacker Chemie AG (Munchen, Germany) |
| MAOPTS | Methacryloxypropyltrimethoxysilane | Alfa Aesar, Ward Hill, MA |

TABLE 1-continued

Materials List

| Material Abbreviation/ Trade Name | Material Description | Source |
| --- | --- | --- |
| BTSE | 1,2-Bis(triethoxysilyl)ethane | Gelest (Morrisville, PA) |
| CsOH | Cesium hydroxide (99% purity, 50% in water) | Aldrich (St. Louis, MO) |
| ADH1 | Adhesive-1, a silicone polyoxamide dissolved to 20% solids in EtOAc) (As described in Preparative Example 1 of Sherman et al., of U.S. Pat. No. 7,947,376) | — |
| ADH2 | Adhesive-2, a silicone polyoxamide/ MQ mixture (1/1 wt./wt.) dissolved to 20% solids in EtOAc (As described Example 1 of Sherman et al., U.S. Pat. No. 7,947,376) | — |
| EA-1 | Epoxy acrylate-1, a difunctional bisphenol A-based epoxy acrylate commercially available as CN-120 | Sartomer (Exton, PA) |
| PEA | 2-Phenoxyethyl acrylate commercially available as SR339 | Sartomer (Exton, PA) |
| PI-2 | 2-Hydroxy-2-methyl-phenyl-1-propanone photoinitiator commercially available as IRGACURE 1173 | BASF (Florham Park, NJ) |
| PI-3 | 2,4,6-trimethylbenzoyldiphenylphosphine oxide photoinitiatorcommercially available as IRGACURE TPO | BASF (Florham Park, NJ) |
| PET film | 2 mil (51 micrometer) thick PET Film Type = 990197, | 3M Co., (St. Paul, MN) |
| Release Liner-1 | 5199 fluorosilicone easy release liner | Loparex, (Hammond, WI) |

Test Methods

Test Method 1: Transmission and Haze Measurements

The transmission and haze of flat coatings of the ceramifiable silicone adhesive polymers were measured. The resin formulations above were coated on PET Film, dried in a 90° C. convection oven for ten minutes, and then laminated with Release Liner-1. The transmission ("T") and haze ("H") of the films were measured at three different spots along the film. The measurements were conducted with a BYK Gardiner instrument under the trade designation "BYK Hazegard Plus", Columbia, Md. based on ASTM D1003-11.

Test Method 2: Peel Adhesion

Peel adhesion is the force required to remove an adhesive coated flexible sheet of material from a test panel (adherend) measured at a specific angle and rate of removal. Isopropyl alcohol was used to clean the adherend (glass) prior to film application. The ceramifiable silicone adhesive polymers film samples were cut into 1" (2.5 cm) wide strips. The easy release liner side of the adhesive was removed to leave behind the coatings of the adhesive on PET film. The adhesive was laminated down to the glass using a weighted (3 lbs., 1.35 kg) roller. After lamination and prior to testing, the samples were allowed to dwell at room temperature, 23° C. temperature and relative humidity of 50%, for 15 minutes. Peel adhesion was measured as a 180° peel back at a crosshead speed of 12 in/min (30 cm/min) using IMASS 2100 Slip/Peel Tester (IMASS, Inc., Accord, Mass.). The test was run at room temperature, 23° C. The peel adhesion force was an average of three replicates, measured in ounces per inch and converted to N/dm.

Test Method 3: Thermal Decomposition Temperature

Pieces of the ceramifiable silicone adhesive polymers were placed into a tared aluminum pan to achieve a dry weight of about 10-20 mg. The pans were placed inside a Q500 Thermogravimetric Analyzer (TA Instruments, New Castle, Del.). The heating rate selected was 10° C./min up to 500° C. and held for one hour. The amount of inorganic residue (Residue %) was defined as the normalized weight percent of the material remaining after the bake cycle was complete. The decomposition onset point ($T_{onset}$) was found using the installed function in the Universal Analysis 2000 software (TA Instruments). The temperature at which 5% of the original mass is lost ($T_{D-5\%}$) was also recorded.

Test Method 4: Microstructure Quality

Since the microstructures replicated herein were small enough to act as a diffraction grating, a laser pointer was used to probe the quality of the microscale structure. A red laser pointer (Opcom, Xiamen, China) ($\lambda$=632.8 nm) was used to shine laser light through the microstructured glass slides with replicated silicone microstructures before and after the high temperature bake step. The diffraction patterns were projected onto a white sheet in a darkened room approximately 12 inches (30 cm) away from the glass slide. Pictures of the laser diffraction patterns were taken using a Panasonic Lumix camera with no flash and a 2 second shutter delay. Diffraction orders were counted starting from the direct beam (zeroth order) out to the edge of the pattern visible to the naked eye and the quality of said patterns were recorded.

Test Method 5: Thin Film Thickness Measurement

Thin films were measured with an F20-UV Thin Film Analyzer (Filmetrics, Inc., San Diego, Calif.) operating in reflectance mode. The unit was equipped with a Hamamatsu High-Power UV-Vis Fiber Light Source (model # L10290) w/ deuterium and halogen lamps attached to a fiber optic light guide. The model used for analysis was based on a borosilicate glass/silicone/air film stack using a Cauchy model. A piece of black vinyl tape was laminated to the back of all the glass slides prior to analysis, and all air bubbles carefully pushed out using a credit card.

Comparative and Example Set 1: Non-Photocurable Ceramifiable Silicone Adhesives

TABLE 2

Formulations for non-photocurable ceramifiable silicone adhesives

| Ex. # | Weight % (relative to total resin solids) | | |
|---|---|---|---|
| | ADH1 | ADH2 | CsOH |
| Comparative Example C1 | 100 | — | — |
| Example 1A | — | 100.00 | |
| Example 1B | — | 99.73 | 0.27 |
| Example 1C | — | 99.44 | 0.56 |
| Example 1D | — | 98.82 | 1.18 |

The formulations shown in Table 2 were prepared and dissolved to 20 wt. % solids in ethyl acetate. The solutions were spin coated (Laurell Inc., WS-400/500 Series) onto cleaned glass slides at 3000 rpm for 1 minute and then dried in an exhausted oven at 110° C. for 10 minutes to remove the solvent. Pieces of the adhesive films were scraped off the glass slides with a razor blade and placed in a TGA for thermal analysis as described in Test Method 3. The results of thermal analysis of these materials are shown in Table 3. The bake process for the thin films consisted of a thermal ramp in air (Neytech Vulcan Muffle Furnace, Model #9493308) at 1° C./min up to 500° C., held for one hour, and allowed to cool to room temperature. The thickness of the thin films before and after the bake step were measured as described in Test Method 5, and the results shown in Table 4. The optical performance of the thin films before and after bake-out were measured as described in Test Method 1 and results shown in Table 5. The ability to bond another piece of glass to the top side of the microstructured adhesive was also recorded.

TABLE 3

Thermal analysis data of silicone adhesive formulations

| Example # | $T_{onset}$ | $T_{D-5\%}$ | Residue (%) |
|---|---|---|---|
| Comparative Example 1A | 403.00 | 383.00 | 5.320 |
| Example 1A | 393.50 | 319.81 | 46.18 |
| Example 1B | 267.30 | 250.00 | 37.94 |
| Example 1C | 231.40 | 238.08 | 42.86 |
| Example 1D | 225.64 | 228.08 | 46.96 |

TABLE 4

Results of non-photocurable ceramifiable silicone adhesives

| Example # | Thickness (µm) | | Glass Bonding? |
|---|---|---|---|
| | Before Bake | After Bake | |
| Comparative Example 1A | 12.9 | 0.10 | No |
| Example 1A | 5.48 | 2.33 | Yes |
| Example 1B | 7.98 | 2.12 | Yes |
| Example 1C | 7.68 | 1.94 | Yes |
| Example 1D | 6.98 | 1.91 | Yes |

TABLE 5

Optical results of non-photocurable ceramifiable silicone adhesives

| Example # | Before Bake-out | | After Bake-out | |
|---|---|---|---|---|
| | T (%) | H (%) | T (%) | H (%) |
| Comparative Example 1A | 94.5 | 0.66 | 93.6 | 0.82 |
| Example 1A | 94.47 | 1.01 | 95.5 | 0.54 |
| Example 1B | 94.43 | 0.80 | 95.2 | 1.71 |
| Example 1C | 94.40 | 0.73 | 94.85 | 2.94 |
| Example 1D | 94.33 | 1.66 | 93.75 | 3.58 |

Comparative and Example Set 2—Photocurable Ceramifiable Silicone Adhesive Formulations Fabrication of Microreplicated Release Treated Film A release treated film replicate "TOOL FILM A" was made from a precision cylindrical tool as follows. The cylindrical tool was a modified diamond-turned metallic tool. Patterns were cut into the copper surface of the tool using a precision diamond turning machine. The resulting copper cylinders with precision cut features were nickel plated and release treated to promote the release of cured resin during the micro-replication process. The structure cut into the copper tool was a sine wave with the dimensions of a 12 micrometer pitch and 2.5 micrometer peak to valley height. A film replicate was then made from the precision cylindrical tool. The substrate is a primed 0.002 inch (0.051 mm) thick PET (MELINEX 454 Teijin DuPont Films, Chester, Va.). The replicating resin was a 75/25 blend of EA-1 and PEA with a photoinitator package comprising 0.25% PI-2, and 0.1% PI-3. Replication of the resin is conducted at 20 ft/min (6.1 m/min) with the replication tool temperature at 137° F. (58° C.). Radiation from a filtered mercury "D" UV lamp (Heraeus Noblelight America LLC, Gaithersburg, Md.) operating at 600 W/in was transmitted through the film to cure the resin while in contact with a microstructured tool. This replicated template film was primed in a plasma chamber using argon gas at a flow rate of 250 standard cc/min (sccm) at a pressure of 25 mTorr and RF power of 1000 Watts for 30 seconds. Subsequently, a release coated replicated surface is prepared by subjecting the sample to a tetramethylsilane (TMS) plasma at a TMS flow rate of 150 SCCM but no added oxygen, which corresponded to an atomic ratio of oxygen to silicon of about 0. The pressure in the plasma chamber was 25 mTorr, and the RF power of 1000 Watts was used for 10 seconds. The film was then coated with an additional low adhesion backsize (LAB) coating for silicone adhesives. The LAB polymer was prepared as described in Example 5 of US Patent Publication No. 2014/0287642, then diluted to 1.25% solids in ethyl acetate. The solution was spread over a leading edge of the film, quickly drawn down using a #24 wire wound "Mayer" rod (RDS Specialties, Webster, N.Y.) then dried in the oven at 80° C. for 10 minutes to produce TOOL FILM A.

TABLE 6

Photocurable ceramifiable silicone adhesive formulations

| | Wt. % Example # | | | |
|---|---|---|---|---|
| Material Abbreviation | Example 2A | Example 2B | Example 2C | Comparative Example C2 |
| SM-1 | 9.80 | 9.80 | 9.60 | 19.6 |
| SA-1 | 39.2 | 39.1 | 38.3 | 78.4 |
| Resin-1 | 49.0 | 48.9 | 47.8 | — |
| PI-1 | 2.0 | 2.0 | 1.9 | 2.0 |
| CsOH | — | 0.20 | — | — |
| MAOPTS | — | — | 2.20 | — |
| BTSE | — | — | 0.20 | — |

The formulations for the photocurable silicone ceramifiable adhesives Examples 2A-2C and Comparative Example C2 are shown in Table 6. The components were charged in a polypropylene cup, and mixed in a speed mixer at 1500 rpm for 30 seconds and at 2500 rpm for two minutes. Then, the bottles were sonicated for 30 minutes until the mixtures became homogenous.

For peel force adhesion measurements, formulations for Examples 2A-2C and Comparative Example C2 were coated using a notch bar coater using a 2 mil (51 micrometer) gap between PET film and a Release Liner-1. The film stack was passed through a Fusion Light Hammer (Fusion Systems, Rockville, Md.) operating with a D-bulb at 100% power at 30 feet/minute for four passes. Measurements of peel force were performed as described in Test Method 2 and recorded in Table 7.

For optical measurements of flat films, silicone adhesive formulations Examples 2A-2C and Comparative Example C2 were coated using a notch bar coater using a 2 mil (51 micrometer) gap between two sheets of Release Liner-1. The film stack was passed through a Fusion Light Hammer operating with a D-bulb at 100% power at 30 feet/minute for four passes. One sheet of the Release Liner-1 was removed and the exposed silicone adhesive was laminated down to a piece of glass that was cleaned with isopropanol and then dried in an oven to remove adsorbed water. The other piece of Release Liner-1 was then removed leaving behind only the silicone adhesive formulation. Measurements of transmission and haze were performed as described in Test Method 1 and recorded in Table 7.

For thermal decomposition data, small 1 $mm^2$ square pieces of the adhesive films in between the release liners were made using a razor blade, the liners were removed to leave behind flat pieces of the cured polymer, which were placed in an aluminum pan for thermal analysis according to Test Method 4. The data was recorded in Table 7.

For optical measurements of structured films, Examples 2A-2C and Comparative Example C2 were laminated in between TOOL FILM A and Release Liner-1 using approximately 30 psi nip pressure at ambient temperature. The film stack was passed through a Fusion Light Hammer operating with a D-bulb at 100% power at 30 feet/minute for four passes. The release liner was removed and the exposed silicone adhesive side was laminated down to a piece of glass that was cleaned with isopropanol and then dried in an oven to remove adsorbed water. TOOL FILM A was then peeled off of the surface of the silicone adhesive. The silicone adhesive thereby took the shape of an inverse replica of TOOL FILM A, with a thin layer of "land" against the surface of the glass. The microstructured adhesives were then placed in a furnace (Neytech Vulcan Muffle Furnace, Model #9493308) in an air atmosphere and baked at 2° C./min up to 500° C. and soaked at that temperature for one hour. The thickness of the transferred adhesives before and after bake step was measured using a digital caliper. The microstructure fidelity was measured before and after the bake step according to Test Method 4. All data was recorded in Table 8. The ability to bond another piece of glass to the top side of the microstructured adhesive was also recorded. Results:

TABLE 7

Optical, adhesion, and thermal decomposition results

| | Optical | | RT Adhesion | Thermal | | Wt. Change | Residue |
|---|---|---|---|---|---|---|---|
| Example # | T (%) | H (%) | Peel Force (oz/in) | $T_{onset}$ (° C.) | $T_{d-5\%}$ (° C.) | (%) | (%) |
| Example 2A | 90.7 | 7.10 | 2.90 ± 0.05 | 226 | 245 | 61.5 | 38.5 |
| Example 2B | 90.5 | 13.7 | 2.34 ± 0.05 | 176 | 251 | 62.1 | 37.9 |
| Example 2C | 90.6 | 6.50 | 0.64 ± 0.06 | 219 | 248 | 57.0 | 43.0 |
| Comparative Example C2 | 90.2 | 6.80 | 0.13 ± 0.02 | 242 | 267 | 92.6 | 7.40 |

TABLE 8

Thickness change and optical quality of microstructures before and after bake-out

| | Before Bake-out | | After Bake-out | | | |
|---|---|---|---|---|---|---|
| Example # | Thickness (μm) | Diffraction Orders Visible | Thickness (μm) | Diffraction Orders Visible | Quality of Diffraction | Glass Bonding? |
| Example 2A | 29 | 8 | 3.00 | 4 | High | Yes |
| Example 2B | 32 | 8 | 1.25 | 3 | Low | Yes |
| Example 2C | 20 | 6 | 5.75 | 3 | Medium | Yes |
| Comparative Example C2 | 21 | 7 | 1.00 | 0 | None | No |

What is claimed is:

1. An adhesive layer comprising:
   at least one siloxane-based copolymer;
   at least one siloxane tackifying resin; and
   an alkaline decomposition catalyst, wherein the adhesive layer is a pressure sensitive adhesive at room temperature and is convertible into a ceramic-like layer by baking-out at a temperature of from 100 to 500° C.

2. The adhesive layer of claim 1, where the at least one siloxane-based copolymer comprises polydiorganosiloxane segments with at least one linking group where the linking group is selected from urea linkages, urethane linkages, oxamide linkages, amide linkages, cured (meth)acrylate linkages, cured vinyl linkages, cured epoxy linkages, and a combination thereof.

3. The adhesive layer of claim 1, wherein the at least one siloxane-based copolymer comprises a siloxane polyurea-based segmented copolymer comprising at least one repeat unit of the general structure I:

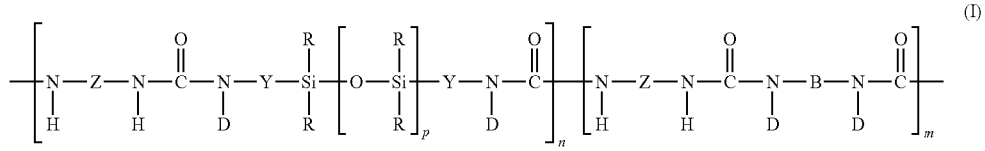

wherein
   each R independently is an alkyl, substituted alkyl, cycloalkyl, aryl, or substituted aryl;
   each Z is a polyvalent radical of an arylene, an aralkylene, an alkylene, or a cycloalkylene;
   each Y is a polyvalent radical that independently is an alkylene, an aralkylene, or an arylene radical;
   each D is selected from the group consisting of hydrogen, an alkyl radical, phenyl, and a radical that completes a ring structure including B or Y to form a heterocycle;
   B is a polyvalent radical selected from the group consisting of alkylene, aralkylene, cycloalkylene, phenylene, and heteroalkylene;
   m is a number that is 0 to about 1000;
   n is a number that is at least 1; and
   p is a number that is at least 10.

4. The adhesive layer of claim 1, wherein the at least one siloxane-based copolymer comprises a siloxane polyoxamide-based segmented copolymer comprising at least two repeat units of Formula II:

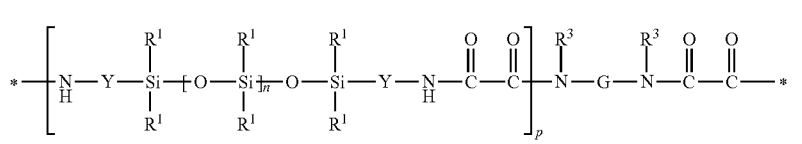

wherein
   each $R^1$ is independently an alkyl, haloalkyl, aralkyl, alkenyl, aryl, or aryl substituted with an alkyl, alkoxy, or halo;
   each Y is independently an alkylene, aralkylene, or a combination thereof;
   n is independently an integer of 40 to 1500; and
   p is an integer of 1 to 10;
   G is a divalent group that is the residue unit that is equal to a diamine of formula $R^3HN$-G-$NHR^3$ minus the two —$NHR^3$ groups, where $R^3$ is hydrogen or alkyl, or $R^3$ taken together with G and with the nitrogen to which they are both attached forms a heterocyclic group; and
   each asterisk (*) indicates a site of attachment of the repeat unit to another group in the copolymer.

5. The adhesive layer of claim 1, wherein the at least one siloxane-based copolymer comprises the reaction product of a reactive mixture comprising:
   at least one siloxane poly(meth)acrylate; and
   an initiator.

6. The adhesive layer of claim 5, wherein the reactive mixture further comprises at least one monofunctional siloxane (meth)acrylate.

7. The adhesive layer of claim 5, wherein the reactive mixture further comprises at least one silane with a polymerizable group of by the general formula:

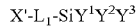

wherein
X' comprises a polymerizable group selected from a (meth)acrylate group, an epoxy group, or a thiol group;
$L_1$ is a single covalent bond or a divalent linking group; and
each of $Y^1$, $Y^2$, and $Y^3$ is independently a hydrolysable group or an alkyl group.

8. The adhesive layer of claim 5, wherein the initiator comprises a photoinitiator.

9. The adhesive layer of claim 1, wherein the adhesive layer is optically clear having a visible light transmission of at least 95% and a haze of less than 5%.

10. The adhesive layer of claim 1, further comprising at least one additive selected from non-reactive fillers consisting of plasticizers, microparticle fillers, nanoparticle fillers, metal oxide fillers, bead fillers, glass bubbles, chopped fibers, antioxidants, viscosity control additives, refractive index modifying agents, and mixtures or combinations thereof.

11. The adhesive layer of claim 1, wherein the adhesive layer comprises at least 50% by weight of the siloxane-based copolymer.

12. The adhesive layer of claim 1, wherein the adhesive layer comprises a structured surface comprising periodic, quasi-periodic, or random engineered microstructures, nanostructures, and/or hierarchical structures in a regular pattern or random across the surface.

13. The adhesive layer of claim 1, wherein the adhesive layer is a transfer tape, and further comprising a release substrate with a first major surface and a second major surface wherein the release substrate is adjacent to the adhesive layer.

14. The adhesive layer of claim 13, wherein the transfer tape further comprises a backfill layer wherein the backfill layer is intermediate between the adhesive layer and the second major surface of the release substrate.

15. A multilayer article comprising:
a receptor substrate with a first major surface and a second major surface; and
a ceramic-like layer in contact with the second major surface of the receptor substrate,
the ceramic-like layer comprising a baked-out pressure sensitive adhesive layer,
wherein the pressure sensitive adhesive is baked-out at a temperature of from 100-500° C., the pressure sensitive adhesive layer comprising:
at least one siloxane-based copolymer;
at least one siloxane tackifying resin; and
an alkaline decomposition catalyst.

16. The multilayer article of claim 15, further comprising a cured backfill layer in contact with and adhered to the ceramic-like layer, the cured backfill layer comprising a curable backfill layer cured during bake-out.

17. The multilayer article of claim 15, wherein the receptor substrate is selected from glass, metal, sapphire, silicon, silica, silicon carbide, silicon nitride, semiconductor materials on a support wafer, and an optical film comprising polyester or polyimide.

18. The multilayer article of claim 15, further comprising a second receptor substrate with a first major surface and a second major surface, wherein the ceramic-like layer is in contact with the first major surface of the second receptor substrate.

19. A method of preparing an article comprising:
providing a receptor substrate with a first major surface and a second major surface;
providing a transfer tape, the transfer tape comprising:
a release substrate with a first major surface and a second major surface; and
an adhesive layer adjacent to at least a portion of the second major surface of the release substrate, the adhesive layer comprising:
at least one siloxane-based copolymer;
at least one siloxane tackifying resin; and
an alkaline decomposition catalyst, wherein the adhesive layer is a pressure sensitive adhesive at room temperature and is convertible into a ceramic-like layer by bake-out at a temperature of from 100-500° C.;
applying the transfer tape to the receptor substrate such that the pressure sensitive adhesive layer is in contact with the second major surface of the receptor substrate;
removing the releasing substrate from the transfer tape in contact with the second major surface of the receptor substrate to form a pressure sensitive adhesive layer laminated to the second major surface of the receptor substrate; and
baking-out the pressure sensitive adhesive layer laminated to the second major surface of the receptor substrate at a temperature from 100-500° C., to form a ceramic-like layer on the second major surface of the receptor substrate.

20. The method of claim 19, further comprising applying a backfill layer to the surface of the pressure sensitive adhesive layer laminated to the second major surface of the receptor substrate prior to baking-out the pressure sensitive adhesive layer laminated to the second major surface of the receptor substrate, such that the backfill layer cures during the bake-out and adheres to the receptor substrate via the ceramic-like layer formed from the adhesive layer.

21. The method of claim 19, wherein providing a transfer tape comprises providing a transfer tape comprising:
a releasing substrate;
a backfill layer in contact with the releasing substrate; and
a pressure sensitive adhesive layer in contact with the backfill layer.

22. The method of claim 19, further comprising:
providing a second receptor substrate with a first major surface and a second major surface; and
contacting the first major surface of the second receptor substrate to the pressure sensitive adhesive layer.

23. The method of claim 19, further comprising:
prior to baking-out, providing a second receptor substrate with a first major surface and a second major surface, and a second adhesive layer in contact with the first major surface of the second receptor substrate, wherein the second adhesive layer is the same or different from the first adhesive layer, and bakes out at the same or a lower temperature than the first adhesive layer;
contacting the second adhesive layer to the surface of the first adhesive layer.

* * * * *